(12) United States Patent
Chu et al.

(10) Patent No.: US 10,257,806 B2
(45) Date of Patent: Apr. 9, 2019

(54) MEDIUM ACCESS CONTROL FOR MULTI-CHANNEL OFDM IN A WIRELESS LOCAL AREA NETWORK

(71) Applicant: Marvell World Trade Ltd., St. Michael (BB)

(72) Inventors: Liwen Chu, San Ramon, CA (US); Hongyuan Zhang, Fremont, CA (US); Hui-Ling Lou, Sunnyvale, CA (US); Yakun Sun, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 880 days.

(21) Appl. No.: 14/538,573

(22) Filed: Nov. 11, 2014

(65) Prior Publication Data

US 2015/0131517 A1    May 14, 2015

Related U.S. Application Data

(60) Provisional application No. 61/947,922, filed on Mar. 4, 2014, provisional application No. 61/902,413, filed on Nov. 11, 2013.

(51) Int. Cl.
*H04L 5/00* (2006.01)
*H04W 72/00* (2009.01)
*H04W 84/12* (2009.01)

(52) U.S. Cl.
CPC ......... *H04W 72/005* (2013.01); *H04L 5/0007* (2013.01); *H04L 5/0037* (2013.01); *H04L 5/0055* (2013.01); *H04W 84/12* (2013.01)

(58) Field of Classification Search
CPC ........... H04W 72/0453; H04W 72/044; H04W 84/10; H04W 84/12
See application file for complete search history.

(56) References Cited

U.S. PATENT DOCUMENTS 7,430,168 B2    9/2008    Yamaura et al.
7,599,332 B2    10/2009   Zelst et al.
(Continued)

FOREIGN PATENT DOCUMENTS

WO    WO-2012/162576 A1    11/2012

OTHER PUBLICATIONS

U.S. Appl. No. 12/730,651, filed Mar. 24, 2010
(Continued)

*Primary Examiner* — Robert M Morlan

(57) ABSTRACT

A first communication device allocates respective sub-channels of an orthogonal frequency division multiplexing (OFDM) channel to two or more second communication devices for uplink orthogonal frequency division multiple access (OFDMA) transmission from the two or more second communication devices. A first sub-channel is allocated to a first one of the second communication devices and a second sub-channel is allocated to a second one of the second communication devices. The first communication device provides, to the second communication devices, indications of the respective sub-channels allocated to the second communication devices. The first communication device receives an uplink OFDMA data unit that includes a first OFDM data unit transmitted from the first one of the second communication devices via the first sub-channel, and a second OFDM data unit transmitted from the second one of the second communication devices via the second sub-channel.

42 Claims, 27 Drawing Sheets

(56) References Cited

U.S. PATENT DOCUMENTS

| | | |
|---|---|---|
| 7,742,390 B2 | 6/2010 | Mujtaba |
| 7,804,800 B2 | 9/2010 | Li et al. |
| 8,068,455 B2 | 11/2011 | Utsunomiya et al. |
| 8,074,056 B1 | 12/2011 | Chen et al. |
| 8,111,609 B2 | 2/2012 | Wei et al. |
| 8,144,647 B2 | 3/2012 | Nabar et al. |
| 8,149,811 B2 | 4/2012 | Nabar et al. |
| 8,270,909 B2 | 9/2012 | Zhang et al. |
| 8,289,869 B2 | 10/2012 | Sawai |
| 8,331,309 B2 | 12/2012 | Marsh et al. |
| 8,331,398 B2 | 12/2012 | Lim et al. |
| 8,339,978 B2 | 12/2012 | Sawai et al. |
| 8,363,578 B1 | 1/2013 | Ramamurthy et al. |
| 8,379,757 B1 | 2/2013 | Zhang et al. |
| 8,395,997 B2 | 3/2013 | Banerjea et al. |
| 8,483,152 B1 | 7/2013 | Mueller |
| 8,599,804 B2 | 12/2013 | Erceg et al. |
| 8,605,569 B2 | 12/2013 | Olszewski et al. |
| 8,611,322 B2 | 12/2013 | Kwon |
| 8,619,907 B2 | 12/2013 | Mujtaba et al. |
| 8,670,399 B2 | 3/2014 | Liu et al. |
| 8,724,720 B2 | 5/2014 | Srinivasa et al. |
| 8,737,405 B2 | 5/2014 | Liu et al. |
| 8,787,338 B2 | 7/2014 | Liu et al. |
| 8,787,385 B2 | 7/2014 | Liu et al. |
| 8,811,203 B1 | 8/2014 | Liu et al. |
| 8,842,614 B2 | 9/2014 | Liu et al. |
| 8,923,217 B2 | 12/2014 | Liu et al. |
| 9,166,660 B2 | 10/2015 | Chu et al. |
| 2005/0058151 A1 | 3/2005 | Yeh |
| 2006/0099956 A1* | 5/2006 | Harada ............... H04W 74/02 455/452.2 |
| 2007/0153754 A1 | 7/2007 | Shapira et al. |
| 2008/0095104 A1* | 4/2008 | Hansen ............... H04N 5/775 370/329 |
| 2008/0232287 A1* | 9/2008 | Shao ............... H04W 52/0216 370/311 |
| 2008/0316961 A1 | 12/2008 | Bertrand et al. |
| 2009/0022093 A1 | 1/2009 | Nabar et al. |
| 2009/0022128 A1 | 1/2009 | Nabar et al. |
| 2009/0196163 A1 | 8/2009 | Du |
| 2010/0046656 A1 | 2/2010 | van Nee et al. |
| 2010/0260159 A1 | 10/2010 | Zhang et al. |
| 2010/0284393 A1 | 11/2010 | Abraham et al. |
| 2010/0309868 A1 | 12/2010 | Yang et al. |
| 2011/0222486 A1* | 9/2011 | Hart ............... H04L 5/001 370/329 |
| 2012/0263211 A1* | 10/2012 | Porat ............... H04L 5/0044 375/219 |
| 2013/0156005 A1* | 6/2013 | Li ............... H04L 5/001 370/331 |
| 2013/0229996 A1 | 9/2013 | Wang et al. |
| 2013/0286959 A1* | 10/2013 | Lou ............... H04W 72/04 370/329 |
| 2014/0079016 A1* | 3/2014 | Dai ............... H04L 5/0041 370/330 |
| 2014/0328195 A1* | 11/2014 | Sampath ............... H04W 72/082 370/252 |
| 2014/0328235 A1* | 11/2014 | Merlin ............... H04B 7/2621 370/311 |
| 2014/0328313 A1* | 11/2014 | Merlin ............... H04B 7/2621 370/330 |
| 2015/0078215 A1* | 3/2015 | Zhou ............... H04L 5/003 370/277 |
| 2015/0131517 A1 | 5/2015 | Chu et al. |
| 2016/0255656 A1* | 9/2016 | Lou ............... H04L 1/0026 |

OTHER PUBLICATIONS

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, pp. 1-89 (Sep. 1999).

IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.*, pp. 1-23 (Nov. 7, 2001).

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, pp. 1-53 (May 2002).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, pp. 1-69 (Apr. 2003).

IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7.0), pp. 1-1212 (2006).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

Chen, "Home Network Basis: Transmission Environments and Wired/Wireless Protocols," *Prentice Hall*, pp. 1-26 (Jul. 2003).

Hiertz, et al., "The IEEE 802.11 Universe," *IEEE Communications Magazine*, pp. 62-70, (Jan. 2010).

(56) References Cited

OTHER PUBLICATIONS

Mujtaba, S.A. "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).
IEEE P802.11n™/D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).
IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).
van Nee, et al. "The 802.11n MIMO-OFDM Standard for Wireless LAN and Beyond," Wireless Personal Communications, vol. 37, pp. 445-453 (Jun. 2006).
Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-211 (2009).
Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).
Syafei et al., "A Design of Next Generation Gigabit MIMO Wireless LAN System ," IEEE 12th Int'l Conference on Advanced Communication Technology (ICACT 2010), *The Institute of Electrical and Electronics Engineers*, pp. 941-946 (2010).
Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).
Shi et al., "Phase Tracking During VHT-LTF," Doc. No. IEEE 802.11-10/0771r0, *The Institute of Electrical and Electronics Engineers, Inc.*, pp. 1-19 (Jul. 2010).
van Zelst et al., "Pilot Sequence for VHT-Data," Doc. No. IEEE 802.11-10/0811r1, *The Institute of Electrical and Electronics Engineers, Inc.*, pp. 1-10 (Jul. 2010).
Cariou et al., "Multi-channel Transmissions," Doc. No. IEEE 802.11-09/1022r0, *The Institute of Electrical and Electronics Engineers, Inc.*, pp. 1-13 (Sep. 2009).
Yuan et al., "Carrier Aggregation for LTE-Advanced Mobile Communication Systems," IEEE Communications Magazine, pp. 88-93 (Feb. 2010).
Pedersen et al., "Carrier Aggregation for LTE-Advanced: Functionality and Performance Aspects," IEEE Communications Magazine, vol. 49, No. 6, pp. 89-95, (Jun. 1, 2011).
Noh, et al., "Channel Selection and Management for 11ac," Doc. No. IEEE 802.11-10/0593r1, *The Institute of Electrical and Electronics Engineers, Inc.*, pp. 1-21 (May 20, 2010).
Redieteab, et al., "Cross-Layer Multichannel Aggregation for Future WLAN Systems," 2010 IEEE Int'l Conf. on Communication Systems (ICCS), pp. 740-756 (Nov. 2010).
Park, "IEEE 802.11ac: Dynamic Bandwidth Channel Access," 2011 IEEE Int'l Conf. on Communications (ICC), pp. 1-5 (Jun. 2011).
Liu, et al., "VHT BSS Channel Selection," *Institute of Electrical and Electronics Engineers, Inc.*, doc. No. IEEE 802.11-11/1433r0, pp. 1-10 (Nov. 2011).
Wannstrom, "Carrier Aggregation explained," pp. 1-6 (May 2012).
Liu et al, "Methods and Apparatus for Clear Channel Assessment," U.S. Appl. No. 13/034,421, filed Feb. 24, 2011 (47 pages).
Liu et al, "Accessing Channels in a Multi-Channel Communication System," U.S. Appl. No. 13/440,214, filed Apr. 5, 2012 (38 pages).
IEEE Std 802.16a-2003 (Amendment to IEEE Std 802.16-2001) "IEEE Standard for Local and metropolitan area networks: Part 16: Air Interface for Fixed Broadband Wireless Access Systems—Amendment 2: Medium Access Control Modifications and Additional Physical Layer Specifications for 2-11 GHZ," *The Institute of Electrical and Electronics Engineers, Inc.*, pp. 1-292 (Apr. 1, 2003).
IEEE Std 802.16e-2005 and IEEE Std 802.16-2004/Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, *The Institute of Electrical and Electronics Engineers, Inc.*, pp. 1-864 (Feb. 28, 2006).
IEEE P802.16Rev2/D5 (Jul. 2008) (Revision of IEEE Std 802.16-2004 and consolidates material from IEEE Std 802.16e-2005, Std 802.16/2004/Cor1-2005, Std 802.16f-2005 and Std 802.16g-2007) "Draft Standard for Local and metropolitan area networks: Part 16: Air Interface for Broadband Wireless Access Systems," *The Institute of Electrical and Electronics Engineers, Inc.*, pp. Jan. 1970 (Jun. 2008).
IEEE Std 802.16-2009 (Revision of IEEE Std. 802.16-2004), IEEE Standard for Local and metropolitan area networks: Part 16: Air Interface for Broadband Wireless Access Systems, *The Institute of Electrical and Electronics Engineers, Inc.*, 2082 pages (May 29, 2009).
IEEE 802.20-PD-06; IEEE P 802.20TMV14, Draft 802.20 Permanent Document; <System Requirements for IEEE 802.20 Mobile Broadband Wireless Access Systems—Version 14>, 24 pages (Jul. 16, 2004).
IEEE Std 802.16-2004 (Revision of IEEE Std 802.16-2001), "IEEE Standard for Local and metropolitan area networks; Part 16: Air Interface for Fixed Broadband Wireless Access Systems," *The Institute of Electrical and Electronics Engineers, Inc.*, 893 pages (Oct. 1, 2004).
ITU-T Recommendation G.9960, "Unified high-speed wireline-based home networking transceivers—System architecture and physical layer specification," *Int'l Telecommunication Union*, pp. 1-160 (Dec. 2011).
ITU-T Recommendation G.9960, Erratum 1 to Recommendation ITU-T G.9960, *Int'l Telecommunication Union*, 1 page (Jul. 2012).
ITU-T Recommendation G.9960, Erratum 2 to Recommendation ITU-T G.9960, *Int'l Telecommunication Union*, 4 pages (Sep. 2012).
ITU-T Recommendation G.9961, "Unified high-speed wire-line based home networking transceivers—Data link layer specification," *Int'l Telecommunication Union*, pp. 1-220 (Jun. 2010).
ITU-T Recommendation G.9961, Corrigendum 1, "Unified high-speed wire-line based home networking transceivers—Data link layer specification," *Int'l Telecommunication Union*, pp. 1-158 (Dec. 2011).
ITU-T Recommendation G.9961, Amendment 1, "Unified high-speed wire-line based home networking transceivers—Data link layer specification," *Int'l Telecommunication Union*, pp. 1-80 (Sep. 2012).
ITU-T Recommendation G.9961, Corrigendum 2, "Unified high-speed wire-line based home networking transceivers—Data link layer specification," *Int'l Telecommunication Union*, pp. 1-122 (Jul. 2013).
ITU-T Recommendation G.9961, Amendment 2, "Unified high-speed wire-line based home networking transceivers—Data link layer specification," *Int'l Telecommunication Union*, pp. 1-44 (Apr. 2014).
ITU-T Recommendation G.9963, "Unified high-speed wireline-based home networking transceivers—Multiple input-multiple output specification" *Int'l Telecommunication Union*, pp. 1-90 (Dec. 2011).
IEEE Std 802.3ac-1998 (Supplement to IEEE Std 802.3, 1998 Edition) "Supplement to Carrier Sense Multiple Access with Collision Detectiong (CSMA/CD) Access Method and Physical Layer Specifications—Frame Extensions for Virtual Bridged Local Area

(56) References Cited

OTHER PUBLICATIONS

Network (VLAN) Tagging on 802.3 Networks," *The Institute of Electrical and Electronics Engineers, Inc.*, pp. 1-89 (Sep. 1998).
IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-92, (1999) Reaffirmed (Jun. 12, 2003).
Zhang et al. Exploiting Multi-Antennas for Opportunistic Spectrum Sharing in Cognitive Radio Networks, IEEE the 19th Annual IEEE International Symposium on Personal, Indoor and Mobile Radio Communications (PIMRC), 2007, 5 pages.).
International Search Report and Written Opinion for International Application No. PCT/US2014/065049 dated Feb. 10, 2015.
Tomoya Tandai et al., "An efficient uplink multiuser MIMO protocol in IEEE 802.11 WLANs", IEEE 20th International Symposium on Personal, Indoor and Mobile Radio Communications (PIMRC 2009), IEEE, Piscataway, NJ, USA, Sep. 13, 2009 pp. 1153-1157.
Liu et al. "Summary and Discussions of Proposals on Potential PHY Technologies in HEW," IEEE 802.11-13/1375r1 Dec. 31, 2013 (15 pages).
International Preliminary Report on Patentability in International Application No. PCT/US2014/065049, dated May 26, 2016 (10 pages).
Chun et al., "Legacy Support on HEW frame structure," doc: IEEE 11-13/1057r0, *The Institute of Electrical and Electronics Engineers, Inc.*, pp. 1-8 (Sep. 2013).
Seok et al., "HEW PPDU Format for Supporting MIMO-OFDMA," IEEE 802.11-14/1210r0, 16 pages, (Sep. 14, 2014).
Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

\* cited by examiner

MEDIUM ACCESS CONTROL FOR MULTI-CHANNEL OFDM IN A WIRELESS LOCAL AREA NETWORK

CROSS-REFERENCE TO RELATED APPLICATION

This disclosure claims the benefit of U.S. Provisional Patent Application Nos. 61/902,413, filed Nov. 11, 2013, and 61/947,922, filed Mar. 4, 2014, both entitled "OFDMA MAC Consideration," the disclosures of which are hereby expressly incorporated herein by reference in their entireties.

FIELD OF THE DISCLOSURE

The present disclosure relates generally to communication networks and, more particularly, to wireless local area networks that utilize orthogonal frequency division multiplexing (OFDM).

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

These WLANs operate in either a unicast mode or a multicast mode. In the unicast mode, the AP transmits information to one client station at a time. In the multicast mode, the same information is transmitted to a group of client stations concurrently.

SUMMARY

In an embodiment, a method for simultaneously communication with multiple communication devices in a wireless local area network includes allocating, by a first communication device, respective sub-channels of an orthogonal frequency division multiplexing (OFDM) channel to two or more second communication devices for uplink orthogonal frequency division multiple access (OFDMA) transmission from the two or more second communication devices, including allocating a first sub-channel to a first one of the two or more second communication devices and a second sub-channel to a second one of the two or more second communication devices. The method further includes providing, from the first communication device to the two or more second communication devices, indications of the respective sub-channels allocated for uplink OFDMA transmission from the two or more second communication devices. The method additionally includes receiving, at the first communication device, an uplink OFDMA data unit that includes at least a first OFDM data unit from the first one of the two or more second communication devices and a second OFDM data unit from the second one of the two or more second communication devices, wherein the first OFDM data unit is transmitted from the first one of the two or more second communication devices via the first sub-channel allocated to the first one of the two or more second communication devices and the second OFDM data unit is transmitted from the second one of the two or more second communication devices via the second sub-channel allocated to the second one of the two or more second communication devices.

In another embodiment, a first communication device comprises a network interface configured to allocate respective sub-channels of an orthogonal frequency division multiplexing (OFDM) channel to two or more second communication devices for uplink orthogonal frequency division multiple access (OFDMA) transmission from the two or more second communication devices, including allocating a first sub-channel to a first one of the two or more second communication devices and a second sub-channel to a second one of the two or more communication devices. The network interface is also configured to provide, to the two or more second communication devices, indications of the respective sub-channels allocated for uplink transmission from the two or more second communication devices. The network interface is additionally configured to receive an uplink OFDMA data unit that includes a first OFDM data unit from the first one of the two or more second communication devices and a second OFDM data unit from the second one of the two or more second communication devices, wherein the first OFDM data unit is transmitted from the first one of the two or more second communication devices via the first sub-channel allocated to the first of the two or more second communication devices and the second OFDM data unit is transmitted from the second one of the two or more second communication devices via the second sub-channel allocated to the second one of the two or more second communication devices.

In yet another embodiment, a method for simultaneously communication with multiple communication devices in a wireless local area network includes allocating, by a first communication device, respective sub-channels of an orthogonal frequency division multiplexing (OFDM) channel to two or more second communication devices for downlink orthogonal frequency division multiple access (OFDMA) transmission to the two or more second communication devices, including allocating a first sub-channel to a first one of the two or more second communication devices and a second sub-channel to a second one of the two or more communication devices. The method further includes generating a signal field of an OFDMA data unit to include indications of the respective sub-channels allocated for downlink OFDMA transmission from the two or more second communication devices. The method further still includes generating an OFDMA data unit to include (i) the signal field, (ii) a first OFDM data unit directed to the first one of the two or more second communication devices and (iii) a second OFDM data unit directed to the second one of the two or more second communication devices, wherein the first OFDM data unit is to be transmitted to the first sub-channel and the second OFDM data unit is to be transmitted in the second sub-channel. The method additionally includes transmitting the OFDMA data unit to the two or more second communication devices.

In still another embodiment, a first communication device comprises a network interface configured to allocate respective sub-channels of an orthogonal frequency division multiplexing (OFDM) channel to two or more second communication devices for downlink orthogonal frequency division multiple access (OFDMA) transmission to the two or more second communication devices, including allocating a first sub-channel to a first one of the two or more second communication devices and a second sub-channel to a second one of the two or more communication devices. The network interface is further configured to generate a signal field of an OFDMA data unit to include indications of the respective sub-channels allocated for downlink OFDMA transmission from the two or more second communication devices. The network interface is further still configured to generate an OFDMA data unit to include (i) the signal field, (ii) a first OFDM data unit directed to the first one of the two or more second communication devices and (iii) a second OFDM data unit directed to the second one of the two or more second communication devices, wherein the first OFDM data unit is to be transmitted to the first sub-channel and the second OFDM data unit is to be transmitted in the second sub-channel. The network interface is additionally configured to transmit the OFDMA data unit to the two or more second communication devices.

DETAILED DESCRIPTION

In embodiments described below, a wireless network device such as an access point (AP) of a wireless local area network (WLAN) simultaneously transmits independent data streams to multiple client stations and/or receives independent data streams simultaneously transmitted by multiple client stations. In particular, the AP transmits data for the multiple clients in different orthogonal frequency division multiplexing (OFDM) sub-channels of an orthogonal frequency division multiple access (OFDMA) transmission, in an embodiment. Similarly, multiple client stations transmit data to the AP simultaneously, in particular, each client station transmits data in a different OFDM sub-channel of an OFDMA transmission, in an embodiment.

The AP is configured to operate with client stations according to at least a first communication protocol. The first communication protocol is sometimes referred to herein as "high efficiency WiFi," "high efficiency WLAN," "HEW" communication protocol, or 802.11 ax communication protocol. The first communication protocol supports OFDMA communication between the AP and the client stations. In some embodiments, different client stations in the vicinity of the AP are configured to operate according to one or more other communication protocols that define operation in the same frequency band as the HEW communication protocol but with generally lower data throughputs. The lower data throughput communication protocols (e.g., IEEE 802.11a, IEEE 802.11n, and/or IEEE 802.11ac) are collectively referred to herein as "legacy" communication protocols. The legacy communication protocols do not support OFDMA communication, in an embodiment.

In an embodiment, client stations that are configured to operate according to the HEW communication protocol generally support OFDMA communication initiated by the AP. In some embodiments, client stations that are configured to operate according to the HEW communication protocol optionally support OFDMA communication initiated by the client stations.

Figure 1:
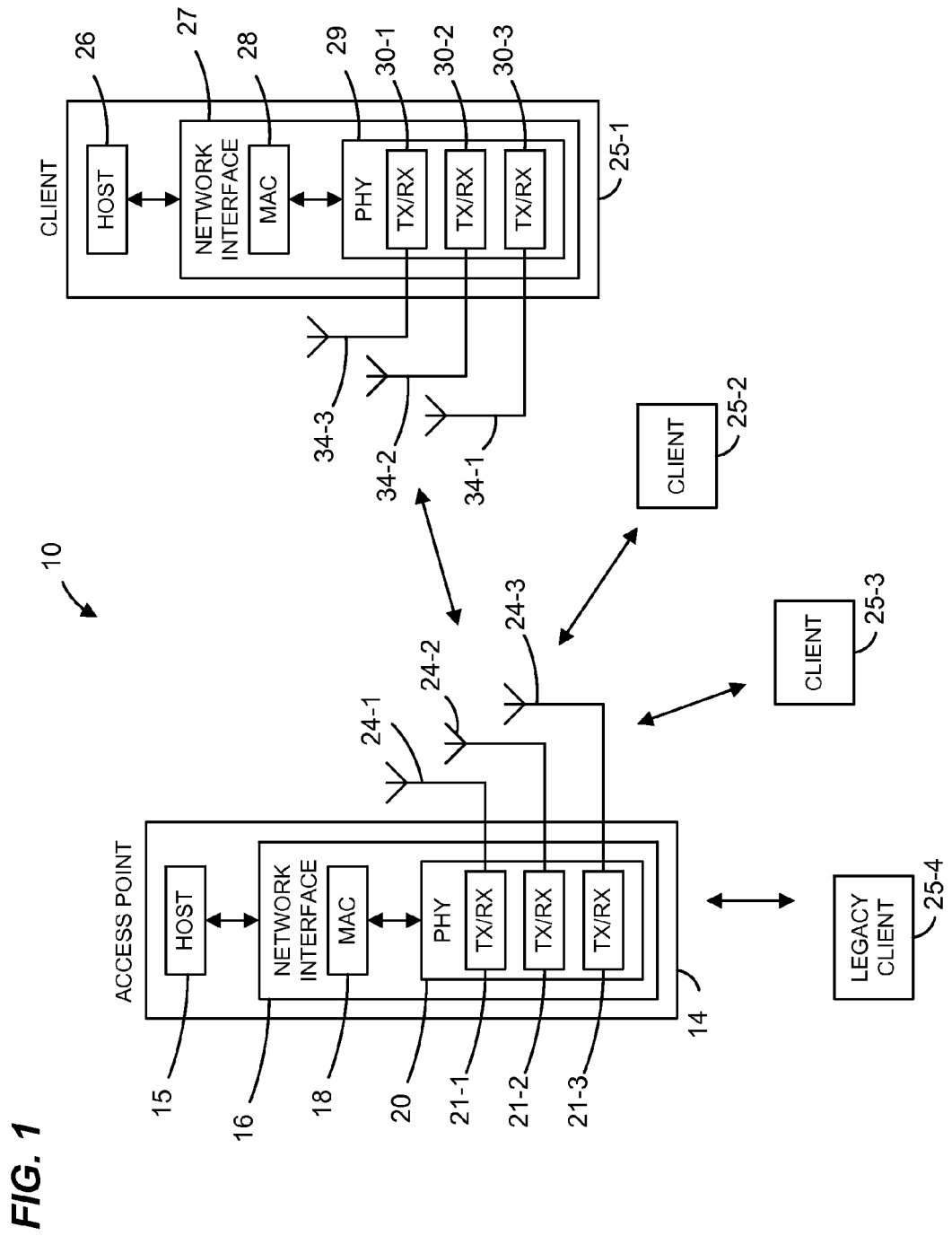
FIG. 1 is a block diagram of an example wireless local area network (WLAN), according to an embodiment.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes different numbers (e.g., 1, 2, 4, 5, etc.) of transceivers 21 and antennas 24 in other embodiments.

The WLAN 10 includes a plurality of client stations 25. Although four client stations 25 are illustrated in FIG. 1, the WLAN 10 includes different numbers (e.g., 1, 2, 3, 5, 6, etc.) of client stations 25 in various scenarios and embodiments. Two or more of the client stations 25 are configured to receive corresponding data streams that are transmitted simultaneously by the AP 14. Additionally, two or more of the client stations 25 are configured to transmit corresponding data streams to the AP 14 such that the AP 14 receives the data streams simultaneously.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

According to an embodiment, the client station 25-4 is a legacy client station that is not enabled to receive a data stream that is transmitted by the AP 14 simultaneously with other independent data streams as part of an OFDMA transmission to multiple client stations 25. Similarly, according to an embodiment, the legacy client station 25-4 is not enabled to transmit a data stream that to the AP 14 as part of OFDMA transmission from multiple client stations 25. According to an embodiment, the legacy client station 25-4 includes a PHY processing unit that is generally capable of receiving a data stream that is transmitted by the AP 14 simultaneously with other independent data streams that are intended for other client stations 25. But the legacy client station 25-4 includes a MAC processing unit that is not enabled with MAC layer functions that support receiving the data stream that is transmitted by the AP 14 simultaneously with other independent data streams that are intended for other client stations 25. According to an embodiment, the legacy client station 25-4 includes a PHY processing unit that is generally capable of transmitting a data stream to the AP 14 at the same time that other client stations 25 transmit data to the AP 14. But the legacy client station 25-4 includes a MAC processing unit that is not enabled with MAC layer functions that support transmitting a data stream to the AP 14 at the same time that other client stations 25 transmit data to the AP 14.

In an embodiment, the AP 14 and the client stations 25 contend for communication medium using carrier sense multiple access with collision avoidance (CSMA/CA) protocol or another suitable medium access protocol. Further, in an embodiment, the AP 14 or a client station 25 dynamically selects a bandwidth for a transmission based on channels available for the transmission. In an embodiment, communication between the AP 14 and a legacy client station (e.g., the legacy client station 25-4) occur in a primary channel of the WLAN 10, or in a wider channel that includes the primary channel of the WLAN 10. For example, the legacy communication protocol requires that each transmission includes the primary channel, in an embodiment. On the other hand, communication between the AP 14 and a non-legacy client station 25 (e.g., the client station 25-1) can occur in one or more communication channels that do not include the primary channel, in an embodiment. For example, the non-legacy communication protocol, such as the HEW communication protocol, allows communication between the AP and the client stations to occur in a communication channel that does not include the primary channel, in an embodiment.

In an embodiment, the AP 14 is configured to transmit different OFDM units to different client stations 25 simultaneously by forming an OFDMA data unit that includes the different OFDM data units modulated in respective sub-channel blocks of the OFDMA data unit. In an embodiment, the AP 14 allocates different sub-channels to different client stations and forms the OFDMA data unit that includes OFDM data units directed to by modulating the different client stations in sub-channel blocks corresponding to the sub-channels assigned to the client stations. In an embodiment, when the one or more client stations include a legacy client station, the AP assigns a channel that includes a primary channel of the WLAN 10 to the legacy client station, and assigns one or more non-primary communication channels of the WLAN 10 to one or more non-legacy client stations. When the one or more client stations do not include any legacy client stations, the AP assigns the primary and the non-primary communication channels in any suitable manner to the one or more client stations, in various embodiments.

Figure 2:
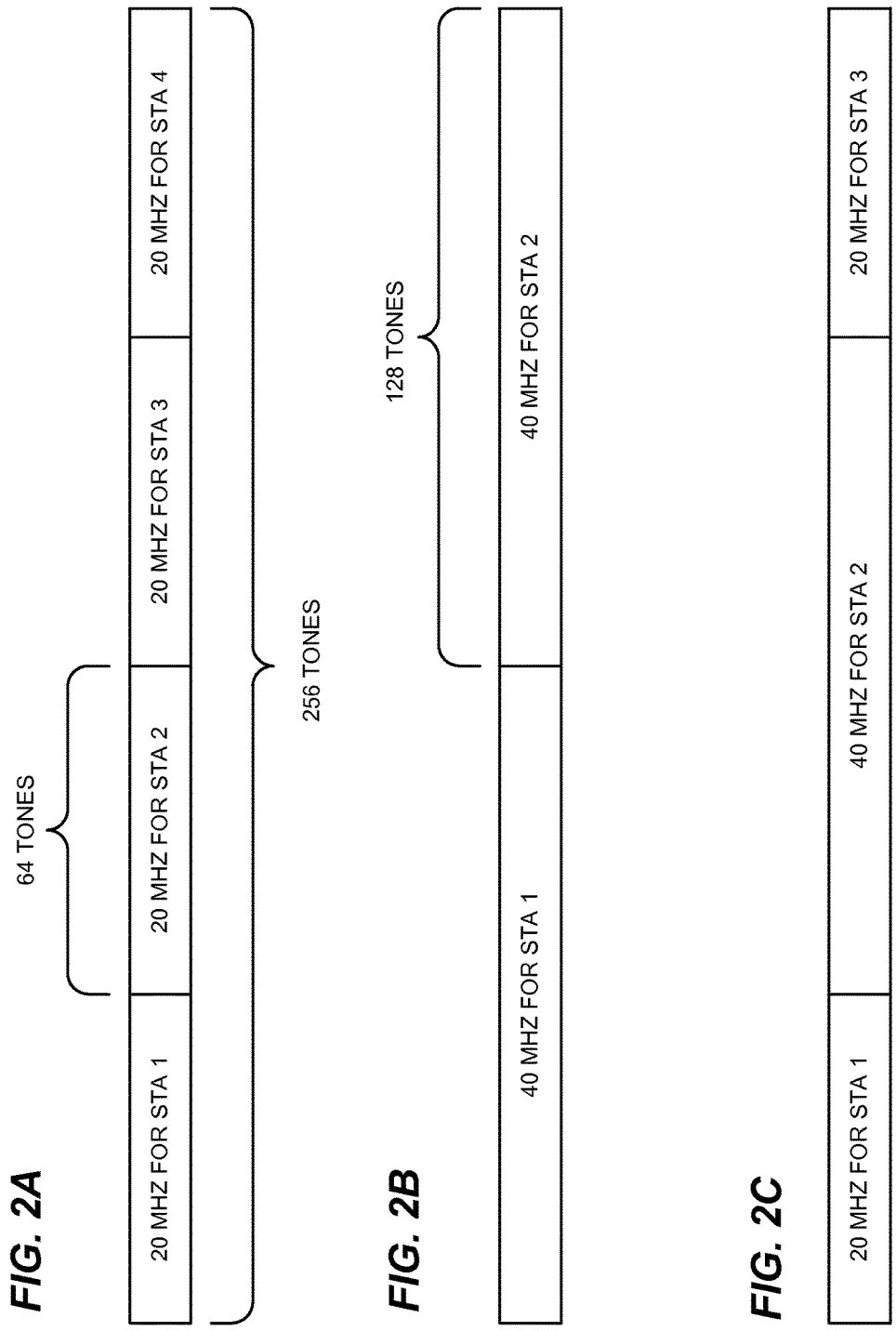
FIGS. 2A, 2B, and 2C are diagrams illustrating example orthogonal frequency division multiplexing (OFDM) sub-channel blocks for an 80 MHz communication channel, according to an embodiment.

FIGS. 2A, 2B, and 2C are diagrams illustrating example OFDM sub-channel blocks for an 80 MHz communication channel, according to an embodiment. In FIG. 2A, the communication channel is partitioned into four contiguous OFDM sub-channel blocks, each having a bandwidth of 20 MHz. The OFDM sub-channel blocks include independent data streams for four client stations. In FIG. 2B, the communication channel is partitioned into two contiguous OFDM sub-channel blocks, each having a bandwidth of 40 MHz. The OFDM sub-channel blocks include independent data streams for two client stations. In FIG. 2C, the communication channel is partitioned into three contiguous OFDM sub-channel blocks. Two OFDM sub-channel blocks each have a bandwidth of 20 MHz. The remaining OFDM sub-channel block has a bandwidth of 40 MHz. The OFDM sub-channel blocks include independent data streams for three client stations.

Although in FIGS. 2A, 2B, and 2C, the OFDM sub-channel blocks are contiguous across the communication channel, in other embodiments the OFDM sub-channel blocks are not contiguous across the communication channel (i.e., there are one or more gaps between the OFDM sub-channel blocks). In an embodiment, each gap is at least as wide as one of the OFDM sub-channel blocks. In another embodiment, at least one gap is less than the bandwidth of an OFDM sub-channel block. In another embodiment, at least one gap is at least as wide as 1 MHz. In an embodiment, different OFDM sub-channel blocks are transmitted in different channels defined by the IEEE 802.11a and/or 802.11n Standards. In one embodiment, the AP includes a plurality of radios and different OFDM sub-channel blocks are transmitted using different radios.

Figure 3:
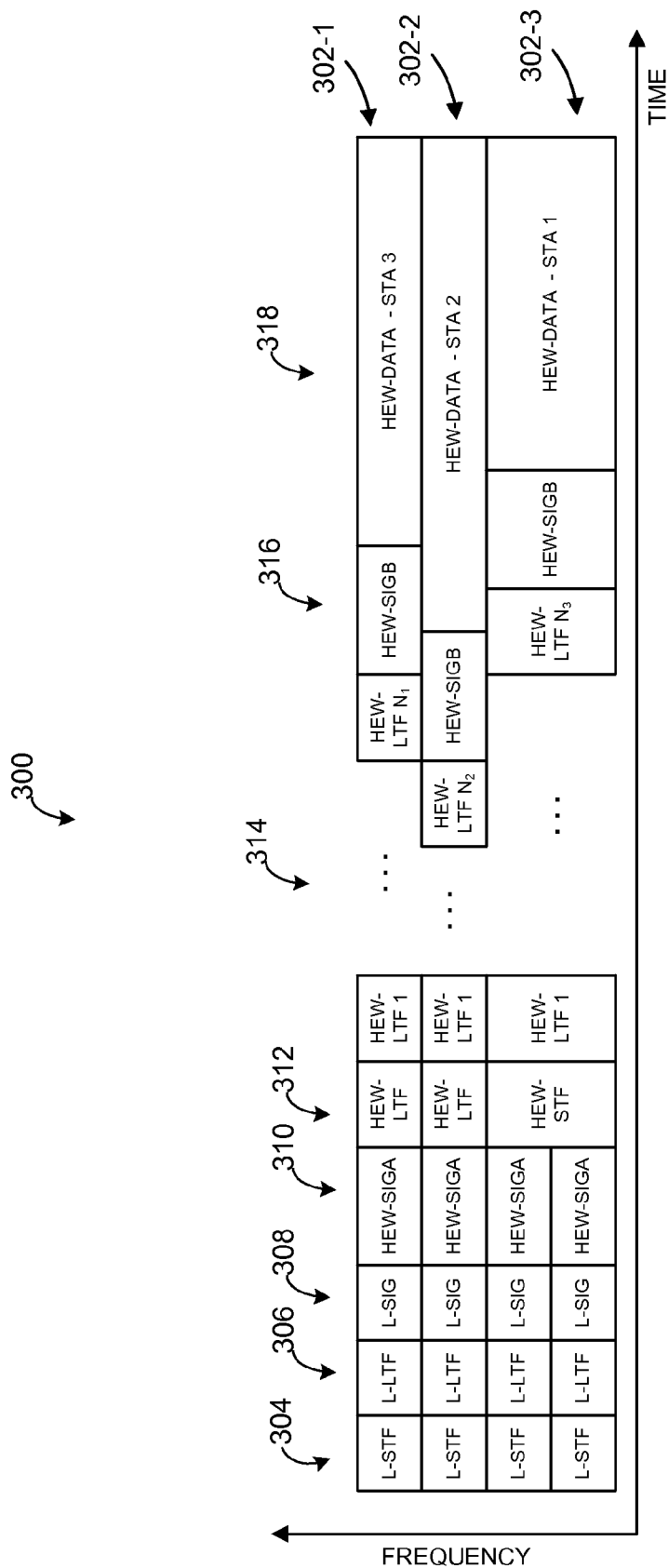
FIG. 3 is a diagram of an example OFDMA data unit, according to an embodiment.

FIG. 3 is a diagram of an example OFDMA data unit 300, according to an embodiment. The OFDMA data unit 300 includes a plurality of OFDM data unit 302-1, 302-2 and 302-3. In an embodiment, the AP 14 transmits the OFDM data units 302-1, 302-2, 302-3 to different client stations 25 via respective OFDM sub-channels within the OFDMA data unit 300. In another embodiment, different client stations 25 transmit respective OFDM data units 302-1, 302-2, 302-3 to the AP 14 in respective OFDM sub-channels within the OFDMA data unit 300. In this embodiment, The AP 14 receives the OFDM data units 302-1, 302-2, 302-3 from the client stations 25 via respective OFDM sub-channels of within the OFDMA data unit 300, in this embodiment.

Each of the OFDM data units 302-1, 302-2, 302-3 conforms to a communication protocol that defines OFDMA communication, such as the HEW communication protocol, in an embodiment. In an embodiment in which the OFDMA data unit 300 corresponds to a downlink OFDMA data unit, the OFDMA data unit 300 is generated by the AP 14 such that each OFDM data unit 302 is transmitted to a respective client station 25 via a respective sub-channel of the WLAN 10 allocated for downlink transmission of the OFDMA data unit 300 to the client station. Similarly, an embodiment in which the OFDMA data unit 300 corresponds to an uplink OFDMA data unit, the AP 14 receives the OFDM data units 302 via respective sub-channels of the WLAN 10 allocated for uplink transmission of the OFDM data units 302 from the client stations, in an embodiment. For example, the OFDM data unit 302-1 is transmitted via a first 20 MHZ sub-channel of the WLN 10, the OFDM data unit 302-2 is transmitted via a second 20 MHz sub-channel of the WLAN 10, and the OFDM data unit 302-3 is transmitted via a 40 MHz sub-channel of the WLAN 10, in the illustrated embodiment.

In an embodiment, each of the OFDM data units 302 includes a preamble including one or more legacy short training fields (L-STF) 304, one or more legacy long training fields (L-LTF) 306, one or more legacy signal fields (L-SIG) 308, one or more first high efficiency WLAN signal field (HEW-SIG-A) 310, N HEW long training fields (HEW-LTF) and a second HEW signal field (HEW-SIGB) 314. Additionally, each OFDM data unit 302 includes a high efficiency WLAN data portion (HEW-DATA) 318. In an embodiment, each L-LSF field 306, each L-LTF field 308, each L-SIG field 310 and each HEW-SIGA field 312 occupies a smallest bandwidth supported by the WLAN 10 (e.g., 20 MHz). In an embodiment, if an OFDM data unit 302 occupies a bandwidth that is greater than the smallest bandwidth of the WLAN 10, then each L-LSF field 306, each L-LTF field 308, each L-SIG field 310 and each HEW-SIGA field 312 is duplicated in each smallest bandwidth portion of the OFDM data unit 302 (e.g., in each 20 MHz portion of the data unit 302). On the other hand, each HEW-STF field 312, each HEW-LTF field 314, each HEW-SIGB field 316 and each HEW data portion 318 occupies an entire bandwidth of the corresponding OFDM data unit 302, in an embodiment. For example, the OFDM data unit 302-3 occupies 40 MHz, wherein L-LSF field 306, the L-LTF field 308, L-SIG field 310 and HEW-SIGA fields 312 is duplicated in the upper and the lower 20 MHz bands of the OFDM data unit 302-3, while each of the HEW-STF field 312, each of the HEW-LTF fields 314, each of the HEW-SIGB field 316 and each of the HEW data portion 318 occupies the entire 40 MHz bandwidth of the data unit 302, in the illustrated embodiment.

In an embodiment, padding is used in one or more of the OFDM data units 302 to equalize lengths of the OFDM data units 302. Accordingly, the length of each of the OFDM data units 302 correspond to the length of the OFDMA data unit 302, in this embodiment. Ensuring that the OFDM data units 302 are of equal lengths synchronizes transmission of acknowledgment frames by client stations 25 that receive the data units 302, in an embodiment. In an embodiment, each of one or more of the OFDM data units 302 is an aggregate MAC service data units (A-MPDU) (e.g., a very high throughput (VHT) A-MPDU, an HEW MPDU, or another suitable aggregated data unit), which is in turn included in a PHY protocol data unit (PPDU). In another embodiment, each of one or more of the OFDM data units 302 is a single MPDU (e.g., a VHT MPDU, an HEW MPDU, or another suitable non-aggregated data unit) which is in turn included in a PPDU. In an embodiment, padding (e.g., zero-padding) within one or more of the A-MPDUs 302 or single MPDUs 302 is used to equalize the lengths of the data units 302, and to synchronize transmission of acknowledgement frames corresponding to the OFDMA data unit 300.

Figure 4:
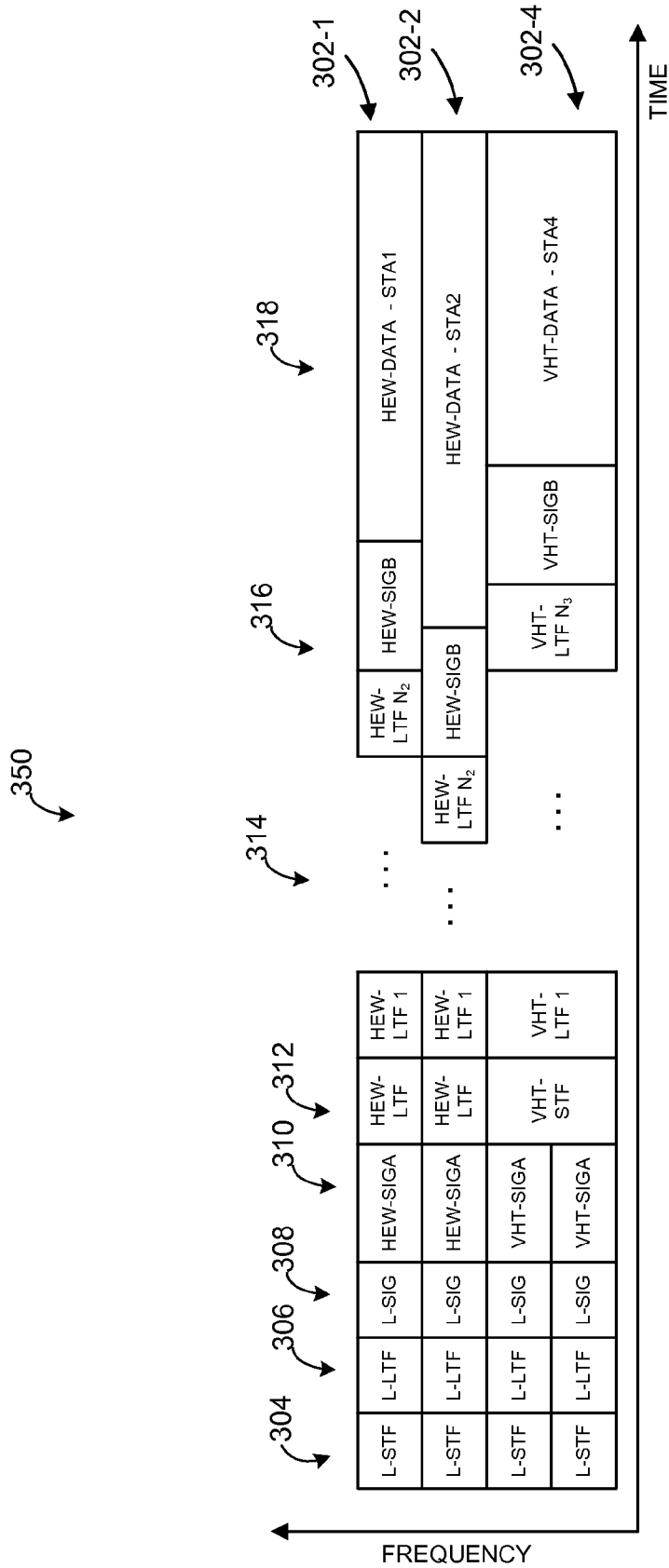
FIG. 4 is a diagram of an example OFDMA data unit, according to another embodiment.

FIG. 4 is a diagram of an example OFDMA data unit 350, according to another embodiment. The OFDMA data unit 350 is similar to the OFDMA data unit 300 of FIG. 3 accept that the OFDMA data unit 350 includes an OFDMA data unit 302-4 formatted according to a legacy communication protocol that does not support OFDMA communication (e.g., the IEEE 802.11ac Standard).

In an embodiment, the AP 14 forms OFDMA groups of client stations 25, and informs the client stations 25 that the client stations 25 are members of particular OFDMA groups. For example, in an embodiment, the AP assigns a group number to an OFDMA group of client stations 25, and transmits a management or a control frame that signals the group ID number to the client stations 25 that belong to the OFDMA group. For example, the management or control frame includes the group ID number and a respective unique identifier of each of the client stations 25 that belongs to the group, in an embodiment. In an embodiment, the AP 14 allocates respective OFDM sub-channels to client stations 25 that belong to an OFDMA group, and provides channel allocation information to the client stations 25 of the OFDMA group. The client stations 25 of the OFDMA group subsequently receive data in the respective OFDM sub-channels allocated to the client stations 25 when the data is transmitted to the client stations 25 in an OFDMA transmission from the AP 14 to the client stations 25, in an embodiment and/or scenario. In another embodiment and/or scenario, the client stations 25 of the OFDMA group subsequently transmit respective data as part of an OFDMA transmission to the AP 14 by transmitting the data in the respective OFDM sub-channels allocated to the client stations 25 by the AP 14.

Figure 5A:
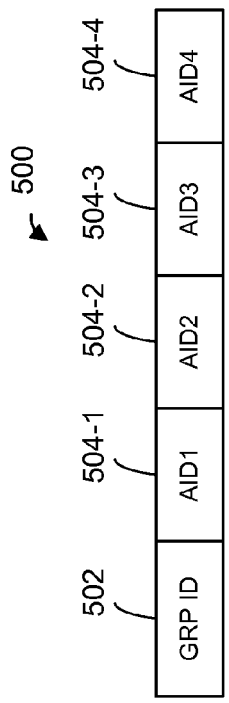
FIG. 5A is an example group definition field, according to an embodiment.

FIG. 5A is an example group definition field 500, according to an embodiment. In an embodiment, the group definition field 500 is included in a management or a control frame that the AP 14 transmits to client stations 25. The group definition field 500 includes a group identifier (group ID) subfield 502 and one or more association identifier (AID) subfields 504. The AID subfields 504 include as many subfields as there are client stations 25 assigned to an OFDMA group identified by the group ID subfield 502. For example, as shown in FIG. 5A, the AID subfields 504 include a first AID (AID1) subfield 504-1, a second AID (AID2) subfield 504-2, a third AID (AID3) subfield 504-3, and a fourth AID (AID4) subfield 504-4. In one embodiment, the group definition field 500 is generated by the host processor 15 (e.g., by a management processing unit of the host processor 15). In another embodiment, at least one of the AID subfields 504, and/or information included therein, are generated at least in part by the MAC processing unit 18.

Each of the AID subfields 504 includes an AID of one of the client stations 25 that the AP 14 has assigned to the OFDMA group identified by the group ID subfield 502. Each one of the client stations 25 is configured to receive the entire group definition field 500 and, after detecting its own AID within one of the AID subfields 504, determine that the particular client station 25 is a member of the OFDMA group identified by the group ID subfield 502. In an embodiment, each client station 25 further determines, based on the placement of its own AID relative to the AIDs of the other client stations 25 in the AID subfields 164, the order in which its own channel allocation information, relative to channel allocations for the other client stations 25.

For example, the client station 25-2 detects the first AID subfield 504-1 and determines that the AID in the first AID subfield 504-1 does not match the AID of the client station 25-2. The client station 25-2 then detects the second AID subfield 504-2 and determines that the AID in the second AID subfield 504-2 matches the AID of the client station 25-2. The client station 25-2 therefore determines that it is a member of the OFDMA group identified by the group ID subfield 502, and further determines that its unique index value is the number two, i.e., that the channel allocation information corresponding to the client station 25-2 will be second in order of receipt when channel allocation information is received by the client station 25-2, for example as part of a signal field of an OFDMA data unit directed to the OFDMA group.

Figure 5B:
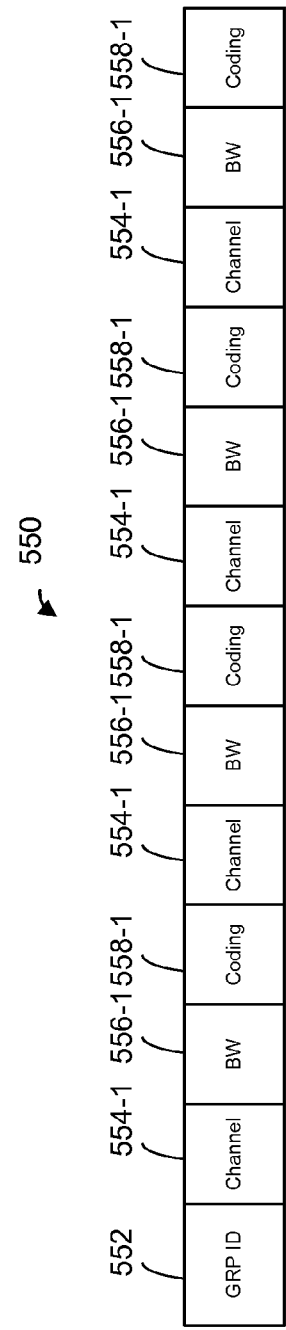
FIG. 5B is a diagram of a channel allocation field for providing channel allocation information to members of an OFDMA group, according to an embodiment.

FIG. 5B is a diagram of a channel allocation field 550 for providing channel allocation information to members of an OFDMA group, according to an embodiment. In an embodiment, the cannel allocation field 550 is included in the HEW-SIGA field 310 of the OFDMA data unit 300 of FIG. 4. The channel allocation field 550 includes a group identifier (group ID) subfield 552, one or more channel position subfields 554 and corresponding one or more channel bandwidth subfields 556, each channel position subfield 554 and corresponding channel bandwidth subfield 556 indicating a channel position and a channel bandwidth, respectively, allocated for a particular member of the OFDMA group identified by the group ID subfield 552. In particular, in an embodiment, each channel position subfield 554 identifies a 20 MHz channel position, within the WLAN 10, allocated to a particular client station in the OFDMA group identified by the OFDMA group subfield 552. For example, for an 80 MHz WLAN 10 composed of four non-overlapping 20 MHz sub-channels, each channel position subfield 554 includes two bits, wherein the binary value of 00 of the two bits indicates the lowest 20 MHz sub-channel, the binary value of 01 of the two bits indicates the second lowest sub-channel 20 MHz channel, the binary value of 10 of the two bits indicates the second highest 20 MHz channel and the of the two bits binary value of 11 of the two bits indicates the highest 20 MHz channel, in an embodiment. Similarly, in an embodiment, each channel bandwidth subfield 556 indicates a bandwidth allocated to a particular member of the OFDMA group identified by the OFDMA group subfield 552, in an embodiment. For example, each channel bandwidth subfield 556 includes two bits, wherein the binary value of 00 of the two bits indicates a 20 MHz bandwidth, the binary value of 01 of the two bits indicates a 40 MHz bandwidth, the binary value of 10 of the two bits indicates 80 MHz bandwidth and the binary value of 11 of the two bits indicates 160 MHZ or a non-contiguous 80+80 MHz bandwidth, in an embodiment.

In some embodiments, sub-channel allocating with granularity of less than 20 MHz is utilized. For example, the AP 14 is configured to allocate sub-channels having bandwidths less than 20 MHz, such as 10 MHz sub-channels, 5 MHz sub-channels, 1 MHz sub-channels, or other suitable bandwidth sub-channels to at least some of the client stations 25. Each of one or more of the channel position subfields 554 and corresponding one or more of the channel bandwidth subfields 556 include greater than two bits to accommodate the higher sub-channel granularity, in such embodiments.

In an embodiment, non-legacy client stations 25 are configured to receive the channel allocation field 550 in the primary channel of the WLAN 10. For example, the non-legacy client stations 25 receive the channel allocation field as part of a signal field of an OFDMA data unit (e.g., HEW-SIGA field 410 of FIG. 4) in the primary channel of the WLAN 10. For example, the signal field includes a channel allocation field such as the channel allocation field 550 of FIG. 5B, in an embodiment. A non-legacy client station 25 is configured to determine, based on the group ID subfield 552 of the channel allocation field 550 whether the client station 25 is a member of the OFDMA group to which the OFDMA data unit is directed, in an embodiment. Further, if the client station 25 determines that the client station 25 belongs to the OFDMA group to which the OFDMA data unit is directed, the client station 25 determines a position and bandwidth of the sub-channel allocated to the client station 25 based on the channel position subfield 554 and channel bandwidth subfield 556, respectively, corresponding to the client station 25, in an embodiment. In particular, the client station 25 determines the channel position and bandwidth allocated to the client station 25 based on the channel position subfield 554 and the channel bandwidth subfield 556 corresponding to the unique value that the client station 25 determined based on a group definition field, such as the group definition field 500 of FIG. 5, previously received by the client station 25, in an embodiment.

In another embodiment, the signal field includes an identifier, such as an AID or a partial AID, corresponding to each client station 25 to which the OFDMA data unit is directed. In this embodiment, the signal field omits a group ID. For example, the signal field includes a channel allocation field similar to the channel allocation field 550 of FIG. 5B, except that the channel allocation field omits the Group ID field 552. In this embodiment, a client station 25 determines whether the client station 25 is an intended recipient of a portion of an OFDMA data unit based on detecting its identifier in the signal field of the OFDMA data unit.

Upon determining the allocated channel position and bandwidth for a client station 25, the client station 25 tunes to the determined channel and channel bandwidth for receiving the particular OFDM data unit, within the OFDMA data unit, that is directed to the client station 25, in an embodiment. For example, with reference to FIG. 3, after receiving the HEW-SIGA field 310 in the primary channel of the WLAN 10 and determining, based on a channel allocation field (e.g., the channel allocation field 550 of FIG. 5B) included in the HEW-SIGA field 310, that the second highest 20 MHz sub-channel is allocated to the client station 25-2, the client station 25-2 tunes to the second highest 20 MHz channel and receives remainder of the OFDMA data unit 300 in the second highest 20 MHz sub-channel, i.e. the portion of the OFDMA data unit 300 corresponding to the OFDM data unit 302-2 directed to the client station 25-2, in an example embodiment.

Figure 6:
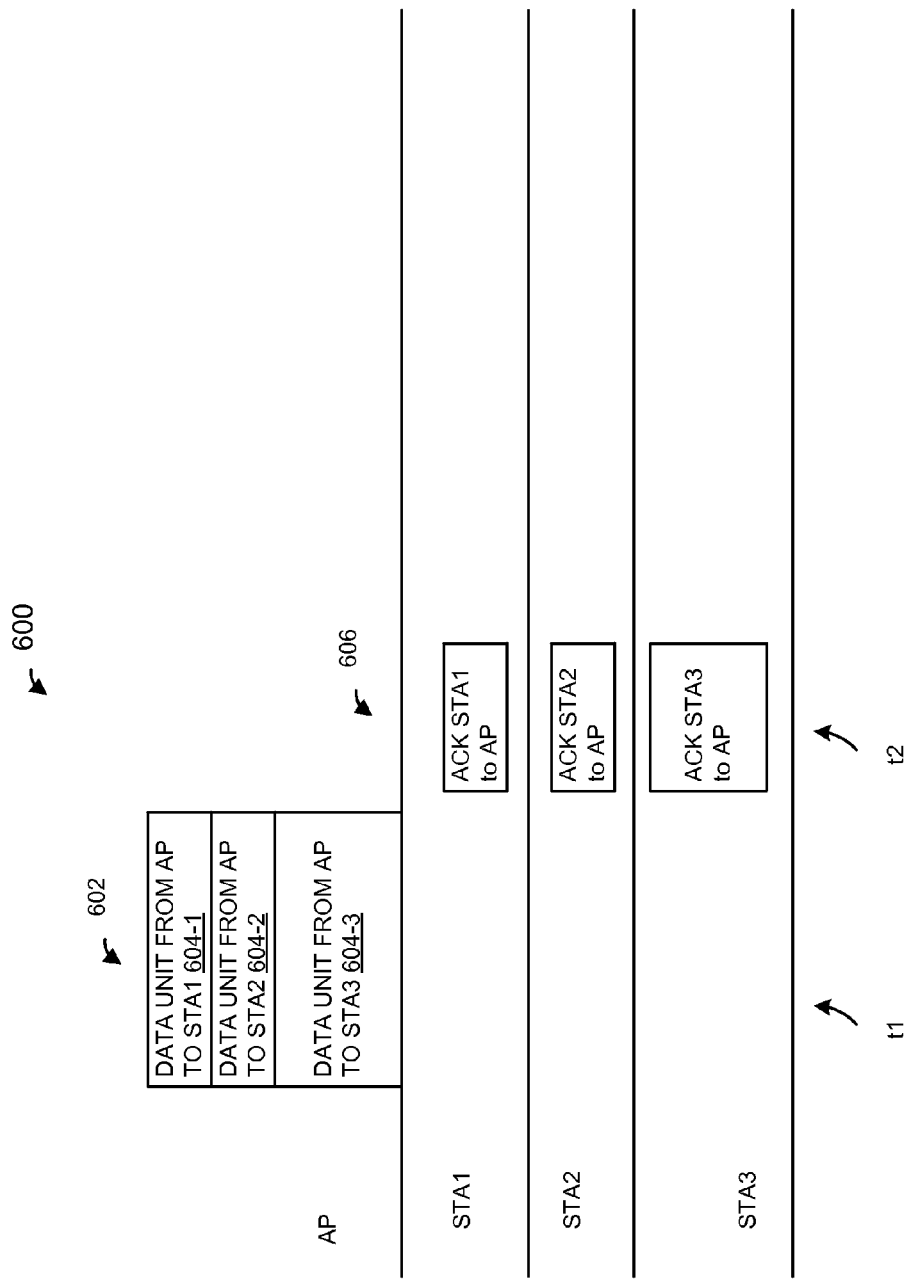
FIG. 6 is diagram illustrating a frame exchange between an AP and multiple client stations, according to an embodiment.

FIG. 6 is diagram illustrating a frame exchange 600 between an AP (e.g., the AP 14) and multiple client stations (e.g., multiple client stations 25), according to an embodiment. During a time t1, the AP 14 transmits an OFDMA data unit 602 directed to a plurality of client stations. The OFDMA data unit 600 occupies an 80 MHz channel, in the illustrated embodiment. In an embodiment, the data unit 600 is the same as or similar to the data unit 300 of FIG. 3. In an embodiment, prior to transmission of the OFDMA data unit 602, the AP 14 conducts a suitable channel assessment procedure, such as a carrier sense multiple access with collision avoidance procedure (CSMA/CA) procedure, and based on the channel assessment procedure determines a bandwidth available for transmission by the AP 14. In an embodiment, the OFDM channel includes the primary channel of the WLAN 10 and one or more secondary channels of the WLAN 10. For example, the AP 14 determines that the primary 20 MHz channel and three secondary 20 MHz channels of the WLAN 10 are available for 80 MHz transmission by the AP 14, in the illustrated embodiment.

In an embodiment, the OFDMA data unit 602 includes a plurality of OFDM data units 604 directed to respective client stations 25, each OFDM data unit 604 transmitted in a respective sub-channel of the WLAN 10 to a particular client station 25. In particular, a first OFDM data unit 602-1 is directed to a first client station STA1 (e.g., the client station 25-1), a second OFDM data unit 602-2 is directed to a second client station STA2 (e.g., the client station 25-2), and a third OFDM data unit 602-3 is directed to a third client station STA3 (e.g., the client station 25-3), in the illustrated embodiment. In an embodiment, the first OFDM data unit 602-1 occupies the highest 20 MHz sub-channel of the 80 MHz channel, the second OFDM data unit 602-3 occupies the second highest 20 MHz sub-channel of the 80 MHz channel, and the third OFDM data unit 602-3 is transmitted in a 40 MHZ sub-channel that includes the lowest two 20 MHZ sub-channels of the 80 MHz channel.

In an embodiment, the preamble of the OFDMA data unit 600 is transmitted in each of the 20 MHz sub-channels occupied by the OFDMA data unit 602. In an embodiment, the preamble of the OFDMA data unit 600 includes a channel allocation field (e.g., in a signal field of the preamble such as the HEW-SIGA field of the preamble) that indicates to the client stations 25 to which the OFDMA data unit 600 is directed that the client station 25 are intended recipients of different portions of the OFDMA data unit 600. In an embodiment, the channel allocation field includes a group number corresponding to an OFDMA group that includes the client stations 25 to which the OFDMA data unit 602 is directed. In another embodiment, the channel allocation field identifies each client station to which the OFDMA data unit 600 is directed by including an identifier, such as an AID or a partial AID, corresponding to the client station 25. The channel allocation field included in the preamble omits a group ID subfield, in this embodiment. The channel allocation field also indicates to each of the client stations 25 which portion (e.g., which sub-channel block) of the OFDMA data unit 600 contains data directed to the client station 25, in an embodiment. For example, the channel allocation field indicates to each of the client stations 25 a channel position and bandwidth that includes an OFDM data unit directed to the client station 25, in an embodiment. In an embodiment, the preamble of the OFDMA data unit 602 includes the channel allocation field 550 of FIG. 5B. In another embodiment, the preamble of the OFDMA data unit 602 includes a suitable channel allocation field other than the channel allocation field 550 of FIG. 5B. The channel allocation field indicates that the highest 20 MHz channel of the 80 MHz channel is allocated to the client station STA1, the second highest 20 MHz channel of the 80 MHz channel is allocated to the client station STA2, and the two lowest 20 MHz channels of the 80 MHz channel are allocated to the client station STA3, in the illustrated embodiment.

Each of the client stations 25 receives the channel allocation field in the primary channel of the WLAN 10 (e.g., in the lowest 20 MHz channel) and determines, based on the channel allocation field, which channel of the WLAN 10 includes data directed to the client station 25, respectively, in an embodiment. The client stations 25 tune to the appropriate sub-channels indicated in the channel allocation field and receive data directed to the client stations 25 via the respective sub-channels allocated to the client station 25. During a time t2, in an embodiment, client stations 25 that successfully receive data in the respective sub-channels allocated to the client stations 25 transmit respective acknowledgement (ACK or BlkAck) frames 606 to the AP 14. In an embodiment, each client station 25 transmits its acknowledgement (ACK or BlkAck) frame 606 in the respective sub-channel allocated to the client station 25. In an embodiment, the AP 14 synchronizes transmission of the ACK frames 606 from the client stations 25 by ensuring that the OFDM data units 604-1, 604-2, 604-3 are of equal length. For example, the AP adds padding bits (e.g., bits having predetermined values such as zero bits or one bits) to data bits in one or more of the data units 604 to equalize lengths of the data units 604, in an embodiment. For example, in an embodiment in which the OFDM data units 604-1, 604-2, 604-3 are A-MPDUs, and the AP 14 utilizes A-MPDU padding in one or more of the data units 604-1, 604-2, 604-3 to ensure that the data units 604-1, 604-2, 604-3 are of the same length. As another example, in an embodiment in which the OFDM data units 604-1, 604-2, 604-3 are MPDUs, and the AP 14 utilizes MPDU padding in one or more of the data units 604-1, 604-2, 604-3 to ensure that the data units 604-1, 604-2, 604-3 are of the same length.

In another embodiment, the ACK frames 606 are not simultaneously transmitted by the client stations 25. For example, transmission of the ACK frames 506 is staggered among the client stations 25, in an embodiment. For example, the AP provides to the client stations 25 indications of different specific times at which to transmit their respective ACK frames 606, or a specific order in which to transmit their respective ACK frames 606, and the client stations 25 transmit the ACK frames 606 at the specific times or in the specific order indicated by the AP, in an embodiment.

In an embodiment, the ACK frames 606 are block acknowledgement (Blk Ack) frames that indicate successful or unsuccessful reception of a plurality of data units, such as of a plurality of data units aggregated in the corresponding A-MPDU 602. Generally speaking, as used herein, the terms "acknowledgement frame" and "ACK frame" are used interchangeably and encompass both an acknowledgement frame that acknowledges successful or unsuccessful receipt of a single data unit, and a block acknowledgement frame that acknowledges successful or unsuccessful receipt of multiple data units (e.g., multiple data units transmitted as parts of an aggregated data unit).

In some embodiments, the AP 14 transmits a control frame, such as a scheduling frame, to the client stations 25 prior to transmission of an OFDMA data unit to the client stations 25. In an embodiment, the control frame that the AP 14 transmits to the client stations 25 prior to transmission of an OFDMA data unit to the client stations 25 is a legacy (e.g., an IEEE 802.11 a or an IEEE 802.11 g) duplicate control frame that is replicated in each smallest bandwidth band (e.g., each 20 MHz band) of the WLAN 10. In an embodiment, the AP 14 transmits the control frame at the beginning of a transmission opportunity (TXOP) to inform the client stations 25 whether the client stations 25 are to receive data from the AP 14 and/or are to transmit data to the AP 14 during the TXOP. The control frame includes downlink and/or uplink channel allocation information that indicates to the client stations 25 that are to receive and/or transmit data which sub-channels to use for reception and/or transmission of data, in an embodiment. In an embodiment, the client stations 25 are configured to determine their respective downlink sub-channels based on downlink channel allocation information included in the control frame and to subsequently receive, via the downlink sub-channels, data from the AP 14 simultaneously with the other client stations 25 as part of a downlink OFDMA transmission from the AP 14. Similarly, the client stations 25 are configured to determine their respective uplink channels based on uplink channel allocation information included in the control frame and to subsequently transmit data to the AP 14 simultaneously with the other client stations 25 as part of an uplink OFDMA transmission to the AP 14, in an embodiment.

In at least some embodiments in which the AP 14 transmits a control frame to the client stations 25 to signal downlink channel allocation to the client stations 25 for a downlink OFDMA transmission to the client stations 25, such channel allocation information need not be included in a preamble of each of the OFDM data unit transmitted as part of the OFDMA transmission. In one such embodiment, the preamble of each data unit in an OFDMA transmission is generally the same as a preamble used for regular OFDM transmission to single client station 25. For example, with reference to FIGS. 3 and 4, the signal field 310 of each of the data units 302 is the same as a HEW-SIGA field of a data unit transmitted as a regular transmission to a single client station 25. In another embodiment, the preamble of each OFDM data unit included in the OFDMA transition is substantially the same as a preamble used for regular OFDM transmission to single client station 25, but includes an indication that the OFDM data unit is part of an OFDMA transmission to multiple client stations 25. For example, with reference to FIGS. 3 and 4, one or more bits of the signal field 310 is/are set to indicate that the OFDM data units 302 are part of an OFDMA transmission, in an embodiment.

Figure 7A:
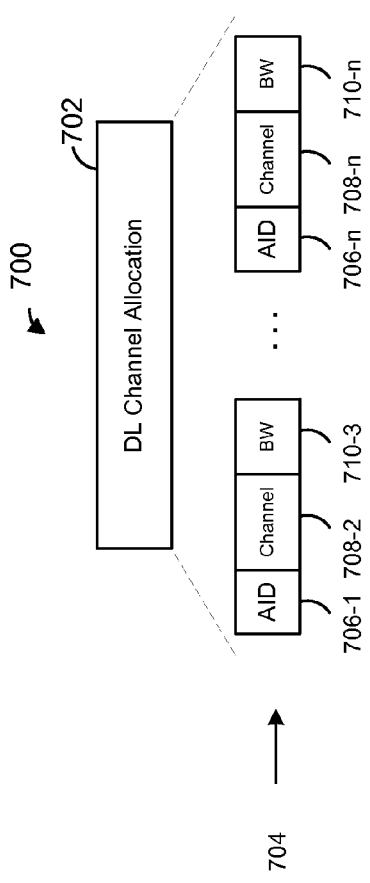
FIG. 7A is an example of an OFDMA downlink scheduling element, according to an embodiment.

FIG. 7A is an example of an OFDMA downlink scheduling element 700, according to an embodiment. The OFDMA downlink scheduling element 700 is included in a control frame, such as a scheduling frame, that the AP 14 transmits to client stations 25 to provide channel allocation information to the client stations 25, in an embodiment. The OFDMA downlink scheduling element 700 includes a downlink channel allocation field 702 which, in turn, includes a plurality of user subfields 704. Each user field 704 corresponds to a particular client station 25 and includes downlink channel allocation information for the particular station 25, in an embodiment. For example, each user field 704 includes a station identifier subfield 706, a channel subfield 708 and a bandwidth subfield 710. The channel identifier subfield 706 includes an identifier, such as an AID or a partial AID, corresponding to a client station 25, in an embodiment. The channel subfield 708 identifies a channel position, within the WLAN 10, corresponding to a sub-channel allocated to the client station identified in the identifier subfield 706. For example, in an embodiment in which the channel allocation subfield indicates channel allocation within an 80 MHz channel composed of four non-overlapping 20 MHz sub-channels, the channel subfield 708 includes two bits, wherein the binary value of 00 of the two bits indicates the lowest 20 MHz sub-channel, the binary value of 01 of the two bits indicates the second lowest 20 MHz sub-channel, the binary value of 10 of the two bits indicates the second highest 20 MHz sub-channel and the of the two bits binary value of 11 of the two bits indicates the highest 20 MHz sub-channel, in an embodiment. Similarly, the bandwidth subfield 710 corresponding to a client station 25 indicates bandwidth allocated to the client station 25, in an embodiment. For example, the bandwidth subfield 710 includes two bits, wherein the binary value of 00 of the two bits indicates a 20 MHz bandwidth, the binary value of 01 of the two bits indicates a 40 MHz bandwidth, the binary value of 10 of the two bits indicates 80 MHz bandwidth and the binary value of 11 of the two bits indicates 160 MHZ or a non-contiguous 80+80 MHz bandwidth, in an embodiment. In at least some embodiments, each user field 704 includes one or more additional sub-fields to indicate additional information, such as, for example, an indication of a modulation and coding scheme (MCS) to be used for the user in the downlink OFDMA transmission, transmission power to be used for the user in the downlink OFDMA transmission, etc.

In some embodiments, sub-channels with granularity less than 20 MHz are utilized. For example, the AP 14 is configured to allocate sub-channels having bandwidths less than 20 MHz, such as 10 MHz sub-channels, 5 MHz sub-channels, 1 MHz sub-channels, or other suitable bandwidth sub-channels, to at least some of the client stations 25, in some embodiments. Each of one or more of the channel position subfields 708 and corresponding one or more of the channel bandwidth subfields 710 include greater than two bits to accommodate the higher sub-channel granularity, in such embodiments.

Figure 7B:
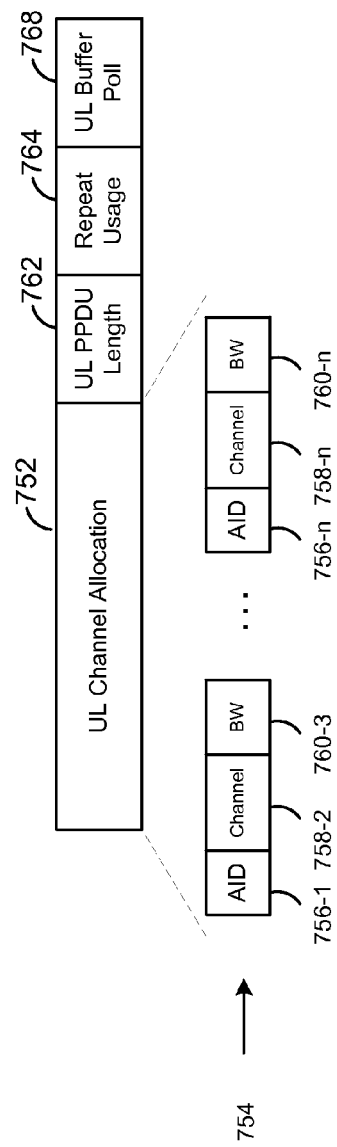
FIG. 7B is an example of an OFDMA uplink scheduling element, according to an embodiment.

FIG. 7B is an example of an OFDMA uplink scheduling element 750, according to an embodiment. The OFDMA uplink scheduling element 750 is similar to the OFDMA downlink element 700 of FIG. 7A, except that the OFDMA uplink scheduling element 750 indicates channel allocation for uplink transmission, in an embodiment. The OFDMA uplink scheduling element 750 is included in a control frame, such as a scheduling frame, that the AP 14 transmits to client stations 25 to provide uplink channel allocation information to the client stations 25, in an embodiment.

Similar to the OFDMA downlink scheduling element 700, the OFDMA uplink scheduling element 750 includes a channel allocation field 752 which, in turn, includes a plurality of user fields 754. Each user field 754 corresponds to a particular client station 25 and includes uplink channel allocation information for the particular station 25, in an embodiment. In an embodiment, each user field 754 includes a station identifier subfield 756, a channel subfield 758 and a bandwidth subfield 760. In at least some embodiments, each user field 754 includes one or more additional subfields to indicate additional information, such as, for example, an indication of a modulation and coding scheme (MCS) to be used by the user in the uplink OFDM transmission, transmission power to be used by the user in the uplink OFDM transmission, etc. In an embodiment, the station identifier subfields 756, a channel subfields 758 and a bandwidth subfields 760 are the same as or similar to the station identifier subfields 706, a channel subfields 708 and a bandwidth subfields 710 described with respect to the OFDMA downlink scheduling element 700 of FIG. 7A. Additionally, in some embodiment, the OFDMA uplink scheduling element 750 includes one or more of an uplink length field 762, a repeat usage field 764 and an uplink buffer poll field 768 to be described in more detail below. In some embodiment, the OFDMA uplink scheduling element 750 omits one or more of the uplink length field 762, the repeat usage field 764 and the uplink buffer poll field 768.

Figure 8A:
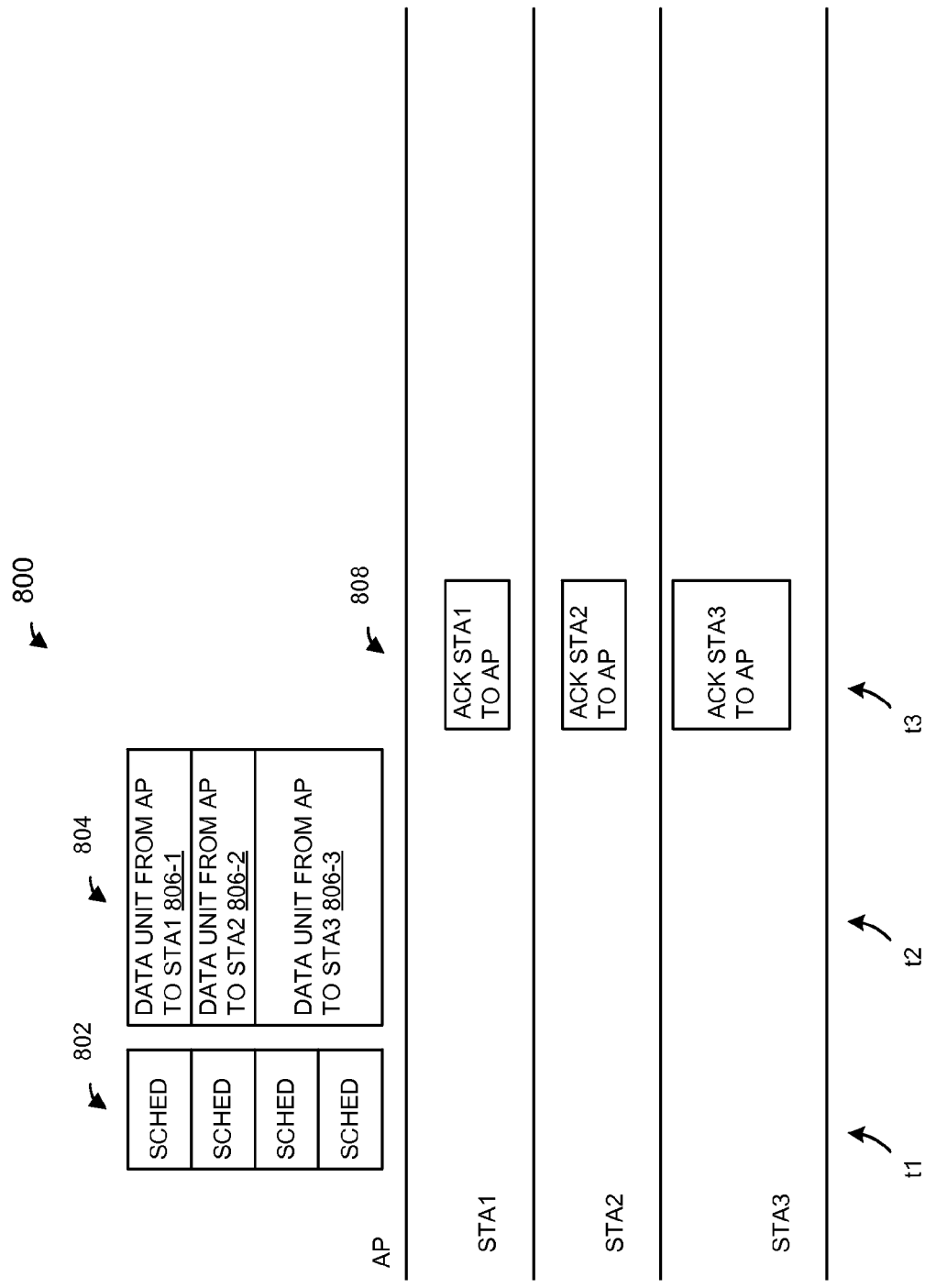
FIG. 8A is a frame exchange between an AP and a plurality of client stations that includes downlink OFDMA transmission of data from the AP to the plurality client stations, according to an embodiment.

FIG. 8A is a frame exchange 800 between the AP 14 and a plurality of client stations 25, according to another embodiment. During a time t1, the AP 14 transmits a scheduling frame 802 to a plurality of client stations 25. In an embodiment, the time t1 begins at the beginning of a TXOP obtained by (e.g., based on a suitable channel assessment procedure, such as CSMA/CA) or scheduled by the AP 14. In an embodiment, the scheduling frame 802 provides OFDMA downlink scheduling information to the plurality of client stations 25. In particular, in an embodiment, the scheduling frame 802 includes downlink channel allocation information to be used for transmission of downlink OFDMA data units during the TXOP. In an embodiment, the scheduling frame 802 includes the OFDMA downlink scheduling element 700 of FIG. 7. In other embodiments, the scheduling frame 802 provides downlink channel allocation information in other suitable manners.

In an embodiment, the scheduling frame 802 is a control frame. In an embodiment, the scheduling frame 802 is a non-data packet (NDP) frame that omits a PHY payload. In one embodiment in which the scheduling frame 802 in an NDP frame, MAC layer information, e.g., the MAC address of the receiving device, the MAC address of the transmitting device, etc., is included in a signal field of a PHY preamble of the scheduling frame 802. In an embodiment and/or scenario, the uplink scheduling frame 802 is duplicated in each smallest bandwidth portion (e.g., in each 20 MHz) of the entire bandwidth of the TXOP. In another embodiment and/or scenario, the scheduling frame 802 occupies the entire bandwidth of the TXOP, for example when each of the client stations 25 to which the scheduling frame 902 is transmitted is capable of operating in the entire bandwidth of the TXOP. In another embodiment and/or scenario, the uplink scheduling frame 902 is a legacy control frame duplicated in every smallest bandwidth portion of the entire bandwidth of the TXOP so as to protect the TXOP from transmissions by client stations 25 that are not intended participants in the TXOP. For example, in an embodiment, if the entire bandwidth of the TXOP is 160 MHz, then the scheduling frame 902 is duplicated in each 20 MHz portion of the 160 MHz channel, in an embodiment. Client stations 25 that are not intended participants in the TXOP determine duration of the TXOP based on a length or duration indicated by the scheduling frame 1102 and defer medium access for the determined duration, in an embodiment.

The scheduling frame 802 indicates respective sub-channels allocated for downlink OFDA transmission to three client stations 25 (STA1, STA2 and STA3), in the illustrated embodiment. For example, the scheduling frame 802 indicates channel allocation within an 80 MHz channel, and indicates that (i) the highest 20 MHz sub-channel of the 80 MHz channel is allocated to STA1, (ii) the second highest 20 MHz sub-channel of the 80 MHz channel is allocated to STA2 and (iii) a 40 MHz sub-channel that includes the second lowest 20 MHz sub-channel and the lowest 20 MHz sub-channel is allocated to STA3, in an embodiment. In an embodiment, the client stations STA1, STA2 and STA3 is each a non-legacy client station enabled for OFDMA communication. For example, the client stations STA1, STA2 and STA3 correspond to non-legacy client stations 25-1, 25-2 and 25-3, respectively, in an embodiment. In another embodiment, at least one of the client stations STA1, STA3 and STA3 is a legacy client station that is not enabled for OFDMA communication. For example, the client stations STA1 and STA2 respectively correspond to non-legacy client stations 25-1 and 25-2, while the STA3 corresponds to the legacy client stations 25-4, in another embodiment.

During a time t2, the AP 14 transmits an OFDMA data unit 804 directed to the plurality of client stations 25. The OFDMA data unit 804 includes respective OFDM data units 806 transmitted to each of the client stations 25 in respective sub-channels allocated to the client station 25. Time t2 begins upon expiration of a predetermined time interval, such as a time interval corresponding to a short inter-frame space (SIFS), after the end of time t1, i.e., after completion of transmission of the scheduling frame 802, in an embodiment.

In an embodiment in which the scheduling frame 802 is directed to a plurality of non-legacy client stations 25 enabled for OFDMA communication, each of the client stations 25 determines, based on the scheduling frame 802, the particular sub-channel and sub-channel bandwidth allocated to the client station 25. The client station 25 then tunes to the sub-channel allocated to the client station 25, and receives the OFDM data unit 806 directed to the client station 25 in the sub-channel allocated to the client station 25, in an embodiment.

In an embodiment, if the data unit 804 is directed to a plurality of client stations 25 that includes a legacy client station 25, then the AP 14 allocates the primary channel of the WLAN 10, or a wider channel that includes the primary channel of the WLAN 10, to the legacy station 25. In this example scenario, the non-legacy client stations 25 determine the respective sub-channels allocated to the non-legacy station 25 based on channel information included in the scheduling frame 802, and tune to the allocated sub-channels for reception of their respective OFDM data units 806 within the OFDMA data unit 804. The legacy client station 25, on the other hand, receives the OFDM data unit 806 directed to the legacy client station 25 in the primary channel of the WLAN 10, or in a channel that includes the primary channel of the WLAN 10, in this embodiment. Thus, the legacy client station 25 need not be enabled to decode and interpret channel allocation information in the scheduling frame 802, in an embodiment. The legacy client station 25 receives the OFDM data unit 806 directed to the client station 25 without knowledge that the OFDM data unit 806 is transmitted simultaneously with the other OFDM data units 806 and as a part of the OFDMA data unit 804, in an embodiment.

During a time t3, each client station 25 that successful receives the OFDM data unit 806 directed to the client station 25 transmits an acknowledgement (ACK) frame 808 to the AP 14 as part of an OFDMA transmission to the AP 14, in the illustrated embodiment. Time t3 at each client station 25 begins upon expiration of a predetermined time interval, such as for example a time interval corresponding to a short inter-frame space (SIFS), after completion of reception, at the client station 25, of the data unit 806 directed to the client station 25. In an embodiment, each client station 25 transmits its ACK frame 808 in the respective channel allocated to the client station 25 indicated in the scheduling frame 802. In an embodiment, the AP 14 synchronizes transmission of the ACK frames 808 from the client station 25 by ensuring that the OFDM data units 806 are of equal length. In an embodiment, the AP adds padding bits (e.g., bits having predetermined values such as "zero" bits or "one" bits) to data bits of one or more of the data units 806 to equalize lengths of the data units 806. For example, in an embodiment in which the OFDM data units 806 are A-MPDUs, and the AP 14 utilizes A-MPDU padding in one or more of the data units 806 to ensure that the data units 806 are of the same length. As another example, in an embodiment in which the OFDM data units 806-1, 806-2, 806-3 are MPDUs, and the AP 14 utilizes MPDU padding in one or more of the data units 806-1, 806-2, 806-3 to ensure that the data units 806-1, 806-2, 806-3 are of the same length.

In another embodiment, the ACK frames 808 are not simultaneously transmitted by the client stations 25. For example, transmission of the ACK frames 808 is staggered among the client stations 25, in an embodiment. For example, the AP provides to the client stations 25 indications of different specific times at which to transmit their respective ACK frames 808, or a specific order in which to transmit their respective ACK frames 708, and the client stations 25 transmit the ACK frames 808 at the specific times or in the specific order indicated by the AP, in an embodiment. In an embodiment, the ACK frames 808 are block acknowledgement (Blk Ack) frames that indicate successful or unsuccessful reception of a plurality of data units, such as of a plurality of data units aggregated in the corresponding A-MPDU 702.

Figure 8B:
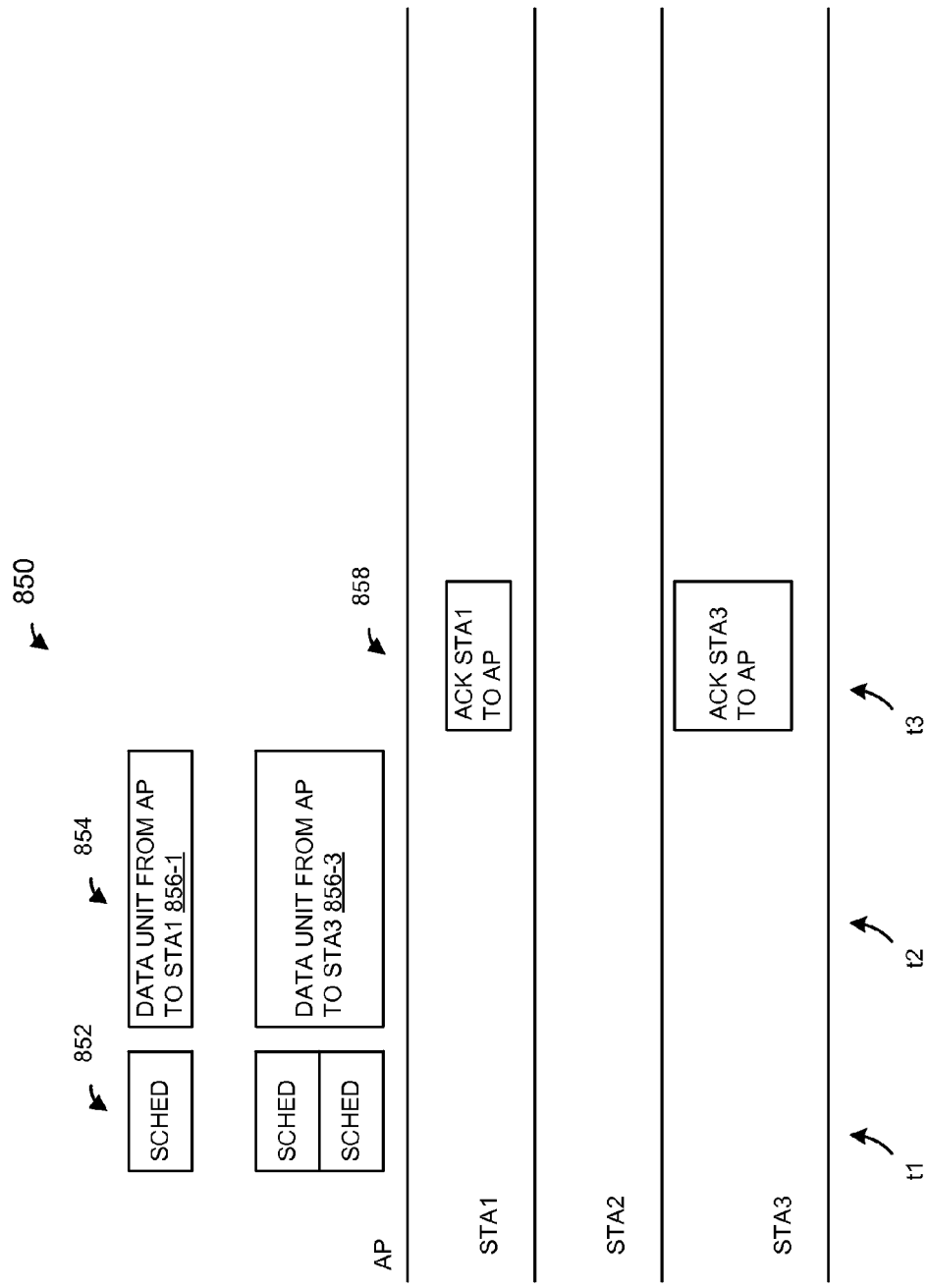
FIG. 8B is a frame exchange between an AP and a plurality of client stations that includes downlink OFDMA transmission of data from the AP to the plurality client stations, according to another embodiment.

FIG. 8B is a frame exchange 850 between the AP 14 and a plurality of client stations 25, according to another embodiment. The frame exchange 850 is generally similar to the frame exchange 800 of FIG. 8A except that in the frame exchange 850, a scheduling frame 852 indicates noncontiguous channel allocation to a plurality of client stations 25. In an embodiment, prior to transmitting the scheduling frame 852, the AP 14 detects that a particular sub-channel is currently not available (e.g., busy). For example, the AP 14 detects that the second highest 20 MHz sub-channel of the 80 MHz channel is busy, while the remaining 20 MHz sub-channels of the 80 MHz are available. Then, during a time t1, the AP 14 transmits the scheduling frame 852 on each of the available sub-channels of the 80 MHz channel. The scheduling frame 852 is similar to the scheduling frame 802 except that the scheduling frame 852 indicates channels allocated to STA1 and STA3, but nor STA2, in the illustrated embodiment. In particular, the scheduling frame 852 indicates that (i) the highest 20 MHz sub-channel of the 80 MHz channel is allocated to STA1, and (ii) a 40 MHz sub-channel that includes the second lowest 20 MHz sub-channel and the lowest 20 MHz sub-channel is allocated to STA3, in an embodiment. In another embodiment, a signal field (e.g., the HEW-SIGA field) of the OFDMA data unit 854, rather than the scheduling frame 852, includes noncontiguous channel allocation indications. For example, the OFDMA data unit 854 is similar to the OFDMA data unit 602 of FIG. 6, except that the signal field of the OFDMA data unit 854 indicates noncontiguous channel allocation, in some embodiments. In some such embodiments, the frame exchange 850 omits transmission of the scheduling frame 852.

During a time t2, the AP 14 transmits an OFDMA data unit 854 that includes respective OFDM data units 856 directed to each of two client stations STA1 and STA3. In an embodiment, the OFDM data units 856 are transmitted to the client stations STA1 and STA3 in the respective noncontiguous channels allocated to the client station STA1 and STA3. During a time t3, each of the client stations STA1 and STA3 that successful receives the OFDM data unit 856 directed to the client station STA1, STA3 transmits an acknowledgement (ACK) frame 858 to the AP 14 as part of an OFDMA transmission to the AP 14, in the illustrated embodiment. In an embodiment, each client station STA1, STA3 transmits its ACK frame 858 in the respective channel allocated to the client station STA1, STA3 indicated in the scheduling frame 852.

Figure 9A:
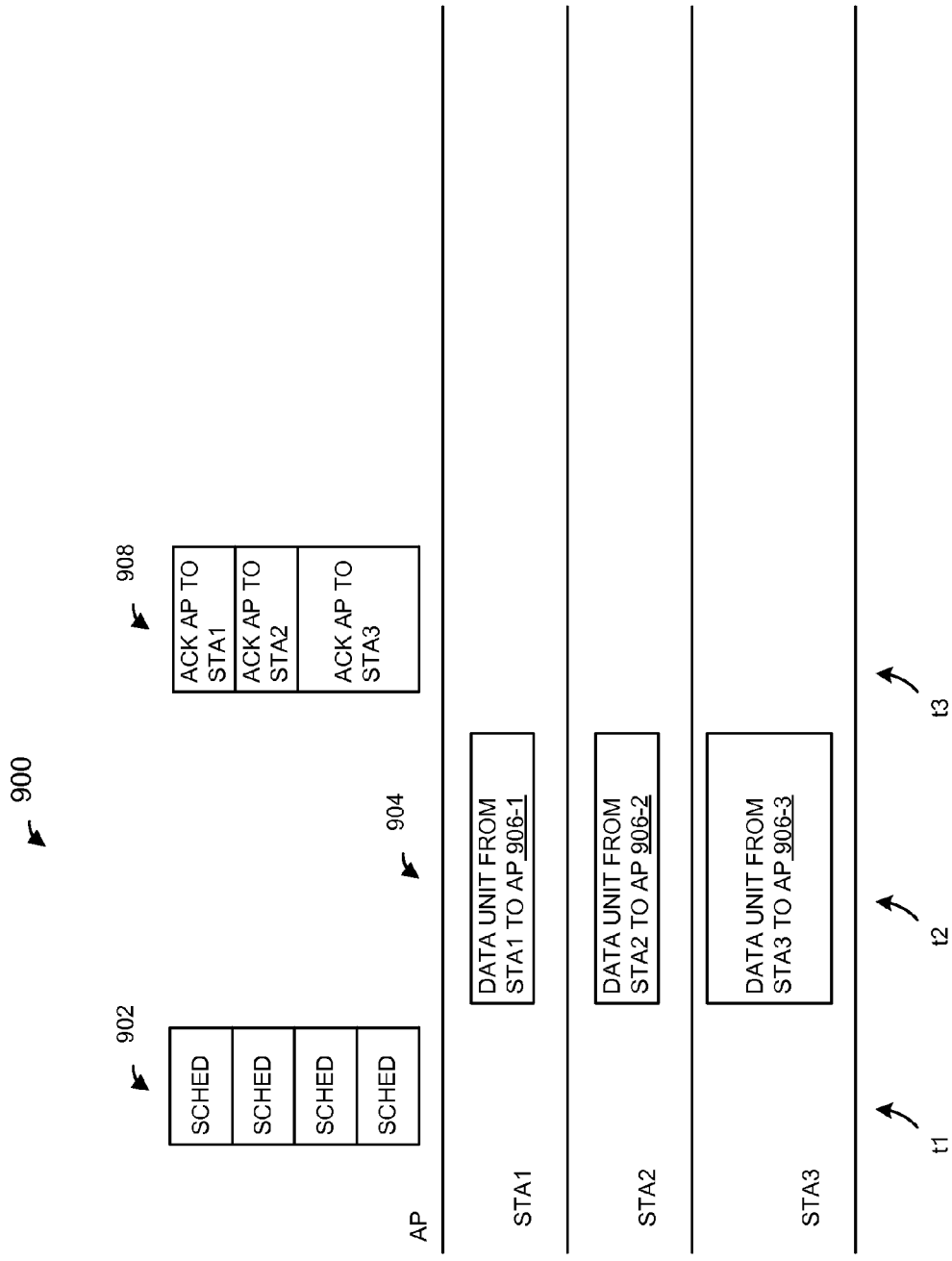
FIG. 9A is a frame exchange between an AP and a plurality of client stations that includes uplink OFDMA transmission of data from the plurality client stations to the AP, according to an embodiment.

FIG. 9A is a diagram of a frame exchange 900 between the AP 14 and a plurality of client stations 25, according to another embodiment. During a time t1, the AP 14 transmits an uplink scheduling frame 902 to a plurality of client stations 25. In an embodiment, the time t1 begins at the beginning of a TXOP obtained by (e.g., based on a suitable channel assessment procedure, such as CSMA/CA), or scheduled for, the AP 14. In an embodiment, the uplink scheduling frame 902 provides, to the plurality of client stations 25, OFDMA uplink scheduling information to be used for transmission of an uplink OFDMA data unit during the TXOP. In an embodiment, the uplink scheduling frame 902 includes the OFDMA uplink scheduling element 750 of FIG. 7B. In another embodiment, the uplink scheduling frame 902 provides uplink OFDMA scheduling information in another suitable manner. In an embodiment, the scheduling frame 902 further indicates, to each of the client stations STA1, STA2, STA3, a length or duration (e.g., using the UL PPDU length field 762 of FIG. 7B) to be used for transmission of an uplink data unit during the TXOP.

In an embodiment, the scheduling frame 902 is a control frame. In an embodiment, the scheduling frame 902 is a non-data packet (NDP) frame that omits a payload. In one embodiment in which the scheduling frame 902 in an NDP frame, MAC layer information, e.g., receiver address, transmitter address, etc., is included in a signal field of a PHY preamble of the scheduling frame 902. In an embodiment and/or scenario, the uplink scheduling frame 902 is duplicated in each smallest bandwidth portion (e.g., in each 20 MHz) of the entire bandwidth of the TXOP. In another embodiment and/or scenario, the scheduling frame 902 occupies the entire bandwidth of the TXOP, for example when each of the client stations 25 to which the scheduling frame 902 is transmitted is capable of operating in the entire bandwidth of the TXOP. In another embodiment and/or scenario, the uplink scheduling frame 902 is duplicated in every bandwidth portion of the entire bandwidth of the TXOP so as to allow each client station 25 to which the scheduling frame 902 is transmitted to receive and decode the scheduling frame 902, according to capabilities of the client stations 25 to which the scheduling frame 902 is directed. For example, if the entire bandwidth of the TXOP is 160 MHz, but at least one of the client stations 25 to which the scheduling frame 902 is directed is capable to operate with a maximum bandwidth of 80 MHz, then the scheduling frame 902 occupies 80 MHz and is duplicated in each 80 MHz portion of the entire bandwidth of the TXOP (i.e., in the lower 80 MHz portion and the upper 80 MHz portion), in an embodiment.

The scheduling frame 902 indicates respective sub-channels allocated for uplink OFDMA transmission by three client stations STA1, STA2 and STA3, in the illustrated embodiment. For example, the scheduling frame 902 indicates channel allocation within an 80 MHz channel, and indicates that (i) the highest 20 MHz sub-channel of the 80 MHz channel is allocated to STA1, (ii) the second highest 20 MHz sub-channel of the 80 MHz channel is allocated to STA2 and (iii) a 40 MHz sub-channel that includes the second lowest 20 MHz sub-channel and the lowest 20 MHz sub-channel is allocated to STA3, in an embodiment.

During a time t2, the plurality of client stations 25 transmit respective OFDM data unit 906 that collectively form an OFDMA data unit 904 to the AP 14. Time t2 at each client station 25 begins upon expiration of a predetermined time interval, such as for example a time interval corresponding to a short inter-frame space (SIFS), after completion of reception, of the scheduling frame 902 at the client station 25, in an embodiment. In another embodiment, a predetermined time period that is greater than SIFS is defined, and time t2 at each client station 25 begins upon expiration of a predetermined time interval corresponding to the predetermined time interval greater than SIFS. For example, a predetermined time period that is greater than SIFS and less than point coordination function (PCF) inter-frame space (PIFS) is defined. The greater predetermined time interval may provide sufficient time for the client stations 25 to decode the scheduling frame 902 and to prepare for uplink transmission based on the uplink scheduling information provided by the scheduling frame 902, in at least some embodiments. Additionally or alternatively, the scheduling frame 902 includes one or more padding bits at the end of the scheduling frame 902 to provide sufficient time for the client stations 25 to prepare for uplink transmission based on the uplink scheduling information provided by the scheduling frame 902, in some embodiments. For example, a MAC header included in the scheduling frame 902 indicates a length of a valid payload, wherein the one or more padding bits follow the valid payload, in an embodiment. Further, a signal field of a PHY preamble of the scheduling frame 902 includes an indication of the entire length of the scheduling frame 902, which includes the one or more padding bits at the end of the scheduling frame 902, in an embodiment.

In an embodiment, each client station 25 transmits its OFDM data unit 906 during the time t2 in a respective sub-channel, allocated to the client station 25, as indicated in the scheduling frame 902. In an embodiment, the length or duration of each of the OFDM data units 906 corresponds to the length or duration indicated in the scheduling frame 902.

During a time t3, the AP 14 transmits respective ACK frames 908 to the client stations 25 (STA1, STA2 and STA3) acknowledging receipt of the OFDM data units 906 from the client stations 25. In another embodiment, the AP 14 transmits a broadcast acknowledgement frame that includes respective acknowledgements for the client stations 25 (STA1, STA3 and STA3). Time t3 begins upon expiration of a predetermined time interval, such as for example a time interval corresponding to a short inter-frame space (SIFS), after completion of reception of the OFDM data units 906 at the AP 14, in an embodiment. In an embodiment, the AP 14 transmits the ACK frame 908 to the client stations 25, as parts of an OFDMA transmission to the client statins 25, in the respective sub-channels allocated to the client stations 25 indicated in the scheduling frame 902.

Figure 9B:
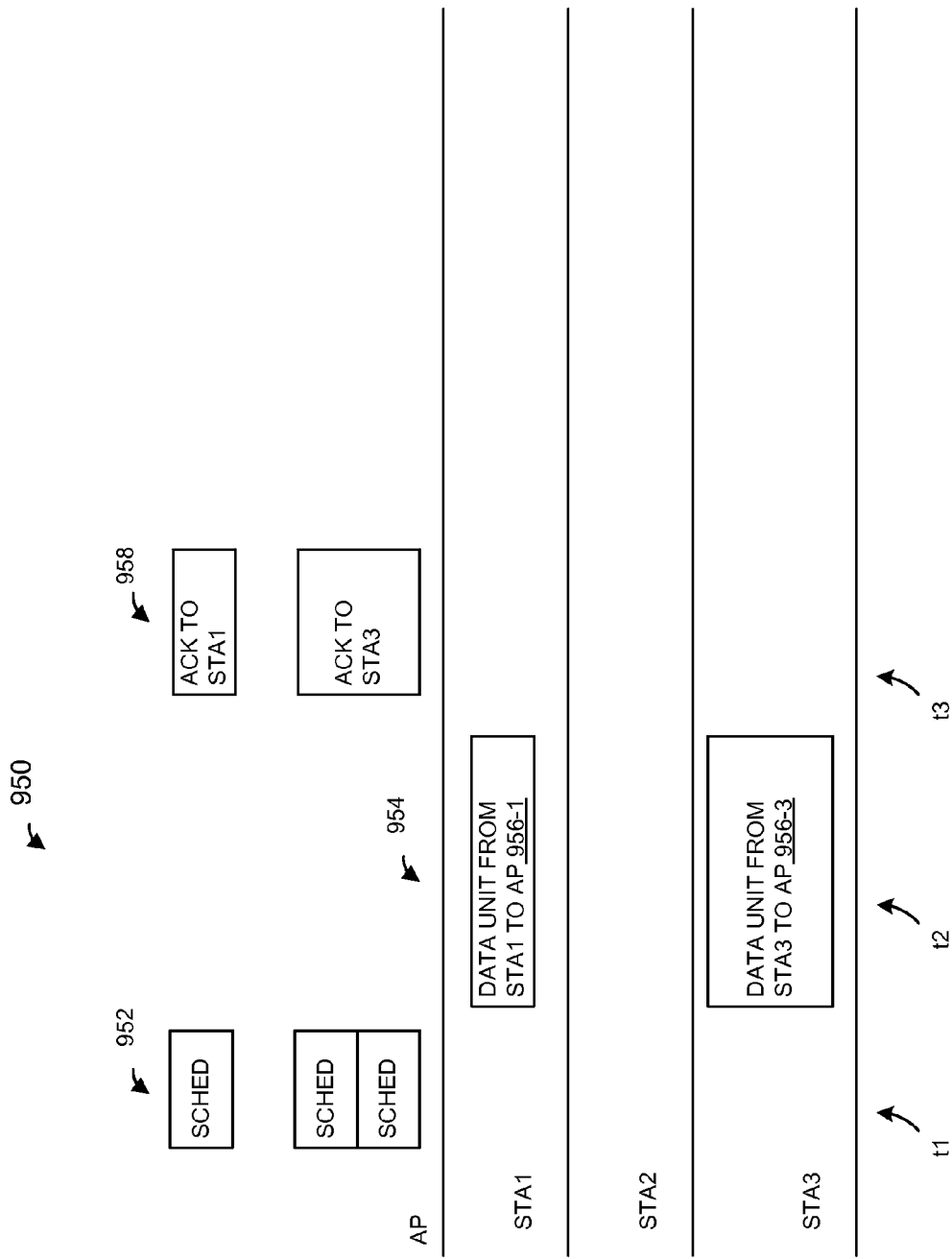
FIG. 9B is a frame exchange between an AP and a plurality of client stations that includes uplink OFDMA transmission of data from the plurality client stations to the AP, according to another embodiment.

FIG. 9B is a frame exchange 950 between the AP 14 and a plurality of client stations 25, according to another embodiment. The frame exchange 950 is generally similar to the frame exchange 900 of FIG. 9A except that in the frame exchange 950, a scheduling frame 952 indicates noncontiguous channel allocation to a plurality of client stations 25. In an embodiment, prior to transmitting the scheduling frame 952, the AP 14 detects that a particular sub-channel is currently not available (e.g., busy). For example, the AP 14 detects that the second highest 20 MHz sub-channel of the 80 MHz channel is busy, while the remaining 20 MHz sub-channels of the 80 MHz are available. Then, during a time t1, the AP 14 transmits the scheduling frame 952 on each of the available sub-channels of the 80 MHz channel. The scheduling frame 952 is similar to the scheduling frame 902 except that the scheduling frame 952 indicates channels allocated to STA1 and STA3, but nor STA2, in the illustrated embodiment. In particular, the scheduling frame 952 indicates that (i) the highest 20 MHz sub-channel of the 80 MHz channel is allocated to STA1, and (ii) a 40 MHz sub-channel that includes the second lowest 20 MHz sub-channel and the lowest 20 MHz sub-channel is allocated to STA3, in the illustrated embodiment.

In an embodiment, during a time t2, stations STA1 and STA3 transmit respective OFDM data units 956 that collectively form an OFDMA data unit 954 to the AP 14. In an embodiment, the client stations STA1 and STA3 transmit their respective OFDM data units 956 in a respective noncontiguous sub-channels allocated to the client stations STA1 and STA3, as indicated in the scheduling frame 952. During a time t3, the AP 14 transmits respective ACK frames 958 to the client stations SAT1 and STA3 acknowledging successful receipt of the OFDM data units 956 from the client stations STA1 and STA3, in an embodiment. The AP transmits the ACK frame 958 to the client stations STA1 and STA3, as parts of an OFDMA transmission to the client statins STA1 and STA3, in the respective non-contiguous sub-channels allocated to the client stations STA1 and STA3, in an embodiment. In another embodiment, the AP 14 transmits a broadcast acknowledgement frame that includes respective acknowledgements for the client stations 25 (STA1, STA3 and STA3).

Figure 10A:
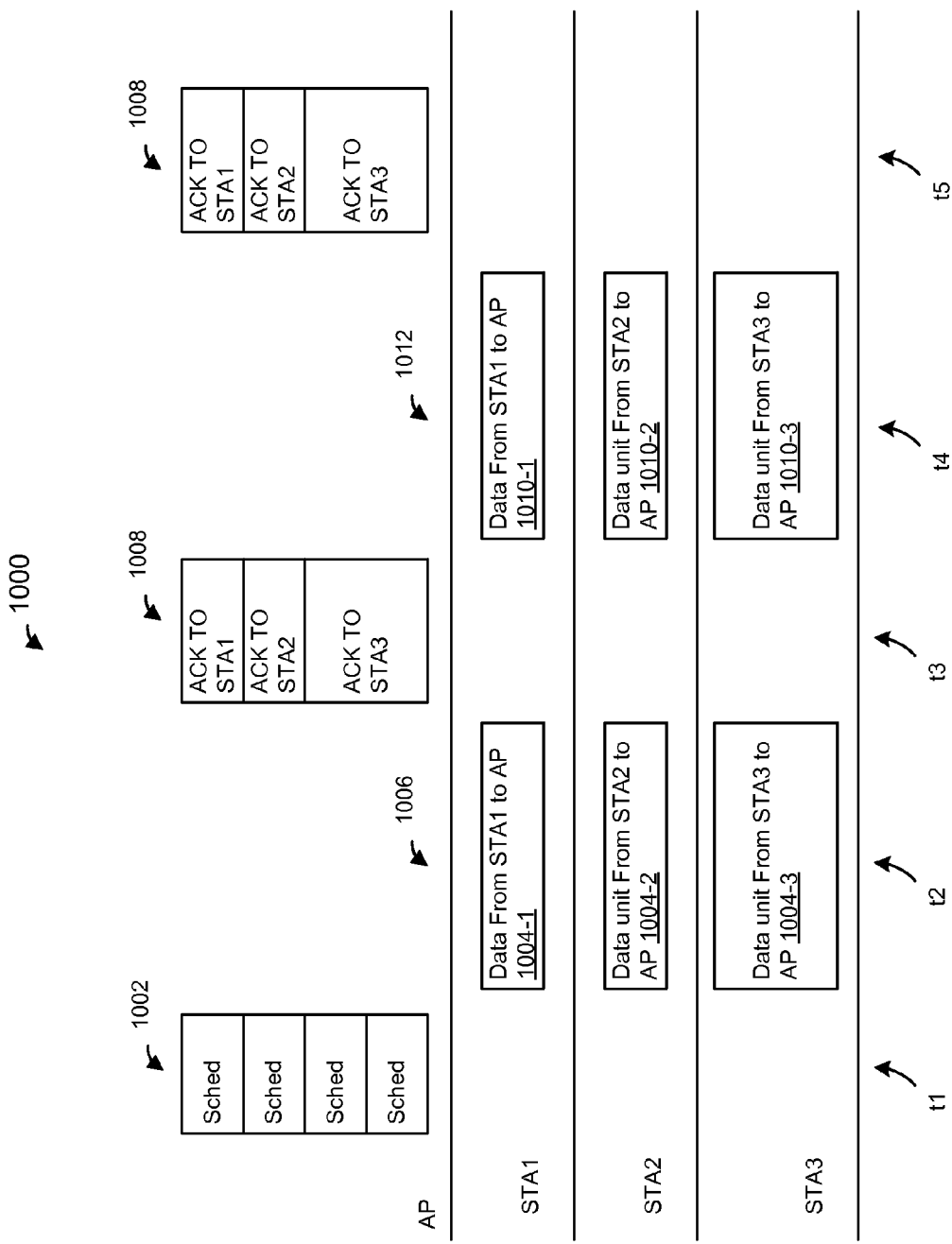
FIG. 10A is a frame exchange between an AP and a plurality of client stations that includes uplink OFDMA transmission of data from the plurality client stations to the AP, according to another embodiment.

FIG. 10A is a diagram of a frame exchange 1000 between the AP 14 and a plurality of client stations 25, according to an embodiment. The frame exchange 1000 is similar to the frame exchange 900 of FIG. 9A except that in the frame exchange 1000 channel allocation provided by a scheduling frame 1002 transmitted during a time t1 is used for multiple uplink OFDMA transmissions that follow the scheduling frame 1002. In an embodiment, the scheduling frame 1002 includes the OFDMA uplink scheduling element 750, and indicates repeat usage in the repeat usage field 764 of the OFDMA uplink scheduling element 750. For example, the repeat usage indication 764 indicates a number of data units that can be transmitted to the AP 14 using the channel allocation provided in the scheduling frame 1002, in an embodiment. The number of data units corresponds to the number of data units that can be transmitted during the TXOP to which the scheduling frame 1002 corresponds, in an embodiment. In another embodiment, the repeat usage indication indicates an amount of time for which the channel allocation provided in the scheduling frame 1002 can be used for uplink transmissions to the AP 14. The amount of time indicated by the scheduling frame 1002 corresponds to the duration of the TXOP to which the scheduling frame 1002 corresponds, in an embodiment.

In the embodiment of FIG. 10A, the client stations 25 use channel allocation provided by the scheduling frame 1002 to transmit two data units 1004, 1010 as part of two respective OFDMA uplink transitions 1006, 1012 to the AP 14. In particular, during a time t2, the client stations 25 each transmit a respective first data unit 1004 as part of a first OFDMA transmission 1006 to the AP 14. During a time t3, the client stations 25 receive, from the AP 14, receive respective ACK frames 1008 acknowledging receipt of the data units 1004 by the AP 14. The ACK frames 1008 are transmitted by the AP 14 in respective sub-channels as part of an OFDMA transmission to the client stations 25, in the illustrated embodiment. After receiving the respective ACK frames 1008, during a time t4, the client stations 25 each transmits a respective second data unit 1010, using uplink channel allocation information provided in the scheduling frame 1002, as part of a second OFDMA transmission 1012 to the AP 14. During a time t5, the client stations 25 receive, from the AP 14, receive respective ACK frames 1014 acknowledging receipt of the data units 1010 by the AP 14. The ACK frames 1014 are transmitted by the AP 14 in respective sub-channels as part of an OFDMA transmission to the client stations 25, in the illustrated embodiment.

Figure 10B:
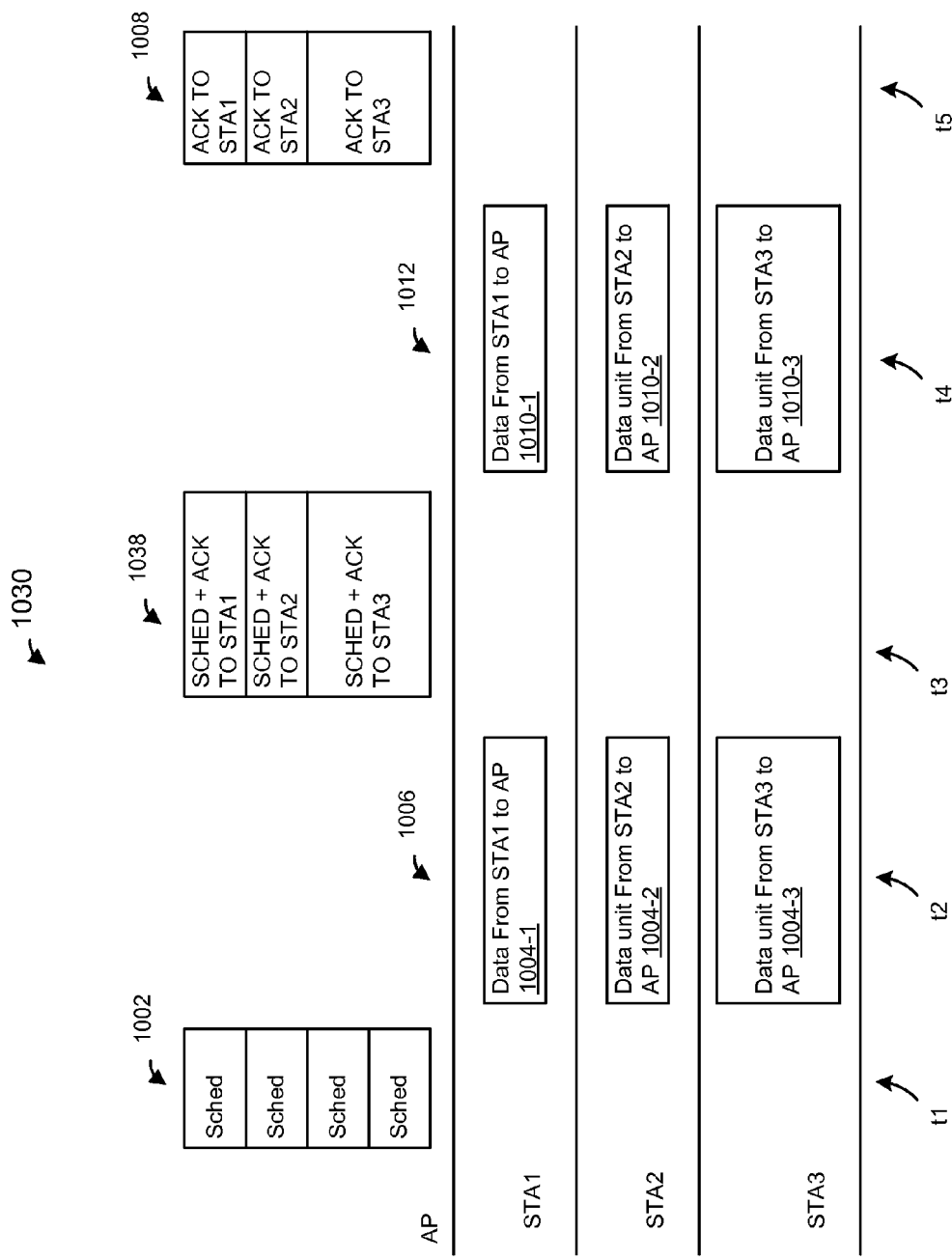
FIG. 10B is a frame exchange between an AP and a plurality of client stations that includes uplink OFDMA transmission of data from the plurality client stations to the AP, according to another embodiment

FIG. 10B is a diagram of a frame exchange 1030 between the AP 14 and a plurality of client stations 25, according to an embodiment. The frame exchange 1030 is similar to the frame exchange 1000 of FIG. 10A except that in the frame exchange 1030 scheduling for the second OFDMA transmission 1012 can be different from the scheduling of the first OFDMA transmission 1006. In an embodiment, in response to receiving the OFDMA transmission 1006, the AP 14 transmits a control frame 1038 as an OFDMA transmission to the of client stations 25, wherein a respective control frame 1038 transmitted to a particular client station 25 combines an ACK frame to acknowledge receipt of the OFDM data unit 1004 received from the particular client station 25 and a scheduling frame that includes scheduling information for the second OFDMA transmission 1012 (e.g., scheduling information of the particular client station 25 or scheduling information the all of the client stations 25 (STA1, STA2 and STA3). In another embodiment, in response to receiving the OFDMA transmission 1006, the AP 14 transmits a broadcast control frame (e.g., a legacy duplicate control frame) that combines an acknowledgement frame that includes acknowledgement of each of the OFDM data units 1004 and a scheduling frame that includes scheduling information for the second OFDMA transmission 1012. In yet another embodiment, the AP 14 transmits a scheduling frame, or respective scheduling frames, to the client stations 25 as a separate transmission to the client stations 25 after expiration of a certain predetermined time interval, such as SIFS, after transmission of an acknowledgement frame, or respective acknowledgement frames, to the client stations 25.

Figure 10C:
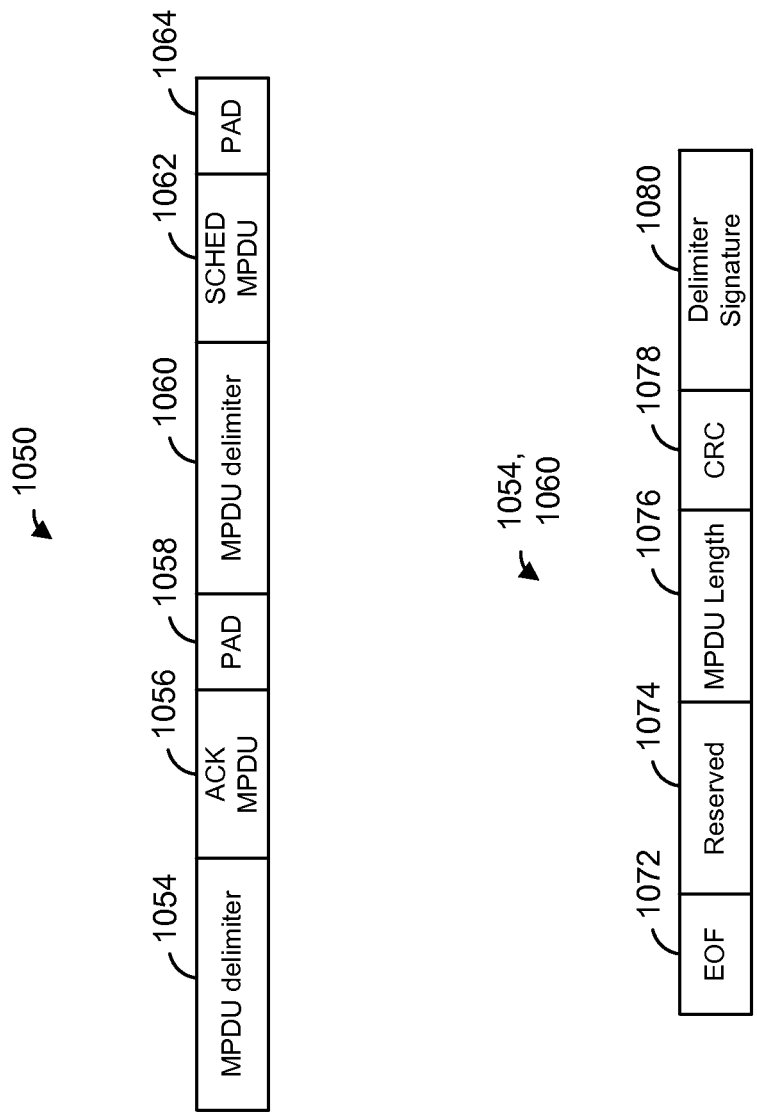
FIG. 10C is an example aggregated control frame format that can be used with the frame exchange of FIG. 10B, according to an embodiment.

FIG. 10C is a diagram of an example aggregated control frame 1050 that combines an ACK frame and a scheduling frame, according to an embodiment. In an embodiment, the control frame 1038 of FIG. 10B corresponds to the aggregated control frame 1050. In other embodiments, the control frame 1038 of FIG. 10B is generated according to other suitable formats. As illustrated in FIG. 10C, the aggregated control frame 1050 includes a first delimiter field 1054, an ACK field 1056, a first padding field 1058, second delimiter field 1060, a scheduling frame 1062, and a second padding field 1064, in the illustrated embodiment. As also illustrated in FIG. 10C, each of the first delimiter field 1054 and the second delimiter field 1060 includes and end of frame (EOF) subfield 1072, a reserved subfield 1074, an MPDU length field 1076, a cyclic redundancy check (CRC) subfield 1078 and a delimiter signature subfield 1080.

Figure 11A:
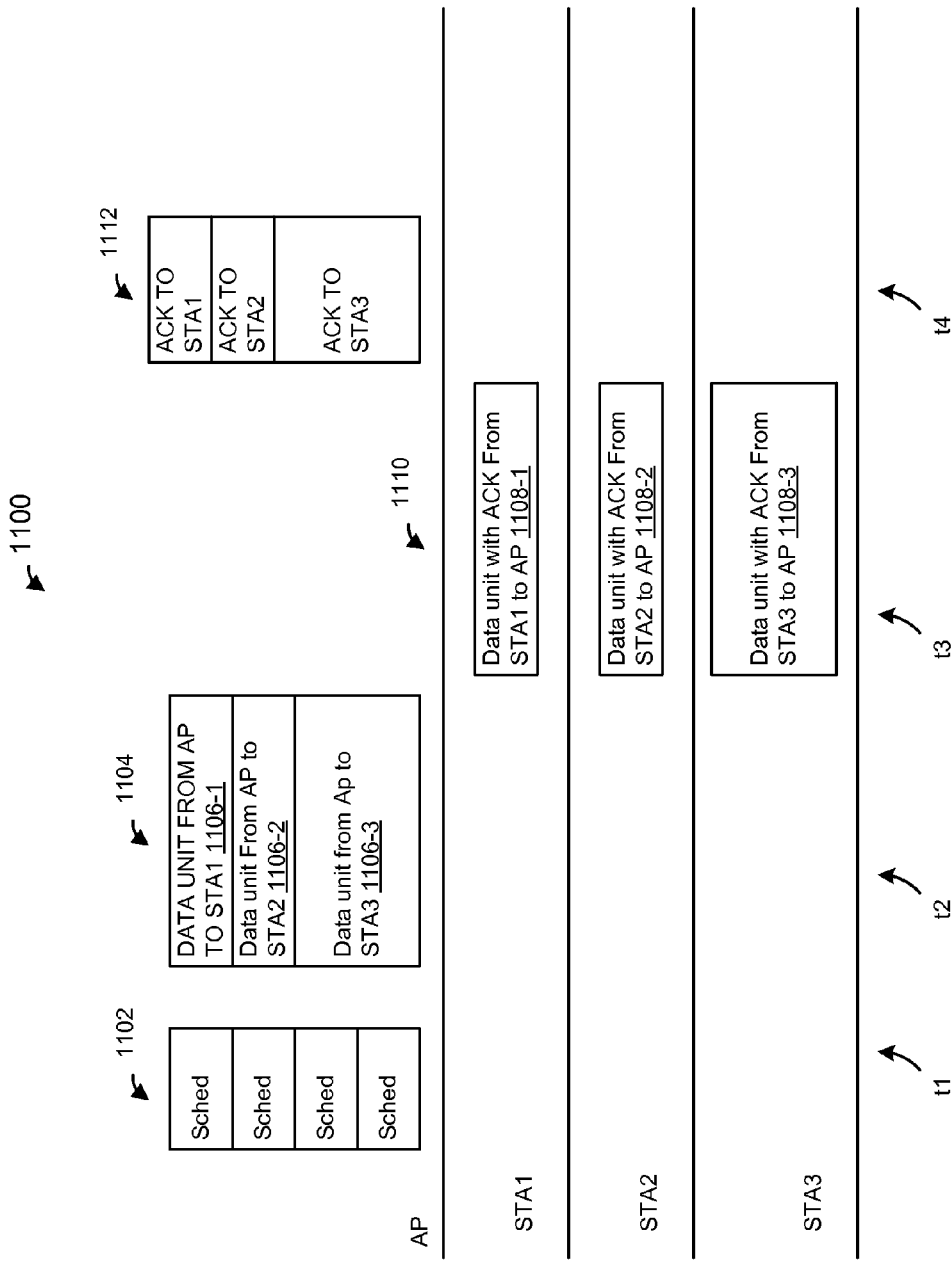
FIG. 11A is a frame exchange between an AP and a plurality of client stations that includes both downlink OFDMA transmission of data from the AP to the plurality client stations and uplink OFDMA transmission of data from the plurality client stations the AP, according to an embodiment.

FIG. 11A is a diagram of a frame exchange 1100 between the AP 14 and a plurality of client stations 25, according to an embodiment. In the frame exchange 1100, a scheduling frame 1102 includes both (i) downlink channel allocation information for transmission from the AP 14 to a plurality of client station 25 (e.g., client stations 25-1, 25-2 and 25-3) and (ii) uplink channel allocation information for transmission from a plurality of client stations 25 e.g., client stations 25-1, 25-2 and 25-3) to the AP 14. In an embodiment, the AP 14 transmits the scheduling frame 1102 during a time t1, which begins at the beginning of a TXOP, and channel allocation provided by the scheduling frame 1102 is used for communication between the AP 14 and the client stations 25 for the duration of the TXOP. In an embodiment and/or scenario, a same channel is allocated to a particular client station 25 for downlink transmission and for uplink transmission during the TXOP. In another embodiment and/or scenario, the channel allocated to a particular client station 25 for downlink transmission during the TXOP is different from the channel allocated to the particular client station 25 for uplink transmission during the TXOP.

In an embodiment, the scheduling frame 1102 includes both (i) the OFDMA downlink scheduling element 700 of FIG. 7A and (ii) the OFDMA uplink scheduling element 750 of FIG. 7B. In other embodiments, the scheduling frame 1102 provides downlink and uplink channel information in other suitable manners.

In an embodiment, the scheduling frame 1102 is a control frame. In an embodiment, the scheduling frame 1102 is a non-data packet (NDP) frame that omits a payload. In one embodiment in which the scheduling frame 1102 in an NDP frame, MAC layer information, e.g. MAC address of the receiving device, MAC address of the transmitting device, etc., is included in a signal field of a PHY preamble of the scheduling frame 1102. In an embodiment and/or scenario, the uplink scheduling frame 1102 is duplicated in each smallest bandwidth portion (e.g., in each 20 MHz) of the entire bandwidth of the TXOP. In another embodiment and/or scenario, the uplink scheduling frame 1102 is a legacy control frame duplicated in every smallest bandwidth portion of the entire bandwidth of the TXOP so as to protect the TXOP from transmissions by client stations 25 that are not intended participants in the TXOP. For example, in an embodiment, if the entire bandwidth of the TXOP is 160 MHz, then the scheduling frame 1102 is duplicated in each 20 MHz portion of the 160 MHz channel, in an embodiment. Client stations 25 that are not intended participants in the TXOP determine duration of the TXOP based on a length or duration indicated by the scheduling frame 1102 and defer medium access for the determined duration, in an embodiment.

In an embodiment, the client stations 25 receive the scheduling frame 1102 in the primary channel of the WLAN 10 or in the entire bandwidth of the TXOP. Each of the client stations 25 determines, based on channel allocation information provided in the scheduling frame 1102, a respective downlink channel and a respective uplink channel allocated to the client 25. After transmission of the scheduling frame 1102, during a time t2, the AP transmits an OFDMA downlink data unit 1104. The OFDMA downlink data unit 1104 includes a respective OFDMA data unit 1106 directed to each of the client stations 25. The OFDM data units 1106 are transmitted to the client stations 25 in the respective downlink channels allocated the client stations 25 as indicated in the scheduling frame 1102. During a time t3, the client stations 25 transmit respective uplink OFDM data units 1108 as parts of an uplink OFDMA transmission 1110 to the AP 14. In an embodiment, the respective uplink data units 1108 from the client stations 25 are transmitted in respective uplink channels allocated for uplink transmission by the client stations 25 as indicated by the scheduling frame 1102. In an embodiment, each uplink data unit 1108 includes an acknowledgement indicating successful receipt of the corresponding OFDM downlink data unit 1106. During a time t3, the AP 14 transmits respective acknowledgment frames 1112, acknowledging successful receipt of the OFDM data units 1108. In an embodiment, the respective acknowledgment frames 1112 are transmitted as parts of an OFDMA transmission to the client stations 25, in the respective uplink channels allocated to the client stations 25.

Figure 11B:
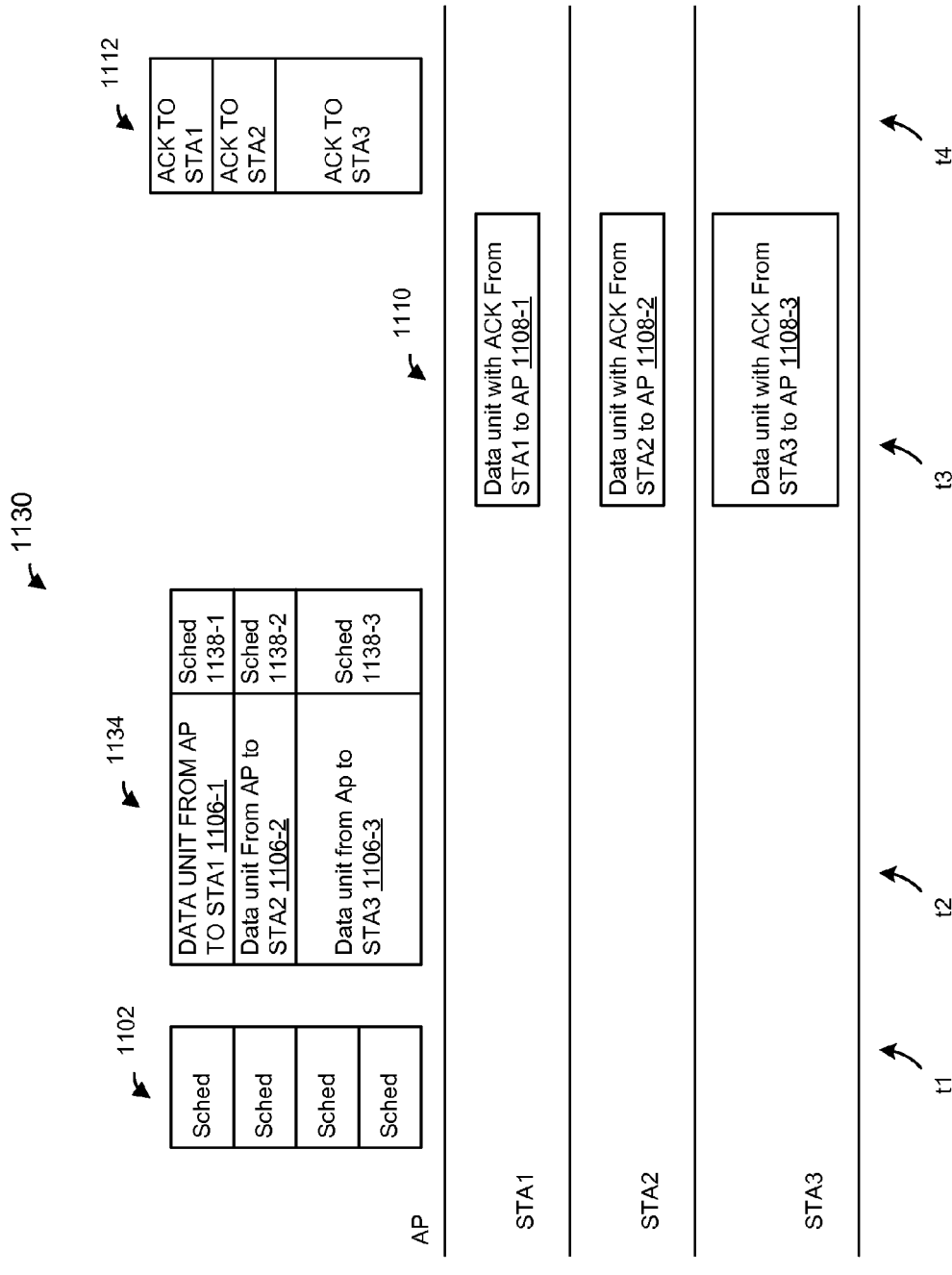
FIG. 11B is a frame exchange between an AP and a plurality of client stations that includes both downlink OFDMA transmission of data from the AP to the plurality client stations and uplink OFDMA transmission of data from the plurality client stations the AP, according to an embodiment.

FIG. 11B is a diagram of a frame exchange 1130 between the AP 14 and a plurality of client stations 25, according to an embodiment. The frame exchange 1130 is similar to the frame exchange 1100 of FIG. 11A except that in the frame exchange 1130 scheduling for the uplink OFDMA transmission 1110 is provided to the client stations 25 as part of the downlink OFDMA transmission 1134 to the client stations 25. For example, respective scheduling frames 1138 are appended to the OFDM data units 1106 of the OFDMA transmission 1134, in the illustrated embodiment. As another example, respective scheduling frames 1138 are prepended to the OFDM data units 1106 of the OFDMA transmission 1134, in another embodiment. In some embodiments, each scheduling frames 1134 includes scheduling information for each of STA1, STA2 and STA3. For example, each scheduling frame 1134 includes an OFDMA uplink scheduling element, such as the OFDMA uplink scheduling element 750 of FIG. 7B, which includes a plurality of user fields 754 corresponding to the plurality of client stations 25. In another embodiment, each scheduling frame 1134 includes scheduling information of only the client stations 25 to which the corresponding OFDM data unit 1106 is directed. For example, each scheduling frame 1134 includes an OFDMA uplink scheduling element, such as the OFDMA uplink scheduling element 750 of FIG. 7B, which includes a single user field 754 corresponding to the one client station 25 to which the corresponding OFDM data unit 1106 is directed. Thus, for example, the scheduling frame 1138-1 includes a single user field 754 corresponding to STA 1, the scheduling frame 1138-2 includes a single user field 754 corresponding to STA 2, and the scheduling frame 1138-3 includes a single user field 754 corresponding to STA 3, in an embodiment.

Figure 11C:
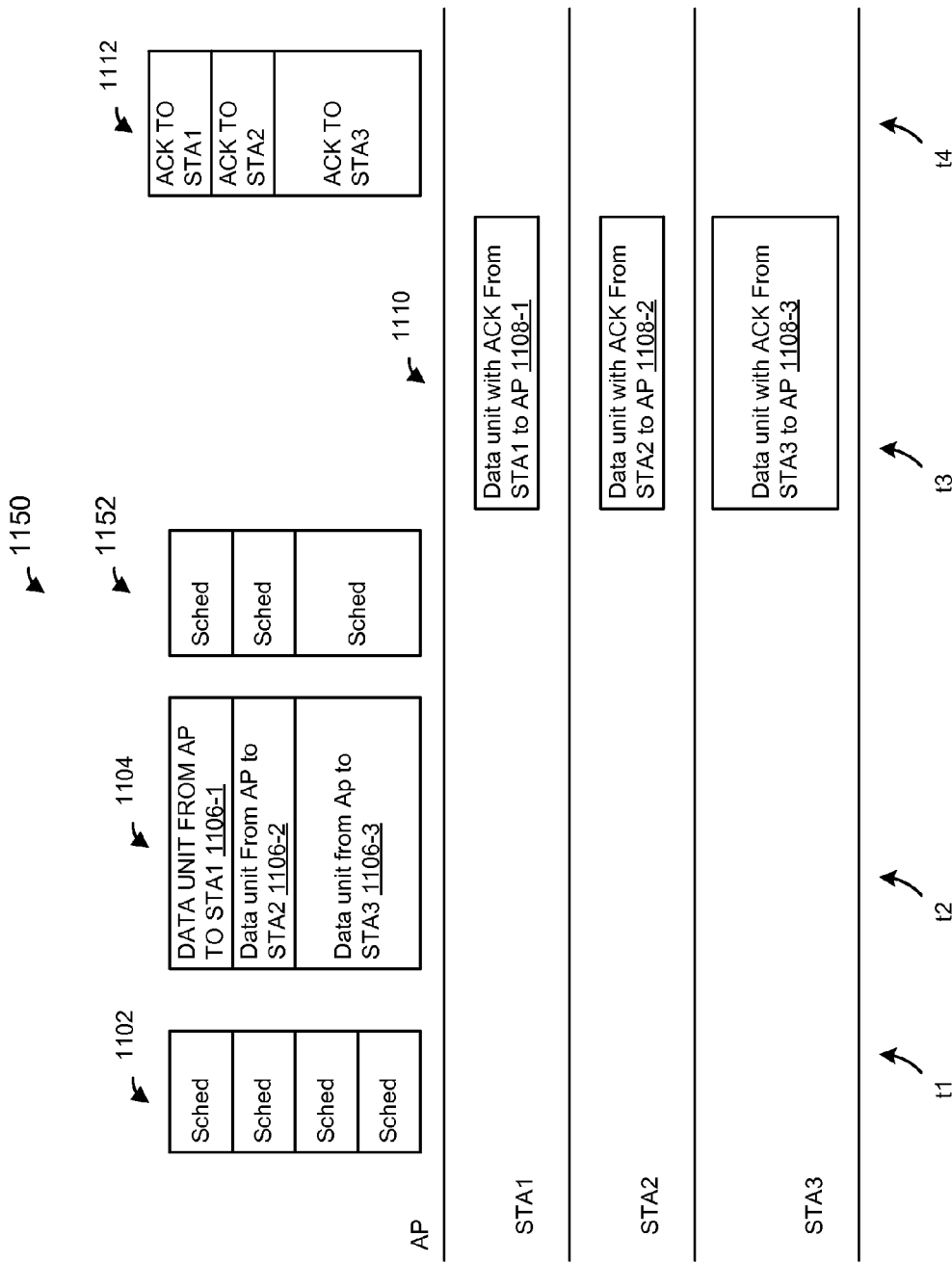
FIG. 11C is a frame exchange between an AP and a plurality of client stations that includes both downlink OFDMA transmission of data from the AP to the plurality client stations and uplink OFDMA transmission of data from the plurality client stations the AP, according to an embodiment.

FIG. 11C is a diagram of a frame exchange 1150 between the AP 14 and a plurality of client stations 25, according to an embodiment. The frame exchange 1150 is similar to the frame exchange 1130 of FIG. 11B, except that in the frame exchange 1150, uplink scheduling information is provided to the client stations 25 by respective separate scheduling frames 1152 transmitted as control frames separate from the OFDM data units 1104. The scheduling frames 1152 are generally the same as or similar to the scheduling frames 1138 of FIG. 11C except that the scheduling frames 1152 are transmitted to the client stations 25 as separate control frames that follow transmission of the respective OFDM data units 1106 to the client stations 25. In an embodiment, respective scheduling frames 1152 are transmitted to the client stations 25 via the downlink sub-channels allocated to the client stations 25. In another embodiment, the scheduling frame 1152 is a legacy control frame duplicated in every smallest bandwidth portion of the entire bandwidth of the TXOP.

Referring to FIG. 11B, the scheduling frame 1102 includes downlink channel allocation information and excludes uplink channel allocation information, in some embodiments. In some embodiments, the downlink channel allocation information is included in a signal field (e.g., the HEW-SIGA) field of a preamble of the OFDM data unit 1134. For example, the signal field of the preamble of the OFDMA data unit 1134 includes a channel allocation field, such as the channel allocation field 550 of FIG. 5, in some embodiments. In some such embodiment, the scheduling frame 1102 is omitted from the frame exchange 1130, and the frame exchange 1130 begins with transmission of the downlink OFDMA data unit 1134.

Referring to FIG. 11C, the scheduling frame 1102 includes downlink channel allocation information and excludes uplink channel allocation information, in some embodiments. In some embodiments, the downlink channel allocation information is included in a signal field (e.g., the HEW-SIGA) field of the OFDMA data unit 1104. For example, the signal field of the preamble of the OFDMA data unit 1104 includes a channel allocation field, such as the channel allocation field 550 of FIG. 5, in some embodiments. In some such embodiment, the scheduling frame 1102 is omitted from the frame exchange 1150, and the frame exchange 1150 begins with transmission of the downlink OFDMA data unit 1104.

Figure 12:
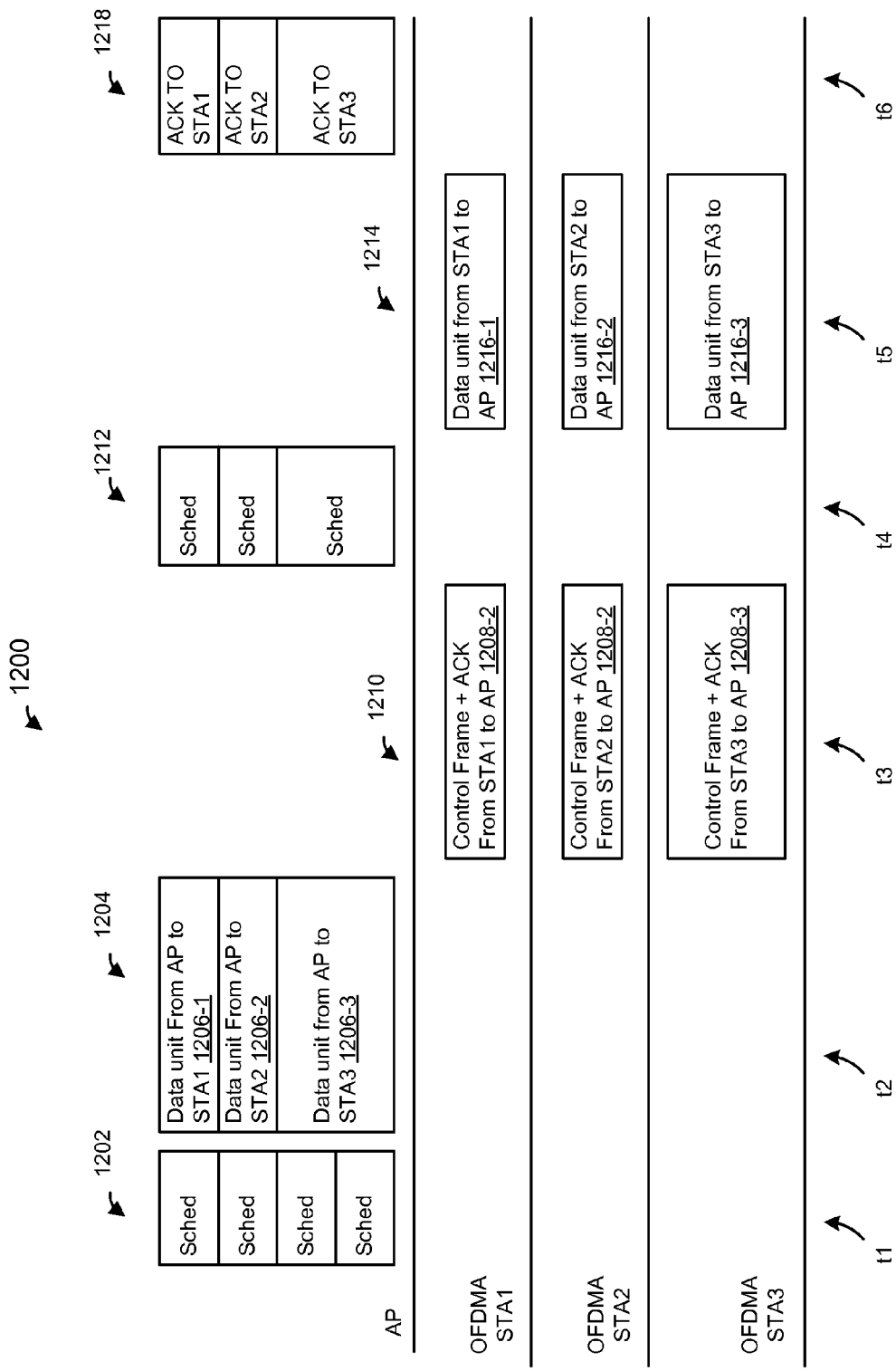
FIG. 12 is a frame exchange between an AP and a plurality of client stations that includes both downlink OFDMA transmission of data from the AP to the plurality client stations and uplink OFDMA transmission of data from the plurality client stations the AP, according to another embodiment.

FIG. 12 is a diagram of a frame exchange 1200 between the AP 14 and a plurality of client stations 25, according to an embodiment. During a time t1, the AP 14 transmits a scheduling frame 1202 to a plurality of client stations 25. In an embodiment, the time t1 begins at the beginning of a TXOP obtained by (e.g., based on a suitable channel assessment procedure, such as CSMA/CA) or scheduled for the AP 14. In an embodiment, the scheduling frame 1202 provides OFDMA downlink scheduling information to the plurality of client stations 25. For example, in an embodiment, the scheduling frame 1202 includes downlink channel allocation information to be used for transmission of downlink OFDMA data units during the TXOP. In an embodiment, the scheduling frame 1202 includes the OFDMA downlink scheduling element 700 of FIG. 7A. In another embodiment, the scheduling frame 802 provides downlink channel allocation information in another suitable manner.

During a time t2, the AP 14 transmits an OFDMA data unit 1204 directed to the plurality of client stations 25. The OFDMA data unit 1204 includes respective OFDM data units 1206 transmitted to each of the client stations 25 in respective sub-channels allocated to the client station 25. During a time t3, the client stations 25 transmit respective control frames 1208 as parts of an OFDMA transmission 1210 to the AP 14. In an embodiment, the client stations 25 transmit the control frames 1208 in the respective downlink sub-channels allocated to the client stations 25 indicated in the scheduling frame 1202. The control frames 1208 include respective indications of the amount of data buffered at each client station 25 for transmission to AP 14. In an embodiment, the control frames 1208 additionally include respective acknowledgements, acknowledging successful receipt of the respective OFDM data units 1206.

In an embodiment, the scheduling frame 1202 indicates to the client station 25 that the client stations 25 should provide indications of the amount of buffered data at the client stations 25 and/or indications of requested medium time for an uplink transmission by the client station 25. In another embodiment, such signaling is included in the OFDMA data unit 1204, such as in a signal field of a preamble of each of the OFDM data units 1206. In yet another embodiment, a client station 25 is configured to transmit a control frame, which includes an indication of amount of buffered data and/or requested medium time, automatically in response to receiving the OFDM data unit 1206.

The AP 14 receives the respective indications of the amount of buffered data at the client stations 25 and/or indications of requested medium time for an uplink transmission by the client stations 25, and allocates uplink sub-channels to the client stations 25 based on the indications of the amount of buffered data at the client stations 25 and/or indications of requested medium time for an uplink transmission by the client stations 25, in an embodiment. Additionally or alternatively, in an embodiment, the AP 14 determines, based on the indications of the amount of buffered data at the client stations 25 and/or indications of requested medium time for an uplink transmission by the client stations 25, a suitable length for an uplink OFDMA transmission by the client stations 25 (e.g., uplink PPDU length). For example, the AP 14 determines a suitable length to accommodate the client station 25 that has the greatest amount of buffered data to be transmitted to the AP 14 or the greatest requested medium time for an uplink transmission by the client station 25 to the AP 14. In an embodiment, the AP 14 does not allocate uplink channels based on the indications of the amount of buffered data, and/or indications of requested medium time, received from the client stations 25. Rather, the downlink channel allocation provided by the scheduling frame 1202 is maintained for uplink OFDMA transmission, in an embodiment.

During a time t4, the AP 14 transmits a second scheduling frame 1212 that includes uplink channel allocation information for OFDMA uplink transmission by the client stations 25. In an embodiment, respective scheduling frames 1212 are transmitted to the client stations 25 via the downlink sub-channels allocated to the client stations 25. In another embodiment, the scheduling frame 1212 is a legacy control frame duplicated in every smallest bandwidth portion of the entire bandwidth of the TXOP. In an embodiment, the scheduling frame 1212 includes uplink channel information that indicates uplink sub-channels allocated to the client stations 25 based on the indications of the amount of buffered data, and/or indications of requested medium time, received from the client stations 25. The scheduling frame 1212 also includes an indication of the length of the OFDMA transmission (e.g., uplink PPDU length) that the AP 14 determined based on the indications of the amount of buffered data, and/or indications of requested medium time, received from the client stations 25, in an embodiment. In an embodiment, the scheduling frame 1212 includes the OFDMA uplink scheduling element 750 of FIG. 7B. In another embodiment, the scheduling frame 1212 indicates uplink channel allocation and/or uplink data unit length in another suitable manner.

In an embodiment, each client station 25 determines, based on the scheduling frame 1212, the sub-channel allocated to the client station 25 and/or the length of the uplink transmission from the client stations 25. During a time t5, the client stations 25 transmit respective uplink OFDM data units 1216 as parts of an OFDMA transmission 1214 to the AP 14. In an embodiment, the respective OFDM units 1214 are transmitted via the respective uplink channels indicated in the scheduling frame 1212. Additionally or alternatively, in an embodiment, each of the OFDM data units 1214 is of the length indicated in the scheduling frame 1212. During a time t6, the AP 14 transmits respective acknowledgement frames 1218 that acknowledge successful receipt of the OFDM data units 1216. In an embodiment, the respective acknowledgment frames 1218 are transmitted, as parts of an OFDMA transmission to the client stations 25, in the respective uplink channels allocated to the client stations 25. In another embodiment, the AP 14 transmits a broadcast acknowledgement frame that includes respective acknowledgements for the client stations 25 (STA1, STA3 and STA3).

Figure 13A:
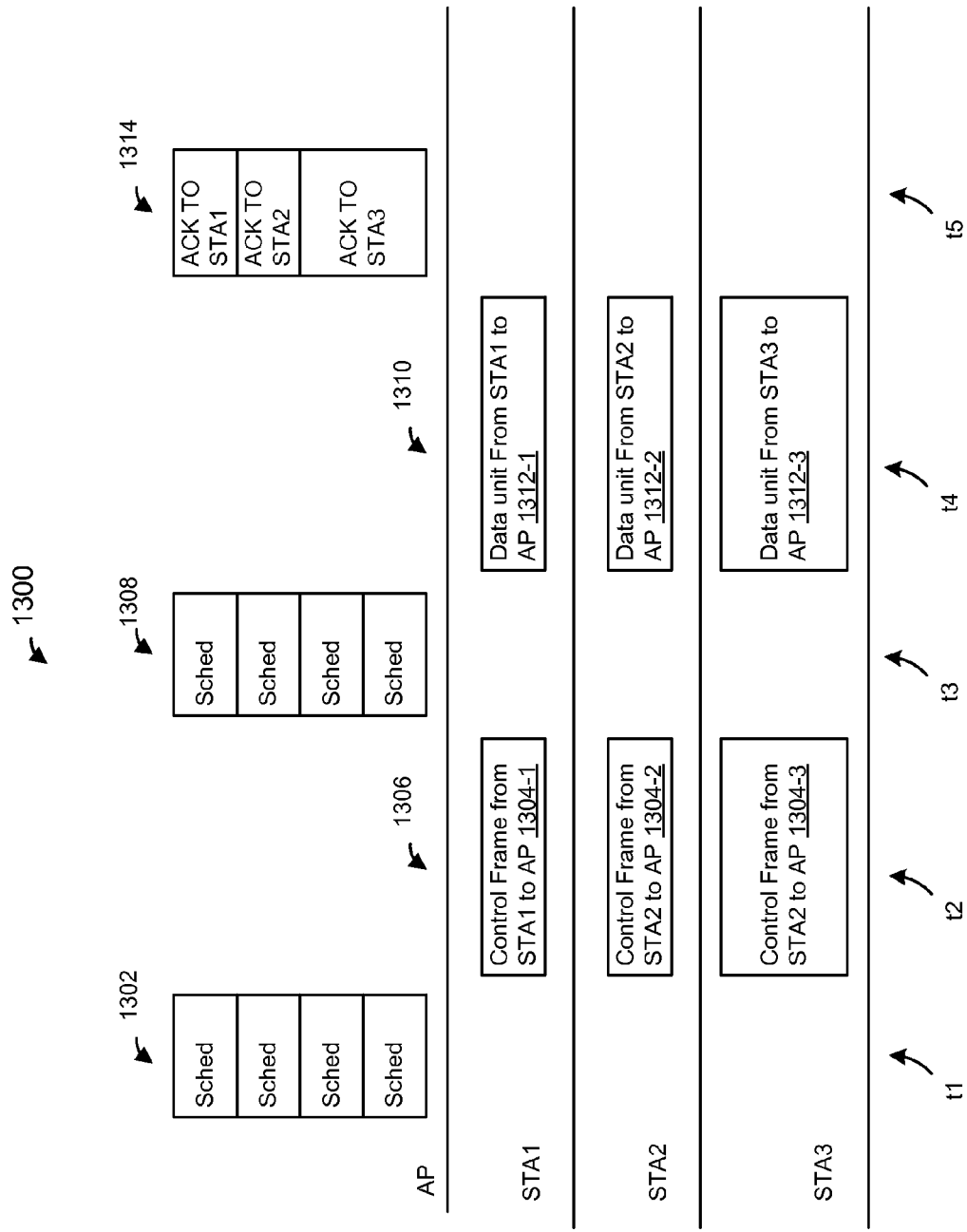
FIG. 13A is a frame exchange between an AP and a plurality of client stations that includes uplink OFDMA transmission of data from the plurality client stations the AP, according to an embodiment.

FIG. 13A is a diagram of a frame exchange 1300 between the AP 14 and a plurality of client stations 25, according to an embodiment. The AP 14 transmits a first scheduling frame 1302 to a plurality of client stations 25 (e.g., the client stations 25-1, 25-2, 25-3). In an embodiment, the AP 14 transmits the scheduling frame 1302 at the beginning of a TXOP. In an embodiment, the scheduling frame 1302 includes uplink channel allocation information for the plurality of client stations 25. In an embodiment, the scheduling frame 1302 includes the uplink channel scheduling element 705 of FIG. 7B. In another embodiment, the scheduling frame 1302 indicates uplink channel allocation to the client stations 25 in another suitable manner. In an embodiment, the scheduling frame 1302 also indicates to the client stations 25 that the client stations 25 should provide indications of the amount of buffered data at the client stations 25 and/or indications of requested medium time for an uplink transmission by the client stations 25. For example, the scheduling frame 1302 includes an uplink data unit length field (e.g., the UL PPDU length field 762 of FIG. 7B) set to a length corresponding to a length of a control frame defined for transmission of indication of amount of buffered data and/or indication of requested medium time, such as a QoS Null frame or another suitable control frame. Setting the uplink data unit length field to the length corresponding to the length of the control frame for transmission of buffered data indication and/or requested medium time indication indicates to the client stations 25 that the client stations 25 should transmit the control frame, in an embodiment. In another embodiment, the scheduling frame 1302 includes an indication field, such as a poll field (e.g., a 1-bit poll field, such as the UL Buffer Poll field 768 of FIG. 7B) set to indicate to the client statins 25 that the client stations 25 should provide the buffered data indications and/or requested medium time indications to the AP 14.

In an embodiment, in response to receiving the scheduling frame 1302, the client stations 25 transmit respective control frames 1304 to the AP 14. The control frames 1304 are transmitted in the respective uplink channels indicated in the scheduling frame 1302, as parts of an OFDMA transmission 1306 from the client stations 25 to the AP 14, in an embodiment. The control frames 1304 include respective indications of amount of buffered data at the respective client stations 25 and/or indications of requested medium time by the respective client stations 25, in an embodiment.

Figure 13B:
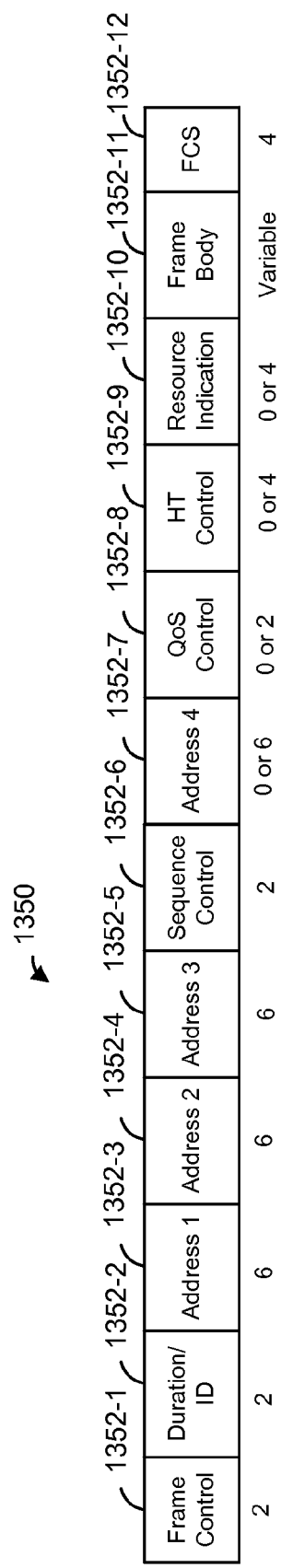
FIG. 13B is a diagram of an example control field included in a control frame transmitted by a client station to indicate amount of buffered data at the client station, in an embodiment.

FIG. 13B is a diagram of an example control field 1350 included in a control frame transmitted by a client station 25 to indicate amount of buffered data at the client station 25 and/or requested medium time by the client station 25. The control field 1350 is included in each of the control frames 1304 of FIG. 13A, in an embodiment. The control field 1350 includes a plurality of sub-fields 1352. In the illustrated embodiment, the sub-fields 1352 include a frame control sub-field 1352-1, a duration/id sub-field 1352-2, a first address sub-field 1352-3, a second address sub-field 1352-4, and third address sub-field 1352-5, a sequence control sub-field 1352-6, an optional fourth address sub-field 1352-7, an optional QoS sub-field 1352-8, an optional HT control sub-field 1352-9, an optional resource indication 1352-10, a variable length frame body sub-field 1352-11, and a frame sequence check (FCS) sub-field 1352-12. The number indicated in FIG. 13B under each of the sub-fields 1352 indicates the number of octets of bits in the corresponding sub-field 1352, according to an example embodiment. In other embodiments, one or more of the sub-fields 1352 include suitable numbers of bits other than the number of bits indicated in FIG. 13B. Further, in another embodiment, a suitable control frames other than the example control frame 1350 is transmitted by a client station 25 to indicate amount of buffered data at the client station 25 and/or requested medium time by the client station 25.

In an embodiment, the control field 1350 includes an indication of whether the resource indication sub-field 1352-10 is included in the control field 1350. For example, the frame control sub-field 1352-2 includes an indication of whether the resource indication sub-field 1352-10 is included in the control field 1350, in an embodiment. The resource indication sub-field 1352-10, when present in the control field 1350, indicates one or more traffic class identifiers (TID), and the amount of buffered data and/or requested medium time for each of the one or more TIDs, in an embodiment. Additionally or alternatively, the resource indication sub-field 1352-10, when present in the control field 1350, indicates the total amount of buffered data and/or the total requested medium time, in an embodiment. The resource indication sub-field 1352-10 allows a client station 25 to indicate amount of buffered data greater than 64768 octets and/or amount of buffered data less than 256 octets, in at least some embodiments. Referring back to FIG. 13A, the AP 14 receives the respective indications of the amount of buffered data from the client stations 25, and allocates uplink channels to the client stations 25 based on the indications of the amount of buffered data at the client stations 25 and/or indications of requested medium time by the client stations 25, in an embodiment. In an embodiment, the AP determines, based on the indications of the amount of buffered data at the client stations 25 and/or indications of requested medium time by the client stations 25, a suitable length for an uplink OFDMA transmission from the client stations 25 (e.g., uplink PPDU length). For example, the AP determines the suitable length to accommodate the client station 25 that has the greatest amount of buffered data to be transmitted to the AP 14, in an embodiment. In another embodiment, the AP does not allocate uplink channels based on the indications of the amount of buffered data received from the client stations 25. Rather, the uplink channel allocation provided in the scheduling frame 1302 is maintained for the duration of the TXOP transmission, in an embodiment.

During a time t3, the AP 14 transmits a second scheduling frame 1308 that includes uplink channel information for uplink transmission from the client stations 25 to the AP 14. In an embodiment, the scheduling frame 1308 includes uplink channel allocation information that indicates uplink sub-channels allocated to the client stations based on the indications of the amount of buffered data received from the client stations 25. The scheduling frame 1308 also includes an indication of the length of the OFDMA transmission (e.g., uplink PPDU length) determined based on the indications of the amount of buffered data received from the client stations 25, in an embodiment. In an embodiment, the scheduling frame 1308 includes other information related to uplink transmission by the client stations 25, such as an MCS, or respective MCSs, to be used for the uplink transmissions, transmission poser level, or respective transmission power levels, to be used for the uplink transmissions, etc. In an embodiment, the scheduling frame 1308 includes the OFDMA uplink scheduling element 750 of FIG. 7B. In another embodiment, the scheduling frame 1308 provides channel allocation information and/or OFDMA uplink data unit length indication in another suitable manner.

In an embodiment, each client station 25 determines, based on the scheduling frame 1308, the respective sub-channels allocated to the client station 25 and/or the indicated length of an uplink OFDM data unit that the client station 25 can transmit to the AP 14. During a time t4, the client stations 25 transmit respective uplink OFDM data units 1312 as parts of an OFDMA transmission 1310 to the AP 14. In an embodiment, the respective OFDM units 1312 are transmitted via the respective sub-channels allocated to the client stations 25 according to indications in the scheduling frame 1308. In an embodiment, each of the OFDM data units 1312 is of the OFDM data unit length indicated in the scheduling frame 1308. In an embodiment, the AP 14 receives the OFDMA transmission 1310 from the client stations 25 and obtains the data transmitted by the client stations 25 in respective OFDM sub-channels allocated to the client stations 25. During a time t5, the AP 14 transmits respective acknowledgement frames 1314 that acknowledge successful receipt of the OFDM data units 1310. In an embodiment, the respective acknowledgment frames 1314 are transmitted, as parts of an OFDMA transmission to the client stations 25, in the respective uplink channels allocated to the client stations 25.

In some embodiments and/or scenarios, the AP 14 allocates a particular channel for downlink transmission to multiple client stations 25 as part of an OFDMA transmission to a plurality of client stations 25. In this embodiment, the AP 14 transmits an OFDMA data unit that includes, in a sub-block corresponding to the particular sub-channel allocated to multiple client stations 25, respective OFDM data units directed to each of the multiple client stations 25. In an embodiment, transmission of multiple OFDM data units in a single channel allocated to multiple client stations 25 is multiplexed in time among the multiple client stations 25. For example, in an embodiment, a sub-channel X is allocated to a first client station 25 and a second client station 25. In an embodiment, data corresponding to the first client station is modulated onto a first subset of OFDM sub-carriers corresponding to channel X, and data corresponding to the second client station 25 is modulated onto a second subset OFDM sub-carriers corresponding to the sub-channel X, wherein the second subset of OFDM sub-carriers follows the first subset of OFDM sub-carriers in time domain. Accordingly, in this embodiment, an OFDM data unit directed to the first client station is transmitted in the sub-channel X, as part of an OFDMA transmission to a plurality of client stations, before transmission of an OFDM data unit directed to the second client station in the same sub-channel X as part of the OFDMA transmission to the plurality of client stations.

Continuing with the same example, in an embodiment, to prevent an acknowledgement frame from the first client station to interfere with transmission of the OFDM data unit to the second client station, OFDM data unit directed the first client station includes an indication that the first client station should not immediately acknowledge receipt of the data unit. For example, a PHY preamble or a MAC header of the OFDM data unit directed to the first client station includes an ACK policy field set to indicate that an immediate acknowledgement of the data unit is not required, in an embodiment. On the other hand, the OFDM data unit directed to the second client station indicates that an immediate acknowledgement is required, in an embodiment. Accordingly, the second client station transmits an acknowledgement frame after successfully receiving the OFDM data unit directed to the second client station, in an embodiment.

Similarly, in an embodiment, the AP allocates a particular sub-channel for uplink transmission by multiple client stations as part of an OFDMA transmission from a plurality of client stations to the AP, in an embodiment. The multiple client stations transmit respective OFDM data units, via the particular channel, to the AP 14 as part of the OFDMA transmission from a plurality of client stations 25 to the AP 14, in this embodiment. Similar to transmission of multiple OFDM downlink data units in a single sub-channel allocated to multiple client stations, transmission of the multiple OFDM uplink data units in a single channel is multiplexed in time among the multiple client stations, in an embodiment. In an embodiment, when a first OFDM data unit and a second OFDM data unit are transmitted from respective client stations in a same sub-channel as part of an OFDMA transmission to the AP, wherein the first OFDM data unit is transmitted in the sub-channel before transmission of the second OFDM data unit is the sub-channel, the AP does not immediately acknowledge receipt of the first OFDM data unit so as not to interfere with transmission of the second OFDM data unit.

Figures 14A, 14B:
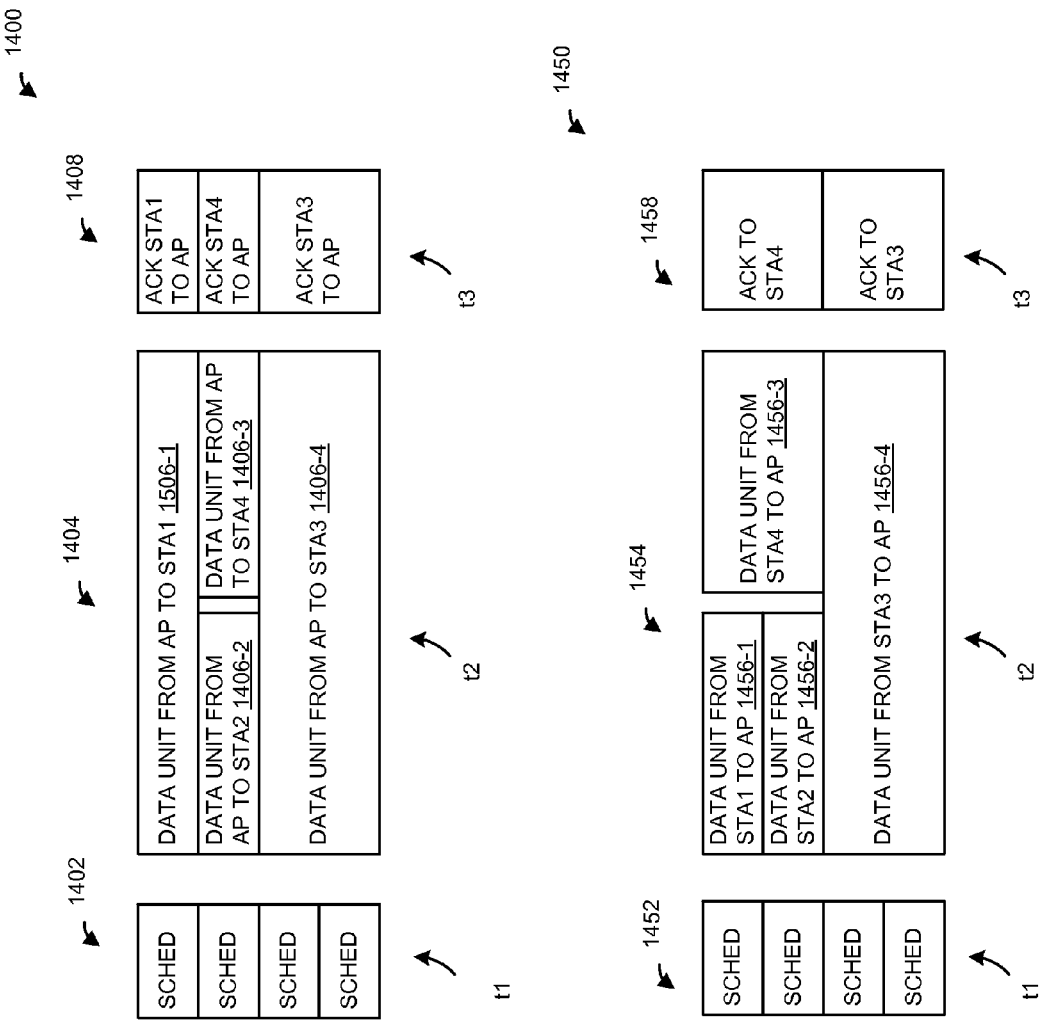
FIG. 14A is a diagram of an example frame exchange between an AP and a plurality of client stations in a sub-channel is allocated for downlink transmission to multiple client stations, according to an embodiment.
FIG. 14B is a diagram of an example frame exchange between an AP and a plurality of client stations in a sub-channel is allocated for uplink transmission from multiple client stations, according to an embodiment.

FIG. 14A is a diagram of an example frame exchange 1400 between the AP 14 and a plurality of client stations 25, according to an embodiment. During a time t1, the AP 14 transmits a scheduling frame 1404 to a plurality of client stations 25. The scheduling frame 1404 includes downlink channel allocation information for the plurality of client stations 25. The scheduling frame 1404 indicates that a first 20 MHz sub-channel is allocated to a first client stations 25 (STA1), a first portion of a second 20 MHz sub-channel is allocated to a second client stations 25 (STA2), a second portion of the second 20 MHZ sub-channel is allocated to a fourth client station 25 (STA4), and a 40 MHz sub-channel that includes a third 20 MHZ sub-channel and fourth 20 MHz sub-channel is allocated to a third client station 25 (STA3). In an embodiment, the scheduling frame 1402 includes the OFDMA downlink scheduling element 700 of FIG. 7A. In an embodiment, the respective channel subfields corresponding to the AID of STA 2 and AID of STA 4 are set to indicate that the second 20 MHz channel is allocated to each of STA1 and STA2.

During a time t2, the AP 14 transmits OFDM data units 1406 as part of an OFDMA transmission 1404. In an embodiment, a preamble or a header of the OFDM data unit 1406-2, transmitted in the first portion of the second 20 MHz sub-channel includes an indication that an immediate acknowledgement is not required for the OFDM data unit 1406-2. For example, an ACK policy field in the PHY preamble or the MAC header of the OFDM data unit 1406-2 indicates that an immediate acknowledgement is not required. On the other hand, a PHY preamble or a MAC header of the OFDM data unit 1406-3, transmitted in the second portion of the second 20 MHz sub-channel includes an indication that an immediate acknowledgement is required for the OFDM data unit 1406-3. For example, an ACK policy field in the PHY preamble or the MAC header of the OFDM data unit 1406-3 indicates that an immediate acknowledgement is required.

During a time t3, client stations STA1, STA3 and STA4 transmit respective acknowledgement (ACK) frame 1408 to the AP 14 as part of an OFDMA transmission to the AP 14, in an embodiment. In an embodiment, ACK frames 1408 are transmitted in the respective sub-channels allocated to the client stations STA1, STA3 and STA4 indicated in the scheduling frame 1402. Client station STA2 does not transmit an ACK frame immediately (e.g., after SIFS) after reception of the OFDM data unit 1406-2, according to the ACK policy indicated in the data OFDM data unit 1406-2, so as not to interfere with transmission of the OFDM data unit 1406-3, in an embodiment.

FIG. 14B is a diagram of an example frame exchange 1450 between the AP 14 and a plurality of client stations 25, according to an embodiment. During a time t1, the AP 14 transmits a scheduling frame 1452 to a plurality of client stations 25. The scheduling frame 1452 includes uplink channel allocation information for the plurality of client stations 25. The scheduling frame 1452 indicates that a first portion of a first 20 MHz sub-channel is allocated to a first client stations 25 (STA1), a first portion of a second 20 MHz sub-channel is allocated to a second client stations 25 (STA2), a 40 MHZ sub-channel that includes a second portion of the first 20 MHZ sub-channel and a second portion of the second 20 MHz sub-channel is allocated to a fourth client station 25 (STA4), and a 40 MHz sub-channel that includes a third 20 MHz-sub-channel and a fourth 20 MHz sub-channel is allocated to a third client station 25 (STA3). In an embodiment, the scheduling frame 1452 includes the OFDMA uplink scheduling element 700 of FIG.

7A. In an embodiment, the respective channel subfields corresponding to the AID of STA 1, AID of STA2, and AID of STA 4 are set to indicate portions of the first 20 MHz sub-channel and portions of the second 20 MHz sub-channel are allocated to each of STA1, STA2 and STA4.

During a time t2, the client stations 25 transmit respective OFDM data unit 1456 to the AP 14, as part of an uplink OFDM data unit 1454 to the AP 14, using channel allocation indicated in the scheduling frame 1452. In an embodiment, each the data units 1456-1 and 1456-2 includes an indication (e.g., ACK policy indication) in a preamble or a header of the data unit that an immediate acknowledgement is not required for the data unit. During a time t3, the AP 14 transits respective ACK frames 1458 to acknowledge successful receipt of the data units 1456-3 and 1456-4. In an embodiment, the respective ACK frames 1458 are transmitted in the respective sub-channels allocated to the client stations STA3 and STA4 indicated in the scheduling frame 1452.

In some embodiment, the AP 14 is configured to obtain information regarding uplink traffic characteristics from a plurality of client stations 25, and to schedule uplink OFDMA transmissions from the client stations 25 based on the uplink traffic characteristics obtained from the client stations 25. For example, in an embodiment, each client station 25 of the plurality of client stations 25 transmits a suitable control frame that indicates uplink traffic characteristics for the client station 25 to the AP 14. In another embodiment, the AP 14 obtains information regarding uplink traffic characteristics from a plurality of client stations 25 in another suitable manner. In various embodiments, uplink traffic characteristics that the AP 14 obtains from each client statin 25 includes one or more of (i) a service interval proposed by the client station 25, (ii) data rate proposed by the client station 25 for each access category (AC) of traffic at the client station 25, (iii) proposed time or amount of burst of traffic that the client station 25 can transmit during a service interval, etc.

In an embodiment, the AP 14 schedules uplink OFDMA transmissions by the client stations 25 based on the uplink traffic characteristics obtained from the client stations 25. For example, the AP 14 forms one or more OFDMA groups of client stations 25 by grouping client stations 25 having similar uplink traffic characteristics into an OFDMA group. In an embodiment, the AP 14 determines a suitable duration and/or a suitable time interval for communications between the AP and the client stations 25 of each of the one or more OFDMA groups of client stations 25. In an embodiment, the AP 14 signals to the client stations 25 the determined uplink OFDMA parameters for the client stations 25. For example, the AP 14 transits one or more suitable control frames to the client stations 25 to signal the determined uplink OFDMA parameters to the client stations 25. The determined uplink OFDMA parameters that the AP 14 provides to the client stations 25 include, for example, indications of and OFDMA group (e.g. group number) to which each client station 25 belongs, start time of a service period for the OFDMA group, duration of a service period for the OFDMA group, service period interval for the OFDMA group, etc.

In another embodiment, the AP 14 considers downlink traffic characteristics for client stations 25, in addition to or instead of uplink traffic characteristics of the client stations 25, when forming OFDMA groups of client stations 25 and/or scheduling OFDMA communications with the client stations 25. For example, the AP 14 forms and OFDMA group of client stations 25 having similar downlink traffic characteristics and similar uplink traffic characteristics, in an embodiment. The AP 14 then defines a scheduling period and a scheduling interval for the OFDMA group, wherein the scheduling period includes both downlink OFDMA transmissions to the client stations 25 in the OFDMA group and uplink OFDMA transmissions from the client stations 25 in the OFDMA group, in an embodiment. In yet another embodiment, the AP 14 defines a scheduling period and a scheduling interval for a downlink OFDMA group, wherein the scheduling period includes only downlink transmissions to the client stations 25 in the OFDMA group.

Figure 15:
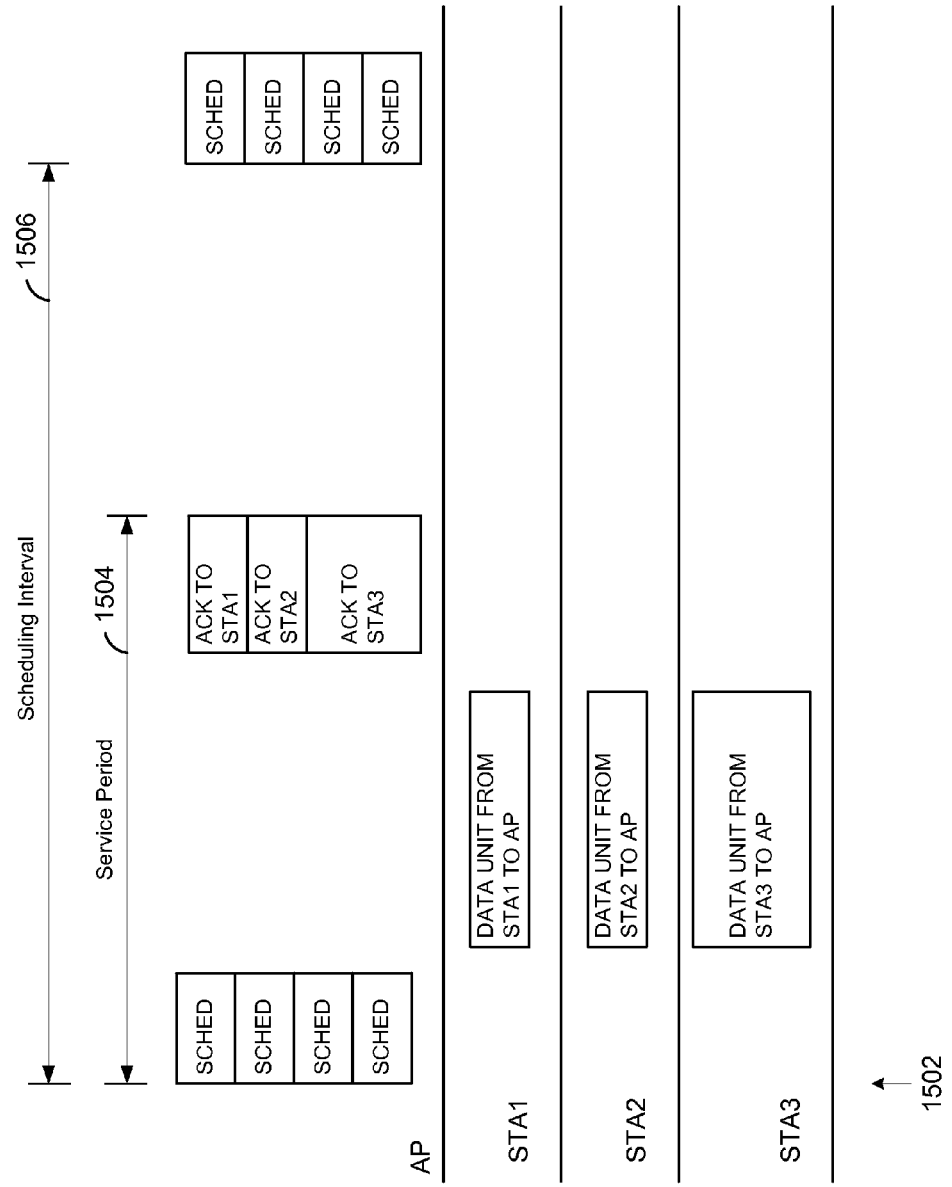
FIG. 15 is a diagram illustrating example uplink OFDMA parameters for an OFDMA group of client stations, and communications between an AP and client stations of the OFDMA group that occur during time periods defined by the OFDMA parameters, according to an embodiment.

FIG. 15 is a diagram illustrating example uplink OFDMA parameters 1500 for an OFDMA group of client stations 25, and communications between the AP 14 and client stations 25 of the OFDMA group that occur during time periods defined by the OFDMA parameters 1500, according to an embodiment. The example uplink OFDMA parameters 1500 in FIG. 15 include a start time parameter 1502 that indicates a start of communications between the AP 14 and the client stations 25 of the OFDMA group, a service period 1504 that defines a time duration of communications between the AP 14 and the client stations 25 of the OFDMA group, and a scheduling interval 1506 that defines an interval between two consecutive service periods for communications between the AP 14 and the client stations 25 of the OFDMA group. In the embodiment of FIG. 15, the service period 1504 includes a frame exchange between the AP 14 and the client stations 25 in the OFDMA group, in which an uplink OFDMA data unit is transmitted from the client stations 25 in the OFDMA group to the AP 14. For example, the service period 1504 includes the frame exchange 900 of FIG. 9, in an embodiment. As another example, in another embodiment, the service period 1504 includes the frame exchange 1000 of FIG. 10A or the frame exchange 1030 of FIG. 10B. As yet another example, the service period 1504 includes the frame exchange 1300 of FIG. 13A. As yet another example, the service period 1504 includes the frame exchange 1400 of FIG. 14B.

In another embodiment, the service period 1504 includes both uplink and downlink data transmissions between the AP 14 and the client stations 25 in the OFDMA group. For example, the service period 1504 includes the frame exchange 1100 of FIG. 11A, the frame exchange 1130 of FIG. 11B, or the frame exchange 1150 of FIG. 11C, in some embodiments. As another example, in another embodiment, the service period 1504 includes the frame exchange 1200 of FIG. 12. In yet another embodiment, the service period 1504 is a downlink OFDMA service period that includes transmission of data in only the downlink direction from the AP 14 to client stations 25. For example, the service period 1504 includes the frame exchange 600 of FIG. 6 or the frame exchange 800 of FIG. 8, in some embodiments. The service period 1504 includes other suitable frame exchanges between the AP 14 and the client stations 25 of the OFDMA group for which the service period 1504 is defined by the AP 14, in other embodiments.

Figure 16:
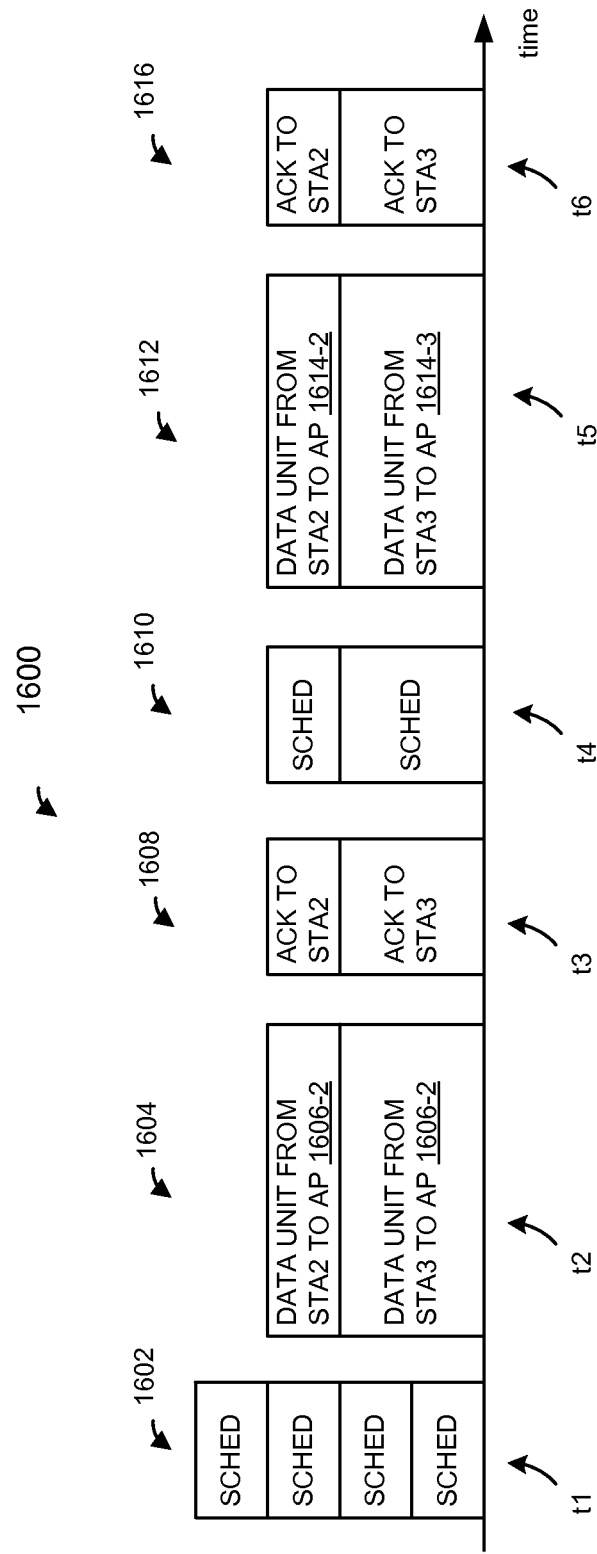
FIG. 16 is a diagram of an example frame exchange between an AP and a plurality of client stations in which a collision is encountered in sub-channels allocated to one or more client stations, according to an embodiment.

FIG. 16 is a diagram of an example frame exchange 1600 between the AP 14 and a plurality of client stations 25, according to an embodiment. In the embodiment of FIG. 16, during a time t1, the AP transmits a first scheduling frame 1602 to a plurality of client stations 25. The first scheduling frame 1602 identifies the plurality of the client stations 25 and provides uplink channel allocation information for the plurality of client stations 25. In particular, the first scheduling frame 1602 identifies three client stations 25 (STA1, STA3 and STA3), and provides channel allocation for the three client stations 25, in the illustrated embodiment. During a time t2, the AP 14 receives respective OFDM data units 1606 as parts of an OFDMA transmission from some but not all client stations 25 of the plurality the client stations 25. In particular, the AP 14 receives respective OFDM data units 1606 from STA2 and STA3, but does not receive an OFDM data nit from STA1 , in the illustrated embodiment.

During a time t3, the AP 14 transmits respective ACK frames 1610 to the client stations from which the AP 14 received OFDM data units 1602. During a time t4 , the AP 14 transmits a second scheduling frame 1610 that identifies the client stations 25 from which the AP 14 received OFDM data units 1606 during the time interval t2 , and does not identify client stations 25 from which the AP 14 did not receive OFDM data units 1606 during the time t2. The second scheduling frame 1610 is transmitted in each of the sub-channels except for the sub-channel previously allocated to the client stations 25 from which the AP 14 did not receive an OFDM data unit during the time t2, in an embodiment. During a time t5, receives respective OFDM data units 1612 from the client stations 25 indicated in the scheduling frame 1610. During a time t6, the AP 14 transmits respective ACK frames 1616 to the client 25 from which the AP 14 received OFDM data units 1614 during the time t5, in an embodiment.

Figure 17:
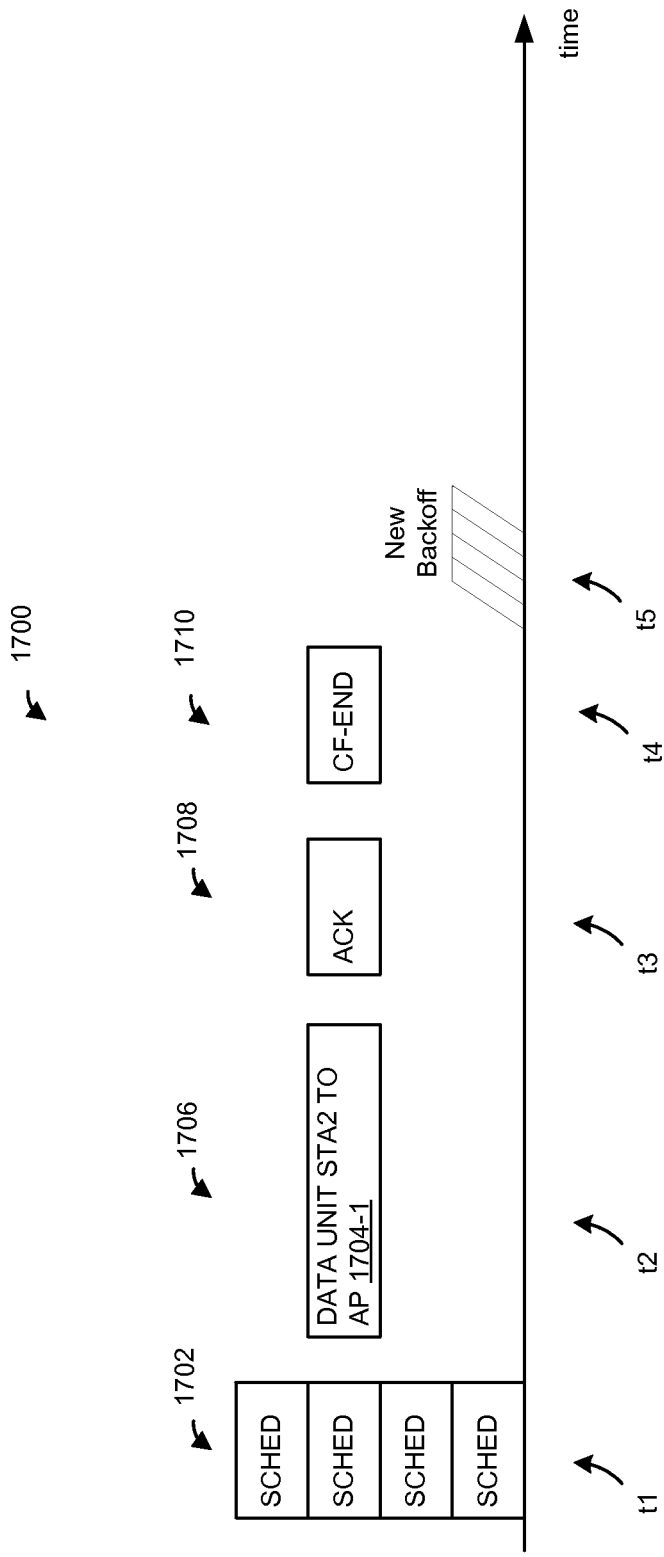
FIG. 17 is a diagram of an example frame exchange between an AP and a plurality of client stations in which a collision is encountered in sub-channels allocated to one or more client stations, according to another embodiment.

FIG. 17 is a diagram of an example frame exchange 1700 between the AP 14 and a plurality of client stations 25, according to an embodiment. During a time t1, the AP transmits a scheduling frame 1702 to a plurality of client stations 25. The scheduling frame 1702 provides uplink channel allocation information to the plurality of client stations 25. During a time t2, the AP 14 receives an OFDMA transmission that includes an OFDM data unit 1806 from one of the client stations 25 of the plurality of client stations 25. During a time t3, the AP 14 transmits an ACK frame 1708 to the one client station 25 from which the AP 14 received the OFDM data unit 1706.

Because the AP 14 receives an OFDM data unit from only one of the client stations 25, the AP 14 determines only the sub-channel allocated to the one of the client stations 25 is currently available for transmission by the one of the client stations 25, and that the sub-channels allocated to the other client stations 25 are currently not available for transmission by the other client stations 25, in an embodiment. The AP 14 decides to terminate the TXOP, in an embodiment. During a time t4, to signal termination of the TXOP, the AP 14 transmits a contention free end (CF-end) frame 1710 to the one client station 25 from which the AP 14 received the OFDM data unit 1706 to indicate termination of the contention free TXOP to the one client station 25. During a time t5, the AP 14 conducts a CSMA/CA procedure with a new contention window backoff, in an embodiment, in an embodiment.

Figure 18A:
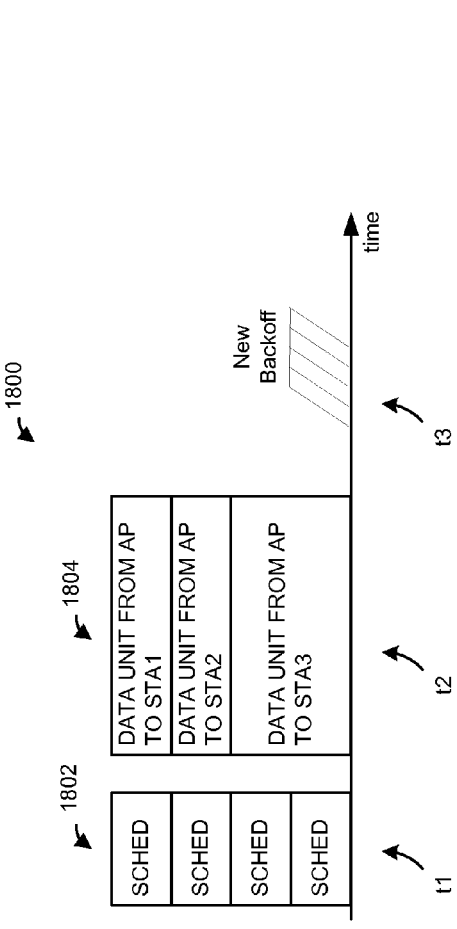
FIG. 18A is a diagram of an example frame exchange between an AP and a plurality of client stations in which a collision is encountered in sub-channels allocated to one or more client stations, according to another embodiment.

FIG. 18A is a diagram of an example frame exchange 1800 between the AP 14 and a plurality of client stations 25, according to an embodiment. During a time t1, the AP transmits a scheduling frame 1802 to a plurality of client stations 25. The scheduling frame 1802 provides downlink channel allocation information to the plurality of client stations 25. During a time t2, the AP 14 transmits an OFDMA data unit 1804 that includes respective OFDM data units 1806 directed to the client stations 25 of the plurality of client stations 25. The AP 14 does not receive any ACK frames from the client stations 25 in a time period during which ACK frames are expected to be received from the client stations 25, in the illustrated embodiment. Because the AP 14 does not receive any ACK frames, the AP 14 terminates the contention free TXOP. During a time t3, the AP 14 conducts a CSMA/CA procedure with a new contention window backoff, in an embodiment, in an embodiment.

Figure 18B:
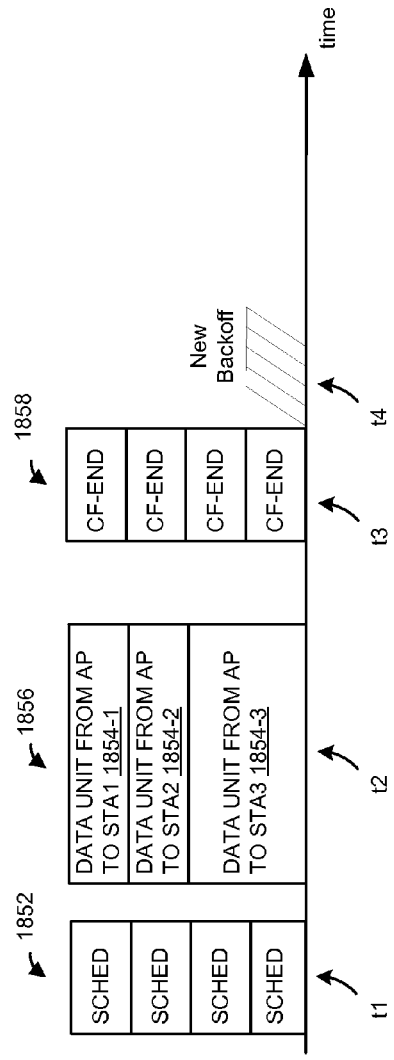
FIG. 18B is a diagram of an example frame exchange between an AP and a plurality of client stations in which a collision is encountered in sub-channels allocated to one or more client stations, according to another embodiment.

FIG. 18B is a diagram of an example frame exchange 1850 between the AP 14 and a plurality of client stations 25, according to an embodiment. The frame exchange 1850 is similar to the frame exchange 1800 of FIG. 8A, except that in the frame exchange 1850, the AP 14 transmits a CF-Free frame 1858 during a time t3, prior to conducting a CSMA/CA procedure with a new contention window backoff during a time, in the illustrated embodiment.

Figure 19A:
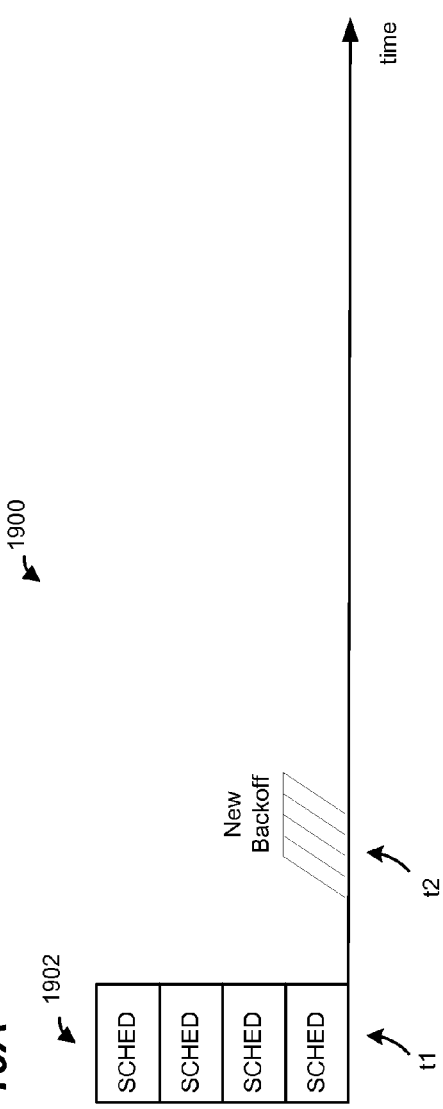
FIG. 19A is a diagram of an example frame exchange between an AP and a plurality of client stations in which a collision is encountered in sub-channels allocated to one or more client stations, according to another embodiment.

FIG. 19A is a diagram of an example frame exchange 1900 between the AP 14 and a plurality of client stations 25, according to an embodiment. During a time t1, the AP transmits a scheduling frame 1902 to a plurality of client stations 25. The scheduling frame 1902 provides uplink channel allocation information to the plurality of client stations 25. However, the AP 14 does not receive any OFDM data unit from the client stations 25 in the time during which the OFDM data units are expected to be received from the client stations 25. Because the AP 14 does not receive any OFDM data units from the client stations 25, the AP 14 terminates the contention free TXOP. During a time t2, the AP 14 conducts a CSMA/CA procedure with a new contention window backoff, in an embodiment, in an embodiment.

Figure 19B:
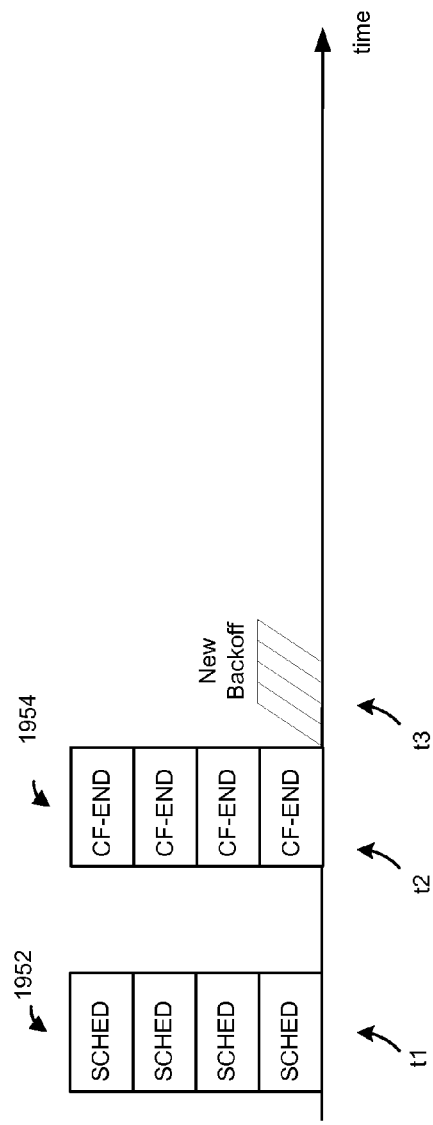
FIG. 19B is a diagram of an example frame exchange between an AP and a plurality of client stations in which a collision is encountered in sub-channels allocated to one or more client stations, according to another embodiment.

FIG. 19B is a diagram of an example frame exchange 1950 between the AP 14 and a plurality of client stations 25, according to an embodiment. The frame exchange 1950 is similar to the frame exchange 1900 of FIG. 19A, except that in the frame exchange 1950, the AP 14 transmits a CF-End frame 1954 during a time t2, prior to conducting a CSMA/CA procedure with a new contention window backoff during a time t3, in the illustrated embodiment.

In various frame changes described above with respect to FIG. 6 and FIGS. 8-19, the time t1 generally at the beginning of a TXOP obtained by (e.g., based on a suitable channel assessment procedure, such as CSMA/CA) or scheduled by the AP 14, in at least some embodiments. Subsequent times, such as time t2, time t3, time t4, etc. during which certain frames or data units are transmitted the AP 14 or the client stations 25, generally begin upon expiration of a predetermined time interval, such as a time interval corresponding to a short inter-frame space (SIFS), after completion of transmission or reception of the previous frame or data unit transmitted in the frame exchange, in at least some embodiments. Accordingly, consecutive frames and data units in the described frame exchanges are generally separated, in time, by certain predetermined time intervals, in such embodiments.

Further, in some embodiments, a predetermined time period that is greater than SIFS is defined, and at least some of the consecutive frames and data units in the described frame exchanges are separated by the predetermined interval greater than SIFs. For example, a predetermined time period that is greater than SIFS and less than PIFS is defined. For example, the greater predetermined time interval may provide sufficient time for the client stations 25 to decode a scheduling frame that includes uplink scheduling information, and to prepare for uplink transmission based on the uplink scheduling information provided by the scheduling frame 902, in at least some embodiments. Additionally or alternatively, certain scheduling frames, such as scheduling frames that include uplink scheduling information, include padding at the end of the scheduling frames to provide sufficient time for the client stations to prepare for uplink transmission based on the uplink scheduling information provided by the scheduling frame, in some embodiments. For example, a MAC header included in a scheduling frame indicates a length of a valid payload, wherein the one or more padding bits follow the valid payload, in an embodiment. Further, a signal field of a PHY preamble of the scheduling frame includes an indication of the entire length of the scheduling frame, which includes the one or more padding bits at the end of the scheduling frame, in an embodiment.

In various embodiments described above with respect to FIGS. 8-19, transmission of various downlink OFDMA data units is triggered by including scheduling information (e.g., downlink channel allocation) for the downlink OFDMA transmission in a signal field (e.g., in the HEW-SIGA field) of the OFDMA transmission rather by transmission of a scheduling frame, which includes such scheduling information, prior to the downlink OFDMA transmission. For example, various downlink OFDMA data units (e.g., the OFDMA data unit 1104 of FIGS. 4A and 4C, the OFDMA data unit 1134 of FIG. 4B, the OFDMA data unit 1204 of FIG. 12, the OFDMA data unit 1454 of FIG. 14B, etc.) include downlink scheduling information in a signal field of the OFDMA data unit, the same as or similar to the OFDMA data unit 602 of FIG. 6. In at least some such embodiments, transmission of a scheduling frame that includes downlink scheduling information prior to transmission of the downlink OFDMA data unit is omitted from the corresponding frame exchange.

In at least some embodiment, TXOPs scheduled or obtained by the AP 14 for downlink and/or uplink OFDMA transmissions between the AP 14 and a plurality of client stations 25 are protected from transmissions by other client stations 25. In some embodiments, the AP 14 broadcasts OFDMA parameter to client stations 25, for example by including OFDMA parameters, defined for one or more OFDMA groups, in a broadcast frame transmitted by the AP 14, such as a beacon frame or another broadcast frame transmitted by the AP 14. For example, the broadcast frame, such, as the beacon frame, indicates service information corresponding to each of one or more OFDMA groups. In an embodiment, to indicate service information for a particular OFDMA group, the broadcast frame includes one or more of (i) an indication of an offset of a start time of a service period for the OFDMA group with respect to the start or end of the broadcast frame, (ii) an indication of a length of the service period for the OFDMA group, (iii) an indication of a scheduling interval between two consecutive service periods for the OFDMA group, etc. The broadcast frame serves to protect a service period scheduled for a particular OFDMA group from transmissions by other client stations that are not members of the OFDMA group, in an embodiment. For example, the service periods indicated by the broadcast frame for particular OFDMA groups are treated by the client stations 25 as restricted access windows (RAW) intended for access by only the client stations 25 that are members of the corresponding OFDMA groups.

In another embodiment, a request to send (RTS) frame and/or a clear to send (CTS) frame is used at the beginning of a service period reserved for a particular OFDMA group or immediately before the beginning of the scheduled period to protect the duration of the service period from transmissions by client stations 25 that do not belong to the OFDMA group. For example, in an embodiment, the AP 14 transmits a request to send frame to each of one or more of the client stations 25 that belong to the OFDMA group, signaling to the client stations 25 that are members of the OFDMA group that the client stations 25 are allowed to transmit and/or receive in the upcoming service period, while indicating to other client stations 25 that are not members of the OFDMA group that the client stations 25 are not allowed to transmit frames in the upcoming service period. In response to receiving the RTS frame from the AP 14, each of the one or more client stations 25 transmits a CTS frame to the AP 14. In an embodiment, the RTS/CTS frames are transmitted in each sub-channel intended to be used during the service period scheduled for the OFDMA group. In an embodiment, the RTS/CTS indicate a length or duration of the service period scheduled for the OFDMA group. In an embodiment, client stations 25 that receive an RTS and/or a CTS frame and that are not members of the OFDMA group being protected by the RTS and/or the CTS frame refrain from accessing the medium for the duration determined based on the RTS and/or the CTS frame. For example, client stations 25 that receive an RTS and/or a CTS frame set network access allocation (NAV) timers based on NAV duration indication included in the RTS and/or the CTS frame. Client stations 25 that are not members of the OFDMA group being protected by the RTS and/or the CTS frame refrain from accessing the medium until expirations of their NAV timers, in an embodiment. The client stations 25 that belong to the OFDMA group being protected by the RTS and/or the CTS frame, on the other hand, ignore their NAV timers and instead receive and/or transit according to scheduling for the OFDMA group, in an embodiment.

In some embodiment, APs of neighboring basic service sets (BSSs) jointly schedule OFDMA transmissions within the BSSs such that the scheduled OFDMA transmissions in one BSS do not overlap with scheduled OFDMA transmissions in one or more neighboring BSSs. For example, the AP 14 signals to APs of one or more neighboring BSSs the time of a scheduled OFDMA TXOP scheduled by the AP 14.

In some embodiment, the AP 14 and one or more of the client stations 25 are configured to support sub-channel selective transmissions (SST). In an embodiment, the AP 14 signals its support for SST in a control frame or a management frame, such as a beacon frame. In an embodiment, each of the one or more client stations 25 that support SST signals its support for SST in a control frame or a management frame, such as an association frame. In some such embodiments, the AP 14 indicates, to the client stations 25 that support SST, respective sub-channels that will be used for downlink transmissions to the client stations 25 and/or respective sub-channels to be used for uplink transmissions by the client stations. The respective sub-channels that will be used for downlink transmissions to the client stations 25 and/or respective sub-channels to be used for uplink transmissions by the client stations are indicated for use during certain periods, such as a time period between two consecutive control or management frames, such as beacon frames, that announce respective sub-channel allocation. In such embodiment, the AP 14 and the client stations 25 can transmit and receive OFDMA data units using the channels sub-allocated to the client stations by SST sub-channel indications. In at least some such embodiments, the AP 14 need not transmit a scheduling frame to indicate sub-channels for downlink and/or for uplink OFDMA transmissions. In some embodiment, the AP 14 transmits scheduling frames to a plurality of client stations 25 in respective SST sub-channels allocated to the client stations 25, wherein different scheduling frames transmitted to the different client stations 25 include different, user-specific, information for the different client stations 25, in some embodiments.

Figure 20A:
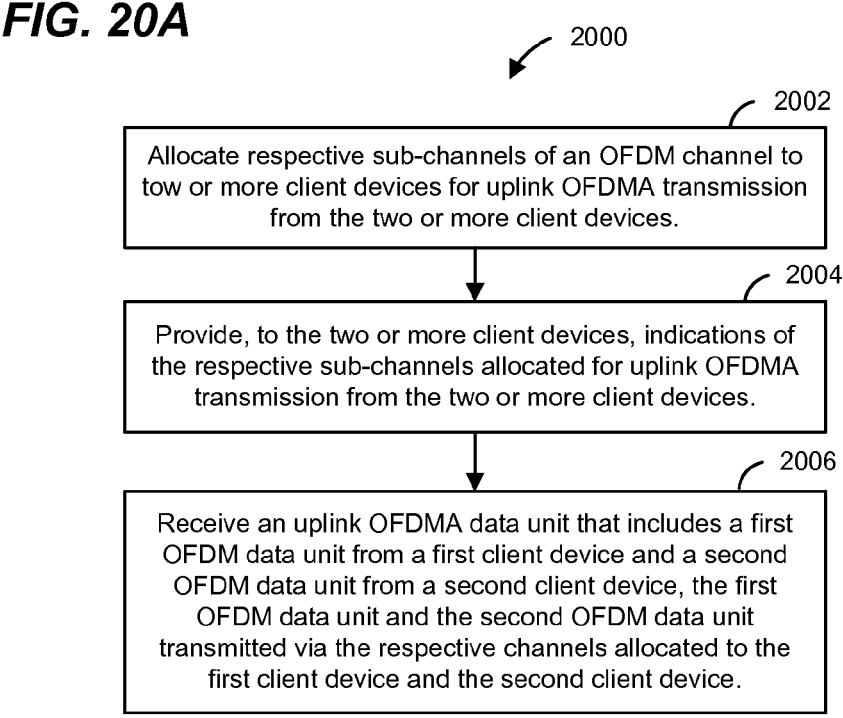
FIG. 20A is a flow diagram of an example method that is implemented by an AP in a WLAN, according to an embodiment.

FIG. 20A is a flow diagram of an example method 2000 for simultaneously communicating with multiple communication devices in a WLAN, according to an embodiment. In an embodiment, the method 2000 is implemented by an AP in the WLAN, according to an embodiment. With reference to FIG. 1, the method 2000 is implemented by the host processor 15 of the AP 14. For example, the method 2000 is implemented by the MAC processing unit 18 and/or by the PHY processing unit 20 of the host processor 15, in an embodiment. In other embodiments, the method 2000 is implemented by other components of the AP 14, or is implemented by a suitable communication device other than the AP 14.

At block 2002, respective sub-channels of an OFDM channel are allocated to two or more client devices for uplink OFDMA transmission from the two or more client devices. At block 2004, indications of the respective two or more sub-channels allocated to the two or more client devices are provided to the two or more client devices. For example, a scheduling frame that includes indications of the respective sub-channels is transmitted to the two or more client devices, in an embodiment. In other embodiments, indications of the respective sub-channels are provided to the two or more client devices in other suitable manners.

At block 2004, an OFDMA data unit is received. In an embodiment, the OFDMA data unit includes at least a first OFDM data unit from a first client device of the two or more client devices a second OFDM data unit from a second client device of the two or more client devices. In an embodiment, the first OFDM data unit is transmitted by the first client device at least substantially simultaneously with transmission of the second OFDM data unit by the second client device. In an embodiment, the first OFDM data unit is transmitted by the first client device in the sub-channel allocated at block 2002 to the first client device and the second OFDM data unit is transmitted by the second client device in the sub-channel allocated at block 2002 to the second client device.

Figure 20B:
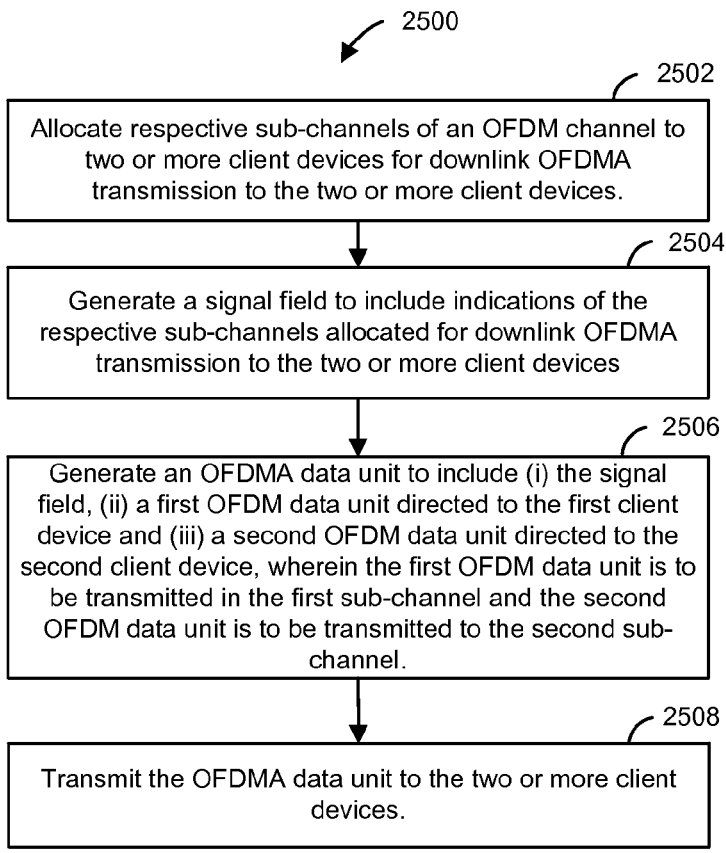
FIG. 20B is a flow diagram of another example method that is implemented by an AP in a WLAN, according to another embodiment.

FIG. 20B is a flow diagram of an example method 2500 for simultaneously communicating with multiple communication devices in a WLAN, according to another embodiment. In an embodiment, the method 2500 is implemented by an AP in the WLAN, according to an embodiment. With reference to FIG. 1, the method 2500 is implemented by the host processor 15 of the AP 14. For example, the method 2500 is implemented by the MAC processing unit 18 and/or by the PHY processing unit 20 of the host processor 15, in an embodiment. In other embodiments, the method 2500 is implemented by other components of the AP 14, or is implemented by a suitable communication device other than the AP 14.

At block 2502, respective sub-channels of an OFDM channel are allocated to two or more client devices for downlink OFDMA transmission to the two or more client devices. At block 2504, a signal field is generated. The signal field includes indications of the respective sub-channels allocated, at block 2502, for downlink transmission to the two or more client devices. At block 2506, an OFDMA data unit is generated to include (i) the signal field generated at block 2504, (ii) a first OFDM data unit directed to the first one of the two or more second communication devices and (iii) a second OFDM data unit directed to the second one of the two or more second communication devices, wherein the first OFDM data unit is to be transmitted to the first sub-channel and the second OFDM data unit is to be transmitted in the second sub-channel. In an embodiment, the OFDMA data unit 600 of FIG. 6 is generated. In another embodiment, another suitable OFDMA data unit is generated. At block 2508, the OFDMA data unit is transmitted to the two or more client devices.

In an embodiment, a method for simultaneously communication with multiple communication devices in a wireless local area network includes allocating, by a first communication device, respective sub-channels of an orthogonal frequency division multiplexing (OFDM) channel to two or more second communication devices for uplink orthogonal frequency division multiple access (OFDMA) transmission from the two or more second communication devices, including allocating a first sub-channel to a first one of the two or more second communication devices and a second sub-channel to a second one of the two or more second communication devices. The method further includes providing, from the first communication device to the two or more second communication devices, indications of the respective sub-channels allocated for uplink OFDMA transmission from the two or more second communication devices. The method additionally includes receiving, at the first communication device, an uplink OFDMA data unit that includes at least a first OFDM data unit from the first one of the two or more second communication devices and a second OFDM data unit from the second one of the two or more second communication devices, wherein the first OFDM data unit is transmitted from the first one of the two or more second communication devices via the first sub-channel allocated to the first one of the two or more second communication devices and the second OFDM data unit is transmitted from the second one of the two or more second communication devices via the second sub-channel allocated to the second one of the two or more second communication devices.

In other embodiments, the method includes any suitable combination of one or more of the following features.

The method further includes transmitting a scheduling frame to trigger transmission of the uplink OFDMA data unit, wherein the scheduling frame includes the respective indications of the respective sub-channels allocated to the two or more second communication devices.

The method further includes comprising conducting, by the first communication device, a channel assessment procedure to obtain a transmit opportunity for OFDMA communication between the first communication device and the two or more second communication devices, wherein transmitting the scheduling frame comprises transmitting the scheduling frame at a beginning of the obtained transmit opportunity.

Transmitting the scheduling frame comprises transmitting the scheduling frame at a beginning of a scheduled transmit opportunity for OFDMA communication between the first communication device and the two or more second communication devices.

The method further includes determining a length for the uplink OFDMA data unit, and wherein the scheduling frame further includes an indication of the length determined for the uplink OFDMA data unit.

Determining the length for the uplink OFDMA data unit comprises requesting, by the first communication device from the two or more second communication devices, respective indications of each of one or both of (i) amount of data buffered for uplink transmission and (ii) requested medium time for uplink transmission, receiving, at the first communication device, the requested indications from the two or more second communication devices, and determining, by the first communication device, the length for the uplink OFDMA data unit based at least in part on the respective indications received from the two or more second communication devices.

Requesting respective indications by the first communication device from the two or more second communication devices comprises including a request for transmission of the indications in the scheduling frame transmitted by the first communication device.

The scheduling frame further includes a repeat usage indication, wherein the repeat usage indication indicates that the sub-channels allocated for uplink OFDMA transmission from the two or more second communication devices are to be used for multiple consecutive uplink transmissions by the two or more second communication devices.

Allocating respective sub-channels of the OFDM channel for uplink OFDMA transmission from the two or more second communication devices includes allocating a third sub-channel to both (i) a third one of second communication devices and (ii) a fourth one of second communication devices, and wherein the method further comprises indicating, to the fourth one of the second communication devices, a time at which to begin transmitting an uplink OFDM data unit in the third sub-channel, wherein the indicated time begins after an end of transmission of an OFDM data unit in the third-sub-channel by the third one of the second communication devices.

The method further includes indicating, to the third one of the second communication devices that an immediate acknowledgment is not required for the OFDM data unit transmitted in the third-sub-channel by the third one of the second communication device.

Allocating respective sub-channels of the OFDM channel to two or more second communication devices for uplink OFDMA transmission from the two or more second communication devices includes skipping a particular sub-channel of the OFDM channel if the particular sub-channel is determined to be unavailable for transmission.

After receiving the uplink OFDMA data unit, transmitting one or more acknowledgement frames to the two or more second communication devices, wherein the one or more acknowledgement frames are transmitted simultaneously to the two or more second communication devices.

Transmitting the one or more acknowledgement frames comprises transmitting respective acknowledgement frames to the two or more second communication devices as parts of an OFDMA transmission to the two or more second communication devices, wherein the respective acknowledgement frames are transmitted in the respective sub-channels allocated to the two or more second communication devices.

Transmitting the one or more acknowledgement frames comprises transmitting a broadcast acknowledgement frame to the two or more second communication devices, wherein the broadcast acknowledgement frame includes respective acknowledgements for the two or more second communication devices.

The method further includes allocating respective sub-channels of the OFDMA channel for downlink OFDMA transmission to the two or more second communication devices.

The method further includes providing, to the two or more second communication devices, indications of respective sub-channels allocated for downlink OFDMA transmission to the two or more communication devices.

The method further includes transmitting a downlink OFDMA data unit to the two or more second communication devices, wherein the downlink OFDMA data unit includes respective OFDM data units directed to the two or more communication devices transmitted in the respective OFDM data units in the respective sub-channels allocated for downlink OFDMA transmission to the two or more second communication devices.

Receiving the uplink OFDMA data unit and transmitting the downlink OFDMA data unit occur during a same transmission opportunity for OFDMA communication between the first communication device and the two or more second communication devices.

Providing, to the two or more second communication devices, indications of respective sub-channels allocated for downlink OFDMA transmission to the two or more communication devices comprises including the indications in the scheduling frame.

The method further includes receiving, at the first communication device, respective acknowledgement frames from the two or more second communication devices, wherein the acknowledgement frames are transmitted simultaneously by the two or more second communication devices as part of an OFDMA transmission from the two or more second communication devices, wherein the respective acknowledgement frames are transmitted in the respective sub-channels allocated for downlink OFDMA transmission to the two or more second communication devices.

The method further includes allocating respective sub-channels of the OFDMA channel for downlink OFDMA transmission to the two or more second communication devices.

The method further includes generating a downlink OFDMA data unit to include, in a physical layer (PHY) signal field of the downlink OFDMA data unit, indications of the respective sub-channels for downlink OFDMA transmission to the two or more second communication devices.

The method further includes transmitting the downlink OFDMA data unit to the two or more second communication devices, wherein the downlink OFDMA data unit includes respective OFDM data units directed to the two or more client communication transmitted in the respective OFDM data units in the respective sub-channels allocated for downlink OFDMA transmission to the two or more second communication devices.

In another embodiment, a first communication device comprises a network interface configured to allocate respective sub-channels of an orthogonal frequency division multiplexing (OFDM) channel to two or more second communication devices for uplink orthogonal frequency division multiple access (OFDMA) transmission from the two or more second communication devices, including allocating a first sub-channel to a first one of the two or more second communication devices and a second sub-channel to a second one of the two or more communication devices. The network interface is also configured to provide, to the two or more second communication devices, indications of the respective sub-channels allocated for uplink transmission from the two or more second communication devices. The network interface is additionally configured to receive an uplink OFDMA data unit that includes at least a first OFDM data unit from the first one of the two or more second communication devices and a second OFDM data unit from the second one of the two or more second communication devices, wherein the first OFDM data unit is transmitted from the first one of the two or more second communication devices via the first sub-channel allocated to the first of the two or more second communication devices and the second OFDM data unit is transmitted from the second one of the two or more second communication devices via the second sub-channel allocated to the second one of the two or more second communication devices.

In other embodiments, the first communication device includes any suitable combination of one or more of the following features.

The network interface is configured transmit a scheduling frame to trigger transmission of the uplink OFDMA data unit, wherein the scheduling frame provides the respective indications of the respective sub-channels allocated to the two or more second communication devices.

The network interface is further configured to conduct a channel assessment procedure to obtain a transmit opportunity for OFDMA communication between the first communication device and the two or more second communication devices, and transmit the scheduling frame at a beginning of the obtained transmit opportunity.

The network interface is configured to transmit the scheduling frame at a beginning of a scheduled transmit opportunity for OFDMA communication between the first communication device and the two or more second communication devices.

The network interface is further configured to determine a length for the uplink OFDMA data unit, and include, in the scheduling frame, an indication of the length determined for the uplink OFDMA data unit.

The network interface is configured to request, from the two or more second communication devices, respective indications of each of one or both of (i) amount of data buffered for uplink transmission and (ii) requested medium time for uplink transmission, receive the requested indications from the two or more second communication devices, and determine the length for the uplink OFDMA data unit based at least in part on the respective indications received from the two or more second communication devices.

The network interface is configured to request the indications from the two or more second communication devices at least by including a request for transmission of the indications in the scheduling frame.

The network interface is further configured to include, in the scheduling frame, a repeat usage indication, wherein the repeat usage indications indicates that the sub-channels allocated for uplink transmission by the two or more second communication devices are to be used for multiple consecutive uplink transmissions by the two or more second communication devices.

The network interface is further configured to allocate a third sub-channel to both (i) a third one of the second communication devices and (ii) a fourth one of the second communication devices, and indicate, to the fourth one of the second communication devices, a time at which to begin transmitting an uplink OFDM data unit in the third sub-channel, wherein the indicated time begins after an end of an OFDM data unit transmitted in the third-sub-channel by the third one of the second communication devices.

The network interface is further configured to indicate to the third one of the second communication devices that an immediate acknowledgment is not required for the OFDM data unit transmitted in the third-sub-channel by the third one of the second communication devices.

The network interface is configured to, when allocating respective sub-channels of the OFDM channel to the two or more second communication devices for uplink OFDMA transmission from the two or more second communication devices, skip a particular sub-channel of the OFDM channel if the particular sub-channel is determined to be unavailable for transmission.

The network interface is further configured to, after receiving the uplink OFDMA data unit, transmit one or more acknowledgement frames to the two or more second communication devices, wherein the one or more acknowledgement frames are transmitted simultaneously to the two or more second communication devices.

The network interface is configured to transmit respective acknowledgement frames to the two or more second communication devices as parts of an OFDMA transmission to the two or more second communication devices, wherein the respective acknowledgement frames are transmitted in the respective sub-channels allocated to the two or more second communication devices.

The network interface is configured to transmit a broadcast acknowledgement frame to the two or more second communication devices, wherein the broadcast acknowledgement frame includes respective acknowledgements for the two or more second communication devices.

The network interface is further configured to allocate respective sub-channels of the OFDMA channel for downlink OFDMA transmission to the two or more second communication devices.

The network interface is further configured to provide, to the two or more second communication devices, indications of respective sub-channels allocated for downlink OFDMA transmission to the two or more communication devices.

The network interface is further configured to transmit a downlink OFDMA data unit to the two or more second communication devices, wherein the downlink OFDMA data unit includes respective OFDM data units directed to the two or more communication devices transmitted in the respective OFDM data units in the respective sub-channels allocated for downlink OFDMA transmission to the two or more second communication devices.

The network interface is further configured to receive the uplink OFDMA data unit and transmit the downlink OFDMA data unit during a same transmission opportunity for OFDMA communication between the first communication device and the two or more second communication devices.

The network interface is configured to provide, to the two or more second communication devices, indications of respective sub-channels allocated for downlink OFDMA transmission to the two or more communication devices at least by including the indications in the scheduling frame.

The network interface is further configured to receive respective acknowledgement frames from the two or more second communication devices, wherein the acknowledgement frames are transmitted simultaneously by the two or more second communication devices as part of an OFDMA transmission from the two or more second communication devices, wherein the respective acknowledgement frames are transmitted in the respective sub-channels allocated for downlink OFDMA transmission to the two or more second communication devices.

The network interface is further configured to allocate respective sub-channels of the OFDMA channel for downlink OFDMA transmission to the two or more second communication devices.

The network interface is further configured to generate a downlink OFDMA data unit to include, in a physical layer (PHY) signal field of the downlink OFDMA data unit, indications of the respective sub-channels for downlink OFDMA transmission to the two or more second communication devices.

The network interface is further configured to transmit the downlink OFDMA data unit to the two or more second communication devices, wherein the downlink OFDMA data unit includes respective OFDM data units directed to the two or more client communication transmitted in the respective OFDM data units in the respective sub-channels allocated for downlink OFDMA transmission to the two or more second communication devices.

In yet another embodiment, a method for simultaneously communication with multiple communication devices in a wireless local area network includes allocating, by a first communication device, respective sub-channels of an orthogonal frequency division multiplexing (OFDM) channel to two or more second communication devices for downlink orthogonal frequency division multiple access (OFDMA) transmission to the two or more second communication devices, including allocating a first sub-channel to a first one of the two or more second communication devices and a second sub-channel to a second one of the two or more communication devices. The method further includes generating a signal field of an OFDMA data unit to include indications of the respective sub-channels allocated for downlink OFDMA transmission from the two or more second communication devices. The method further still includes generating an OFDMA data unit to include (i) the signal field, (ii) a first OFDM data unit directed to the first one of the two or more second communication devices and (iii) a second OFDM data unit directed to the second one of the two or more second communication devices, wherein the first OFDM data unit is to be transmitted to the first sub-channel and the second OFDM data unit is to be transmitted in the second sub-channel. The method additionally includes transmitting the OFDMA data unit to the two or more second communication devices.

In other embodiments, the method includes any suitable combination of one or more of the following features.

The method further includes receiving respective acknowledgement frames from the two or more second communication devices.

The acknowledgement frames are transmitted simultaneously by the two or more second communication devices as part of an OFDMA transmission from the two or more second communication devices, wherein the respective acknowledgement frames are transmitted in the respective sub-channels allocated for downlink OFDMA transmission to the two or more second communication devices.

In still another embodiment, a first communication device comprises a network interface configured to allocate respective sub-channels of an orthogonal frequency division multiplexing (OFDM) channel to two or more second communication devices for downlink orthogonal frequency division multiple access (OFDMA) transmission to the two or more second communication devices, including allocating a first sub-channel to a first one of the two or more second communication devices and a second sub-channel to a second one of the two or more communication devices. The network interface is further configured to generate a signal field of an OFDMA data unit to include indications of the respective sub-channels allocated for downlink OFDMA transmission from the two or more second communication devices. The network interface is further still configured to generate an OFDMA data unit to include (i) the signal field, (ii) a first OFDM data unit directed to the first one of the two or more second communication devices and (iii) a second OFDM data unit directed to the second one of the two or more second communication devices, wherein the first OFDM data unit is to be transmitted to the first sub-channel and the second OFDM data unit is to be transmitted in the second sub-channel. The network interface is additionally configured to transmit the OFDMA data unit to the two or more second communication devices.

In other embodiments, the first communication device includes any suitable combination of one or more of the following features.

The network interface is further configured to receive respective acknowledgement frames from the two or more second communication devices.

The acknowledgement frames are transmitted simultaneously by the two or more second communication devices as part of an OFDMA transmission from the two or more second communication devices, wherein the respective acknowledgement frames are transmitted in the respective sub-channels allocated for downlink OFDMA transmission to the two or more second communication devices.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for simultaneously communication with multiple communication devices in a wireless local area network, the method comprising:
    allocating, by a first communication device, respective sub-channels of an orthogonal frequency division multiplexing (OFDM) channel to two or more second communication devices for uplink orthogonal frequency division multiple access (OFDMA) transmission from the two or more second communication devices, including: (i) allocating non-contiguous sub-channels by skipping a particular sub-channel of the OFDM channel, when the particular sub-channel is determined to be unavailable for transmission, and (ii) allocating a first sub-channel to a first one of the two or more second communication devices and a second sub-channel to a second one of the two or more second communication devices;

providing, from the first communication device to the two or more second communication devices, i) indications of the respective sub-channels allocated for uplink OFDMA transmission from the two or more second communication devices, including indications of the non-contiguous sub-channel allocation, and ii) an indication of a length of the uplink OFDMA transmission from the two or more second communication devices; and receiving, at the first communication device, an uplink OFDMA data unit that includes at least a first OFDM data unit from the first one of the two or more second communication devices and a second OFDM data unit from the second one of the two or more second communication devices, wherein the first OFDM data unit i) has a duration in accordance with the indication of the length provided by the first communication device and ii) is transmitted from the first one of the two or more second communication devices via the first sub-channel allocated to the first one of the two or more second communication devices and the second OFDM data unit i) has the duration in accordance with the indication of the length provided by the first communication device and ii) is transmitted from the second one of the two or more second communication devices via the second sub-channel allocated to the second one of the two or more second communication devices.

2. The method of claim 1, further comprising transmitting a scheduling frame to trigger transmission of the uplink OFDMA data unit, wherein the scheduling frame includes the respective indications of the respective sub-channels allocated to the two or more second communication devices.

3. The method of claim 2, further comprising conducting, by the first communication device, a channel assessment procedure to obtain a transmit opportunity for OFDMA communication between the first communication device and the two or more second communication devices, wherein transmitting the scheduling frame comprises transmitting the scheduling frame at a beginning of the obtained transmit opportunity.

4. The method of claim 2, wherein transmitting the scheduling frame comprises transmitting the scheduling frame at a beginning of a scheduled transmit opportunity for OFDMA communication between the first communication device and the two or more second communication devices.

5. The method of claim 2, further comprising determining, at the first communication device, the length of the uplink OFDMA transmission, and wherein the scheduling frame further includes the indication of the length of the uplink OFDMA transmission.

6. The method of claim 5, wherein determining the length of the uplink OFDMA transmission comprises:
  requesting, by the first communication device from the two or more second communication devices, respective indications of each of one or both of (i) amount of data buffered for uplink transmission and (ii) requested medium time for uplink transmission,
  receiving, at the first communication device, the requested indications from the two or more second communication devices, and
  determining, by the first communication device, the length for the uplink OFDMA transmission based at least in part on the respective indications received from the two or more second communication devices.

7. The method of claim 6, wherein requesting respective indications by the first communication device from the two or more second communication devices comprises including a request for transmission of the indications in the scheduling frame transmitted by the first communication device.

8. The method of claim 2, wherein the scheduling frame further includes a repeat usage indication, wherein the repeat usage indication indicates that the sub-channels allocated for uplink OFDMA transmission from the two or more second communication devices are to be used for multiple consecutive uplink transmissions by the two or more second communication devices.

9. The method of claim 1, wherein allocating respective sub-channels of the OFDM channel for uplink OFDMA transmission from the two or more second communication devices includes allocating a third sub-channel to both (i) a third one of second communication devices and (ii) a fourth one of second communication devices, and wherein the method further comprises indicating, to the fourth one of the second communication devices, a time at which to begin transmitting an uplink OFDM data unit in the third sub-channel, wherein the indicated time begins after an end of transmission of an OFDM data unit in the third-sub-channel by the third one of the second communication devices.

10. The method of claim 9, further comprising indicating, to the third one of the second communication devices, that an immediate acknowledgment is not required for the OFDM data unit transmitted in the third-sub-channel by the third one of the second communication device.

11. The method of claim 1, wherein allocating respective sub-channels of the OFDM channel to two or more second communication devices for uplink OFDMA transmission from the two or more second communication devices includes skipping a particular sub-channel of the OFDM channel if the particular sub-channel is determined to be unavailable for transmission.

12. The method of claim 1, further comprising, after receiving the uplink OFDMA data unit, transmitting one or more acknowledgement frames to the two or more second communication devices, wherein the one or more acknowledgement frames are transmitted simultaneously to the two or more second communication devices.

13. The method of claim 12, wherein transmitting the one or more acknowledgement frames comprises transmitting respective acknowledgement frames to the two or more second communication devices as parts of an OFDMA transmission to the two or more second communication devices, wherein the respective acknowledgement frames are transmitted in the respective sub-channels allocated to the two or more second communication devices.

14. The method of claim 12, wherein transmitting the one or more acknowledgement frames comprises transmitting a broadcast acknowledgement frame to the two or more second communication devices, wherein the broadcast acknowledgement frame includes respective acknowledgements for the two or more second communication devices.

15. The method of claim 2, further comprising:
  allocating respective sub-channels of the OFDM channel for downlink OFDMA transmission to the two or more second communication devices,
  providing, to the two or more second communication devices, indications of the respective sub-channels allocated for downlink OFDMA transmission to the two or more second communication devices, and transmitting a downlink OFDMA data unit to the two or more second communication devices, wherein the downlink OFDMA data unit includes respective OFDM data units directed to the two or more second communication devices transmitted in the respective OFDM data units in the respective sub-channels allocated for downlink OFDMA transmission to the two or more second communication devices.

16. The method of claim 15, wherein receiving the uplink OFDMA data unit and transmitting the downlink OFDMA data unit occur during a same transmission opportunity for OFDMA communication between the first communication device and the two or more second communication devices.

17. The method of claim 15, wherein providing, to the two or more second communication devices, indications of respective sub-channels allocated for downlink OFDMA transmission to the two or more second communication devices comprises including the indications in the scheduling frame.

18. The method of claim 15, further comprising receiving, at the first communication device, respective acknowledgement frames from the two or more second communication devices, wherein the acknowledgement frames are transmitted simultaneously by the two or more second communication devices as part of an OFDMA transmission from the two or more second communication devices, wherein the respective acknowledgement frames are transmitted in the respective sub-channels allocated for downlink OFDMA transmission to the two or more second communication devices.

19. The method of claim 1, further comprising:
allocating respective sub-channels of the OFDM channel for downlink OFDMA transmission to the two or more second communication devices,
generating a downlink OFDMA data unit to include, in a physical layer (PHY) signal field of the downlink OFDMA data unit, indications of the respective sub-channels for downlink OFDMA transmission to the two or more second communication devices, and
transmitting the downlink OFDMA data unit to the two or more second communication devices, wherein the downlink OFDMA data unit includes respective OFDM data units directed to the two or more second communication devices transmitted in the respective OFDM data units in the respective sub-channels allocated for downlink OFDMA transmission to the two or more second communication devices.

20. A first communication device, comprising:
a network interface configured to:
allocate respective sub-channels of an orthogonal frequency division multiplexing (OFDM) channel to two or more second communication devices for uplink orthogonal frequency division multiple access (OFDMA) transmission from the two or more second communication devices, including: (i) allocating non-contiguous sub-channels by skipping a particular sub-channel of the OFDM channel, when the particular sub-channel is determined to be unavailable for transmission, and (ii) allocating a first sub-channel to a first one of the two or more second communication devices and a second sub-channel to a second one of the two or more communication devices;
provide, to the two or more second communication devices, i) indications of the respective sub-channels allocated for uplink transmission from the two or more second communication devices, including indications of the non-contiguous sub-channel allocation, and ii) an indication of a length of the uplink OFDMA transmission from the two or more second communication devices; and
receive an uplink OFDMA data unit that includes at least a first OFDM data unit from the first one of the two or more second communication devices and a second OFDM data unit from the second one of the two or more second communication devices, wherein the first OFDM data unit i) has a duration in accordance with the indication of the length provided by the first communication device and ii) is transmitted from the first one of the two or more second communication devices via the first sub-channel allocated to the first one of the two or more second communication devices and the second OFDM data unit i) has the duration in accordance with the indication of the length provided by the first communication device and ii) is transmitted from the second one of the two or more second communication devices via the second sub-channel allocated to the second one of the two or more second communication devices.

21. The first communication device of claim 20, wherein the network interface is configured transmit a scheduling frame to trigger transmission of the uplink OFDMA data unit, wherein the scheduling frame provides the respective indications of the respective sub-channels allocated to the two or more second communication devices.

22. The first communication device of claim 21, wherein the network interface is further configured to
conduct a channel assessment procedure to obtain a transmit opportunity for OFDMA communication between the first communication device and the two or more second communication devices, and
transmit the scheduling frame at a beginning of the obtained transmit opportunity.

23. The first communication device of claim 21, wherein the network interface is configured to transmit the scheduling frame at a beginning of a scheduled transmit opportunity for OFDMA communication between the first communication device and the two or more second communication devices.

24. The first communication device of claim 21, wherein the network interface is further configured to:
determine the length of the uplink OFDMA transmission, and
include, in the scheduling frame, the indication of the length of the uplink OFDMA transmission.

25. The first communication device of claim 24, wherein the network interface is configured to:
request, from the two or more second communication devices, respective indications of each of one or both of (i) amount of data buffered for uplink transmission and (ii) requested medium time for uplink transmission,
receive the requested indications from the two or more second communication devices, and
determine the length of the uplink OFDMA transmission based at least in part on the respective indications received from the two or more second communication devices.

26. The first communication device of claim 25, wherein the network interface is configured to request the indications from the two or more second communication devices at least by including a request for transmission of the indications in the scheduling frame.

27. The first communication device of claim 21, wherein the network interface is further configured to include, in the scheduling frame, a repeat usage indication, wherein the repeat usage indications indicates that the sub-channels allocated for uplink transmission by the two or more second communication devices are to be used for multiple consecutive uplink transmissions by the two or more second communication devices.

28. The first communication device of claim 20, wherein the network interface is further configured to:
   allocate a third sub-channel to both (i) a third one of the second communication devices and (ii) a fourth one of the second communication devices, and
   indicate, to the fourth one of the second communication devices, a time at which to begin transmitting an uplink OFDM data unit in the third sub-channel, wherein the indicated time begins after an end of an OFDM data unit transmitted in the third-sub-channel by the third one of the second communication devices.

29. The first communication device of claim 28, wherein the network interface is further configured to indicate to the third one of the second communication devices that an immediate acknowledgment is not required for the OFDM data unit transmitted in the third-sub-channel by the third one of the second communication devices.

30. The first communication device of claim 20, wherein the network interface is configured to, when allocating respective sub-channels of the OFDM channel to the two or more second communication devices for uplink OFDMA transmission from the two or more second communication devices, skip a particular sub-channel of the OFDM channel if the particular sub-channel is determined to be unavailable for transmission.

31. The first communication device of claim 20, wherein the network interface is further configured to, after receiving the uplink OFDMA data unit, transmit one or more acknowledgement frames to the two or more second communication devices, wherein the one or more acknowledgement frames are transmitted simultaneously to the two or more second communication devices.

32. The first communication device of claim 31, wherein the network interface is configured to transmit respective acknowledgement frames to the two or more second communication devices as parts of an OFDMA transmission to the two or more second communication devices, wherein the respective acknowledgement frames are transmitted in the respective sub-channels allocated to the two or more second communication devices.

33. The first communication device of claim 31, wherein the network interface is configured to transmit a broadcast acknowledgement frame to the two or more second communication devices, wherein the broadcast acknowledgement frame includes respective acknowledgements for the two or more second communication devices.

34. The first communication device of claim 21, wherein the network interface is further configured to:
   allocate respective sub-channels of the OFDM channel for downlink OFDMA transmission to the two or more second communication devices,
   provide, to the two or more second communication devices, indications of respective sub-channels allocated for downlink OFDMA transmission to the two or more communication devices, and
   transmit a downlink OFDMA data unit to the two or more second communication devices, wherein the downlink OFDMA data unit includes respective OFDM data units directed to the two or more second communication devices transmitted in the respective OFDM data units in the respective sub-channels allocated for downlink OFDMA transmission to the two or more second communication devices.

35. The first communication device of claim 34, wherein the network interface is further configured to receive the uplink OFDMA data unit and transmit the downlink OFDMA data unit during a same transmission opportunity for OFDMA communication between the first communication device and the two or more second communication devices.

36. The first communication device of claim 34, wherein the network interface is configured to provide, to the two or more second communication devices, indications of respective sub-channels allocated for downlink OFDMA transmission to the two or more second communication devices at least by including the indications in the scheduling frame.

37. The first communication device of claim 34, wherein the network interface is further configured to receive respective acknowledgement frames from the two or more second communication devices, wherein the acknowledgement frames are transmitted simultaneously by the two or more second communication devices as part of an OFDMA transmission from the two or more second communication devices, wherein the respective acknowledgement frames are transmitted in the respective sub-channels allocated for downlink OFDMA transmission to the two or more second communication devices.

38. The first communication device of claim 20, wherein the network interface is further configured to:
   allocate respective sub-channels of the OFDM channel for downlink OFDMA transmission to the two or more second communication devices,
   generate a downlink OFDMA data unit to include, in a physical layer (PHY) signal field of the downlink OFDMA data unit, indications of the respective sub-channels for downlink OFDMA transmission to the two or more second communication devices, and
   transmit the downlink OFDMA data unit to the two or more second communication devices, wherein the downlink OFDMA data unit includes respective OFDM data units directed to the two or more second communication devices transmitted in the respective OFDM data units in the respective sub-channels allocated for downlink OFDMA transmission to the two or more second communication devices.

39. A method for simultaneously communication with multiple communication devices in a wireless local area network, the method comprising:
   allocating, by a first communication device, respective sub-channels of an orthogonal frequency division multiplexing (OFDM) channel to two or more second communication devices for downlink orthogonal frequency division multiple access (OFDMA) transmission to the two or more second communication devices, including: (i) allocating non-contiguous sub-channels by skipping a particular sub-channel of the OFDM channel, when the particular sub-channel is determined to be unavailable for transmission, and (ii) allocating a first sub-channel to a first one of the two or more second communication devices and a second sub-channel to a second one of the two or more communication devices;
   generating a signal field of an OFDMA data unit to include indications of the respective sub-channels allocated for downlink OFDMA transmission to the two or more second communication devices, including indications of the non-contiguous sub-channel allocation;

generating the OFDMA data unit to include (i) the signal field, (ii) a first OFDM data unit directed to the first one of the two or more second communication devices and (iii) a second OFDM data unit directed to the second one of the two or more second communication devices, wherein the first OFDM data unit is to be transmitted in the first sub-channel and the second OFDM data unit is to be transmitted in the second sub-channel; and transmitting the OFDMA data unit to the two or more second communication devices.

40. The method of claim 39, further comprising receiving respective acknowledgement frames from the two or more second communication devices, wherein the acknowledgement frames are transmitted simultaneously by the two or more second communication devices as part of an OFDMA transmission from the two or more second communication devices, wherein the respective acknowledgement frames are transmitted in the respective sub-channels allocated for downlink OFDMA transmission to the two or more second communication devices.

41. A first communication device, comprising:

a network interface configured to:

allocate respective sub-channels of an orthogonal frequency division multiplexing (OFDM) channel to two or more second communication devices for downlink orthogonal frequency division multiple access (OFDMA) transmission to the two or more second communication devices, including: (i) allocating non-contiguous sub-channels by skipping a particular sub-channel of the OFDM channel, when the particular sub-channel is determined to be unavailable for transmission, and (ii) allocating a first sub-channel to a first one of the two or more second communication devices and a second sub-channel to a second one of the two or more communication devices;

generate a signal field of an OFDMA data unit to include indications of the respective sub-channels allocated for downlink OFDMA transmission from the two or more second communication devices, including indications of the non-contiguous sub-channel allocation;

generate the OFDMA data unit to include (i) the signal field, (ii) a first OFDM data unit directed to the first one of the two or more second communication devices and (iii) a second OFDM data unit directed to the second one of the two or more second communication devices, wherein the first OFDM data unit is to be transmitted in the first sub-channel and the second OFDM data unit is to be transmitted in the second sub-channel; and transmit the OFDMA data unit to the two or more second communication devices.

42. The first communication device of claim 41, wherein the network interface is further configured to receive respective acknowledgement frames from the two or more second communication devices, wherein the acknowledgement frames are transmitted simultaneously by the two or more second communication devices as part of an OFDMA transmission from the two or more second communication devices, wherein the respective acknowledgement frames are transmitted in the respective sub-channels allocated for downlink OFDMA transmission to the two or more second communication devices.

\* \* \* \* \*